(12) United States Patent
McCabe et al.

(10) Patent No.: US 10,401,652 B2
(45) Date of Patent: Sep. 3, 2019

(54) EYEWEAR WITH CHROMA ENHANCEMENT

(71) Applicant: Oakley, Inc., Foothill Ranch, CA (US)

(72) Inventors: Brock Scott McCabe, Laguna Niguel, CA (US); Ryan Saylor, Mission Viejo, CA (US); Carlos D. Reyes, Rancho Santa Margarita, CA (US)

(73) Assignee: Oakley, Inc., Foothill Ranch, CA (US)

( * ) Notice: Subject to any disclaimer, the term of this patent is extended or adjusted under 35 U.S.C. 154(b) by 61 days.

(21) Appl. No.: 15/199,174

(22) Filed: Jun. 30, 2016

(65) Prior Publication Data
US 2017/0068113 A1 Mar. 9, 2017

Related U.S. Application Data

(63) Continuation of application No. 14/289,447, filed on May 28, 2014, now Pat. No. 9,383,594, which is a (Continued)

(51) Int. Cl.
G02C 7/10 (2006.01)
G02C 7/12 (2006.01)
G02B 5/22 (2006.01)

(52) U.S. Cl.
CPC ............. G02C 7/104 (2013.01); G02B 5/223 (2013.01); G02C 7/102 (2013.01); G02C 7/108 (2013.01); G02C 7/12 (2013.01); G02C 2202/16 (2013.01)

(58) Field of Classification Search
None
See application file for complete search history.

(56) References Cited

U.S. PATENT DOCUMENTS 2,219,122 A 10/1940 Weidert et al.
3,701,590 A 10/1972 Zeltzer
(Continued)

FOREIGN PATENT DOCUMENTS

CN 1338622 3/2002
CN 2859575 1/2007
(Continued)

OTHER PUBLICATIONS

"ANSI Z80.3-2010 American National Standard for Opthalmics-Nonprescription Sunglass and Fashion Eyewear Requirements," Jun. 7, 2010, pp. 1-25.
(Continued)

Primary Examiner — Ricky L Mack
Assistant Examiner — Gary W O'Neill
(74) Attorney, Agent, or Firm — Sterne, Kessler, Goldstein & Fox P.L.L.C.

(57) ABSTRACT

Some embodiments provide a lens including a lens body and an optical filter configured to attenuate visible light in a plurality of spectral bands. Each of the plurality of spectral bands can include an absorptance peak with a spectral bandwidth, a maximum absorptance, and an integrated absorptance peak area within the spectral bandwidth. An attenuation factor obtained by dividing the integrated absorptance peak area within the spectral bandwidth by the spectral bandwidth of the absorptance peak can be greater than or equal to about 0.8 for the absorptance peak in each of the plurality of spectral bands.

20 Claims, 48 Drawing Sheets

Related U.S. Application Data continuation of application No. 13/029,997, filed on Feb. 17, 2011, now Pat. No. 8,770,749.

(60) Provisional application No. 61/425,707, filed on Dec. 21, 2010, provisional application No. 61/324,706, filed on Apr. 15, 2010.

(56) References Cited

U.S. PATENT DOCUMENTS

| | | | |
|---|---|---|---|
| 3,877,797 | A | 4/1975 | Thornton, Jr. |
| 4,176,299 | A | 11/1979 | Thornton, Jr. |
| 4,268,134 | A | 5/1981 | Gulati et al. |
| 4,288,250 | A | 9/1981 | Yamashita |
| 4,300,819 | A | 11/1981 | Taylor |
| 4,354,739 | A | 10/1982 | Scanlon et al. |
| 4,376,829 | A | 3/1983 | Daiku |
| 4,405,881 | A | 9/1983 | Kobayashi |
| 4,521,524 | A | 6/1985 | Yamashita |
| 4,659,178 | A | 4/1987 | Kyogoku |
| 4,663,562 | A | 5/1987 | Miller et al. |
| 4,687,926 | A | 8/1987 | Plummer |
| 4,769,347 | A | 9/1988 | Cook et al. |
| 4,802,755 | A | 2/1989 | Hensler |
| 4,826,286 | A | 5/1989 | Thornton, Jr. |
| 4,838,673 | A | 6/1989 | Richards et al. |
| 4,998,817 | A | 3/1991 | Zeltzer |
| 5,039,631 | A | 8/1991 | Krashkevich et al. |
| RE33,729 | E | 10/1991 | Perilloux |
| 5,054,902 | A | 10/1991 | King |
| 5,061,659 | A | 10/1991 | Ciolek et al. |
| 5,077,240 | A | 12/1991 | Hayden et al. |
| 5,121,030 | A | 6/1992 | Schott |
| 5,121,239 | A | 6/1992 | Post |
| 5,149,183 | A | 9/1992 | Perrott et al. |
| 5,164,858 | A | 11/1992 | Aguilera, Jr. et al. |
| 5,190,896 | A | 3/1993 | Pucilowski et al. |
| 5,218,386 | A | 6/1993 | Levien |
| 5,408,278 | A | 4/1995 | Christman |
| 5,438,024 | A | 8/1995 | Bolton et al. |
| 5,446,007 | A | 8/1995 | Krashkevich et al. |
| 5,574,517 | A | 11/1996 | Pang et al. |
| 5,592,245 | A | 1/1997 | Moore et al. |
| 5,646,781 | A | 7/1997 | Johnson, Jr. |
| 5,694,240 | A | 12/1997 | Sternbergh |
| 5,715,031 | A | 2/1998 | Roffman et al. |
| 5,729,323 | A | 3/1998 | Arden et al. |
| 5,731,898 | A | 3/1998 | Orzi et al. |
| 5,774,202 | A | 6/1998 | Abraham et al. |
| 5,922,246 | A | 7/1999 | Matsushita et al. |
| 5,925,468 | A | 7/1999 | Stewart |
| 6,132,044 | A | 10/2000 | Sternbergh |
| 6,135,595 | A | 10/2000 | Takeshita et al. |
| 6,138,286 | A | 10/2000 | Robrahn et al. |
| 6,142,626 | A | 11/2000 | Lu et al. |
| 6,145,984 | A | 11/2000 | Farwig |
| 6,175,450 | B1 | 1/2001 | Andreani et al. |
| 6,313,577 | B1 | 11/2001 | Kunisada et al. |
| 6,334,680 | B1 | 1/2002 | Larson |
| 6,382,788 | B1 | 5/2002 | Stehager |
| 6,391,810 | B1 | 5/2002 | Lenhart |
| 6,450,652 | B1 | 6/2002 | Karpen |
| 6,416,867 | B1 | 7/2002 | Karpen |
| 6,420,290 | B1 | 7/2002 | Brocheton et al. |
| 6,460,994 | B1 | 10/2002 | Nolan |
| 6,604,824 | B2 | 8/2003 | Larson |
| 6,631,987 | B2 | 10/2003 | Reichow et al. |
| 6,641,261 | B2 | 11/2003 | Wang et al. |
| 6,650,473 | B2 | 11/2003 | Nakagoshi |
| 6,659,608 | B2 | 12/2003 | Yamamoto et al. |
| RE38,402 | E | 1/2004 | Stephens et al. |
| 6,677,260 | B2 | 1/2004 | Crane et al. |
| 6,770,692 | B1 | 8/2004 | Kobayashi et al. |
| 6,773,816 | B2 | 8/2004 | Tsutsumi |
| 6,807,006 | B2 | 10/2004 | Nakagoshi |
| 6,811,258 | B1 | 11/2004 | Grant |
| 6,811,727 | B2 | 11/2004 | Havens et al. |
| 6,852,657 | B2 | 2/2005 | Kolberg et al. |
| 6,863,397 | B2 | 3/2005 | Nakano |
| 6,893,127 | B2 | 5/2005 | Reichow et al. |
| 6,926,405 | B2 | 8/2005 | Ambler et al. |
| 6,932,472 | B2 | 8/2005 | Marason et al. |
| 6,955,430 | B2 | 10/2005 | Pratt |
| 6,979,083 | B2 | 12/2005 | Kerns, Jr. et al. |
| 6,984,038 | B2 | 1/2006 | Ishak |
| 7,029,118 | B2 | 4/2006 | Ishak |
| 7,035,010 | B2 | 4/2006 | Iori et al. |
| 7,106,509 | B2 | 9/2006 | Sharp |
| 7,226,162 | B2 | 6/2007 | Mah |
| 7,255,435 | B2 | 8/2007 | Pratt |
| 7,256,921 | B2 | 8/2007 | Kumar et al. |
| 7,276,544 | B2 | 10/2007 | Lai et al. |
| 7,278,737 | B2 | 10/2007 | Mainster et al. |
| 7,349,138 | B2 | 3/2008 | Kumar et al. |
| 7,372,640 | B2 | 5/2008 | Fung |
| 7,393,100 | B2 | 7/2008 | Mertz |
| 7,506,976 | B2 | 3/2009 | Baiocchi et al. |
| 7,506,977 | B1 | 3/2009 | Aiiso |
| 7,520,608 | B2 | 4/2009 | Ishak et al. |
| 7,556,376 | B2 | 7/2009 | Ishak et al. |
| 7,597,441 | B1 | 10/2009 | Farwig |
| 7,656,581 | B2 | 2/2010 | Giraudet |
| 7,717,557 | B2 | 5/2010 | Kobayashi et al. |
| 7,732,006 | B2 | 6/2010 | Alberto de Rojas |
| 7,901,074 | B2 | 3/2011 | Yamamoto et al. |
| 7,922,324 | B2 | 4/2011 | Ishibashi et al. |
| 8,210,678 | B1 | 7/2012 | Farwig |
| 8,733,929 | B2 | 5/2014 | Chiou et al. |
| 8,770,749 | B2 | 7/2014 | McCabe et al. |
| 9,134,547 | B2 | 9/2015 | McCabe et al. |
| 9,146,336 | B2 | 9/2015 | Matsumoto et al. |
| 9,383,594 | B2 | 7/2016 | McCabe et al. |
| 9,575,335 | B1 | 2/2017 | McCabe et al. |
| 2001/0005281 | A1 | 6/2001 | Yu |
| 2001/0035935 | A1 | 11/2001 | Bhalakia et al. |
| 2002/0090516 | A1 | 7/2002 | Loshak et al. |
| 2002/0135734 | A1* | 9/2002 | Reichow ............ G02C 7/104 351/159.63 |
| 2003/0020988 | A1 | 1/2003 | Stone |
| 2004/0005482 | A1 | 1/2004 | Kobayashi et al. |
| 2004/0246437 | A1 | 12/2004 | Ambler et al. |
| 2005/0009964 | A1 | 1/2005 | Sugimura et al. |
| 2005/0168690 | A1 | 8/2005 | Kawai et al. |
| 2005/0175969 | A1 | 8/2005 | Hayes |
| 2005/0224703 | A1 | 10/2005 | Harada et al. |
| 2006/0033851 | A1 | 2/2006 | Iori et al. |
| 2006/0146275 | A1 | 7/2006 | Mertz |
| 2006/0158881 | A1 | 7/2006 | Dowling |
| 2007/0097509 | A1 | 5/2007 | Nevitt et al. |
| 2007/0122626 | A1 | 5/2007 | Qin et al. |
| 2007/0126983 | A1 | 6/2007 | Godeau et al. |
| 2007/0236809 | A1† | 10/2007 | Lippey |
| 2008/0068555 | A1 | 3/2008 | Lau et al. |
| 2008/0074613 | A1 | 3/2008 | Phillips |
| 2008/0094566 | A1 | 4/2008 | Ishak et al. |
| 2008/0221674 | A1 | 9/2008 | Blum et al. |
| 2008/0278676 | A1 | 11/2008 | Croft et al. |
| 2008/0291140 | A1 | 11/2008 | Kent et al. |
| 2009/0040564 | A1 | 2/2009 | Granger |
| 2009/0122261 | A1 | 5/2009 | Chou et al. |
| 2009/0268102 | A1 | 10/2009 | Barazza |
| 2010/0054632 | A1 | 3/2010 | McCormick et al. |
| 2010/0066974 | A1 | 3/2010 | Croft et al. |
| 2010/0073765 | A1 | 3/2010 | Brocheton |
| 2010/0232003 | A1 | 9/2010 | Baldy et al. |
| 2010/0283956 | A1 | 11/2010 | Jackson et al. |
| 2011/0043902 | A1 | 2/2011 | Ishibashi et al. |
| 2012/0236249 | A1 | 9/2012 | Miwa et al. |
| 2013/0141693 | A1 | 6/2013 | McCabe et al. |
| 2014/0233105 | A1 | 8/2014 | Schmeder |
| 2016/0041408 | A1 | 2/2016 | Carlson et al. |
| 2016/0048037 | A1 | 2/2016 | McCabe et al. |

(56) References Cited

U.S. PATENT DOCUMENTS

| | | | |
|---|---|---|---|
| 2016/0070119 | A1 | 3/2016 | McCabe et al. |
| 2017/0075143 | A1 | 3/2017 | Saylor et al. |

FOREIGN PATENT DOCUMENTS

| | | |
|---|---|---|
| CN | 102124394 | 7/2011 |
| DE | 3534575 | 4/1986 |
| EP | 0 127 821 | 12/1984 |
| EP | 0 519 660 | 12/1992 |
| EP | 1 986 024 | 10/2008 |
| FR | 2812629 | 2/2002 |
| GB | 1154500 | 6/1969 |
| JP | S63-008703 | 1/1988 |
| JP | H05-202109 | 8/1993 |
| JP | 06-300992 | 10/1994 |
| JP | 2001-506012 | 5/2001 |
| JP | 2007-025609 | 2/2007 |
| JP | 2010-204383 | 9/2010 |
| WO | WO 88/002871 | 4/1988 |
| WO | WO 97/035215 | 9/1997 |
| WO | WO 99/067681 | 12/1999 |
| WO | WO 02/014930 | 2/2002 |
| WO | WO 02/076632 | 10/2002 |
| WO | WO 2008/014225 | 1/2008 |
| WO | WO 2009/011439 | 1/2009 |
| WO | WO 2009/152381 | 12/2009 |
| WO | WO 2011/127015 | 10/2011 |
| WO | WO 2011/130314 | 10/2011 |
| WO | WO 2012/119158 | 9/2012 |
| WO | WO 2013/070417 | 5/2013 |
| WO | WO 2013/074269 | 5/2013 |
| WO | WO 2013/054656 | 4/2014 |
| WO | WO 2014/055513 | 4/2014 |
| WO | WO 2015/179538 | 11/2015 |
| WO | WO 2016/077431 | 5/2016 |

OTHER PUBLICATIONS

British Standard, "Personal Eye-Equipment—Sunglasses and Sunglare Filters for General Use and Filters for Direct Observation of the Sun," Technical Committee CEN/TC 85, Sep. 2007, pp. 46.
Drum, Bruce, "FDA Regulation of Labeling and Promotional Claims in Therapeutic Color Vision Devices: A Tutorial," Visual Neuroscience, May 2004, vol. 21, No. 3, pp. 461-463.
Encyclopedia of Polymer Science and Technology—Plastics, Resins, Rubbers, Fibers, edited by Mark, H. et al, vol. 9, John Wiley & Sons, 1968, USAA, pp. 6.
Golz et al., "Colorimetry for CRT displays," Journal of the Optical Society of America A, vol. 20, No. 5, May 2003, pp. 769-781.
Kirkpatrick et al., "Optimization by Simulated Annealing," Science, New Series, May 13, 1983, vol. 220, No. 4598, pp. 671-680.
Linear Programming, Feb. 28, 2011, http://en.wildpedia.org/w/index.php?title=Linear_programmming&oldid=416428507, pp. 14.
Moreland et al., "Quantitative Assessment of Commercial Filter Aids for Red-Green Colour Defectives," Ophthalmic and Physiological Optics, The Journal of the College of Optometrists, Sep. 2010, vol. 30, No. 5, pp. 685-692.
Nakamura et al, "Diffusion Coefficients of Disperse Dye to PE and PET Films in Supercritical Carbon Dioxide", School of Natural PET Films in Supercritical Carbon Dioxide", School of Natural System, College of Science and Engineering, Kanazawa University, Japan, Proceedings of 9th International Symposium on Super Critical Fluids, May 18-20, 2009, Arachon, France, pp. 6.
"Product Description: Lagoon Sunglasses", Maui Jim website, printed on Feb. 18, 2014, web page address: http://www.mauijim.com/lagoon.html, was publicly available at least as early as Nov. 2009.
Rea et al., "Color Rendering: Beyond Pride and Prejudice," Color Research & Application, Dec. 2010, vol. 35, No. 6, pp. 401-409.
Sharp et al., "Retarder Stack Technology for Color Manipulation," SID Symposium Digest of Technical Papers, May 1999, vol. 30, No. 1, pp. 1072-1075.
Stockman et al., "The Spectral Sensitivities of the Middle- and Long-Wavelength-Sensitive Cones Derived from Measurements in Observers of known Genotype," Vision Research, vol. 40, Jun. 2000, pp. 1711-1737.
Swillam et al., "The Design of Multilayer Optical Coatings Using Convex Optimization," Journal of Lightwave Technology, Apr. 2007, vol. 25, No. 4, pp. 1078-1085.
Tilsch et al., "Manufacturing of Precision Optical Coatings," Chinese Optics Letters, Apr. 30, 2010, vol. 8, Supplement, pp. 38-43.
Vorobyev et al., "Receptor Noise as a Determinant of Colour Thresholds," Proceedings of the Royal Society of London B, Mar. 1998, vol. 265, pp. 351-358.
Wilson, Carrie, "The How and Why of AR Coating", EyeCare professional Magazine, Oct. 2010 Issue, http://www.ecpmag.com/1webmagazine/2010/10oct/content/through_the_lens/Understanding-AR-Coating.asp (retrieved Oct. 9, 2013).
International Search Report and Written Opinion dated Aug. 22, 2011 in PCT Application No. US/2011/32172.
International Preliminary Report on Patentability and Written Opinion dated Oct. 16, 2012 in PCT Application No. US/2011/32172.
International Search Report and Written Opinion dated Feb. 5, 2013, in PCT Application No. PCT/US2012/061060.
International Preliminary Report on Patentability and Written Opinion dated Apr. 22, 2014, in PCT Application No. PCT/US2012/061060.
International Search Report and Written Opinion dated Jul. 27, 2012, in PCT Application No. PCT/US2012/027790.
International Preliminary Report on Patentability and Written Opinion dated Sep. 3, 2013, in PCT/US2012/027790.
International Search Report and Written Opinion dated May 2, 2016 in PCT Application No. PCT/US2015/060103.
International Search Report and Written Opinion dated Jun. 1, 2016, in PCT Application No. PCT/US2015/065311.
X-Rite, A Guide to Understanding Color Communication, pp. 1-26, Mar. 2007, downloaded from http://www.xrite.com/learning/whitepapers/a-guide-to-understanding-color.†

\* cited by examiner
† cited by third party

EYEWEAR WITH CHROMA ENHANCEMENT

RELATED APPLICATIONS

This application is a continuation of U.S. application Ser. No. 14/289,447, filed May 28, 2014, titled EYEWEAR WITH CHROMA ENHANCEMENT, which is a continuation of U.S. application Ser. No. 13/029,997, filed Feb. 17, 2011, titled EYEWEAR WITH CHROMA ENHANCEMENT, now U.S. Pat. No. 8,770,749 which claims the benefit under 35 U.S.C. § 119(e) of U.S. Provisional Patent Application No. 61/425,707, filed Dec. 21, 2010, titled EYEWEAR AND LENSES WITH CHROMA ENHANCING FILTER, and U.S. Provisional Patent Application No. 61/324,706, filed Apr. 15, 2010, titled EYEWEAR AND LENSES WITH CHROMA ENHANCING FILTER. The entire contents of each of these applications are incorporated by reference herein and made a part of this specification.

BACKGROUND

Field

This disclosure relates generally to eyewear and more particularly to lenses used in eyewear.

Description of Related Art

Eyewear can include optical elements that attenuate light in one or more wavelength bands. For example, sunglasses typically include a lens that absorbs a significant portion of light in the visible spectrum. A sunglass lens can have a dark film or coating that strongly absorbs visible light, thereby significantly decreasing the luminous transmittance of the lens. A lens can also be designed to have a spectral profile for another purpose, such as, for example, for indoor use, for use in sporting activities, for another particular use, or for a combination of uses.

SUMMARY

Example embodiments described herein have several features, no single one of which is indispensible or solely responsible for their desirable attributes. Without limiting the scope of the claims, some of the advantageous features will now be summarized.

Some embodiments provide a lens including a lens body and an optical filter within and/or outside of the lens body configured to attenuate visible light in a plurality of spectral bands. In some embodiments in which the optical filter is within the lens body, the optical filter may constitute the lens body, or the optical filter and additional components may constitute the lens body. The optical filter can be configured to substantially increase the colorfulness, clarity, and/or vividness of a scene. The optical filter can be particularly suited for use with eyewear and can allow the wearer of the eyewear to view a scene in high definition color (HD color). Each of the plurality of spectral bands can include an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak. In some embodiments, an attenuation factor obtained by dividing the integrated absorptance peak area within the spectral bandwidth by the spectral bandwidth of the absorptance peak can be greater than or equal to about 0.8 for the absorptance peak in each of the plurality of spectral bands. In some embodiments, the spectral bandwidth of the absorptance peak in each of the plurality of spectral bands can be greater than or equal to about 20 nm.

In certain embodiments, the optical filter is at least partially incorporated into the lens body. The lens body can be impregnated with, loaded with, or otherwise comprise one or more organic dyes. Each of the one or more organic dyes can be configured to produce the absorptance peak in one of the plurality of spectral bands. In some embodiments, the optical filter is at least partially incorporated into a lens coating disposed over the lens body.

Some embodiments provide a method of manufacturing a lens. The method can include forming a lens having an optical filter configured to attenuate visible light in a plurality of spectral bands. Each of the plurality of spectral bands can include an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak. An attenuation factor of the absorptance peak in each of the plurality of spectral bands can be greater than or equal to about 0.8 and less than 1. The attenuation factor of an absorptance peak can be obtained by dividing the integrated absorptance peak area within the spectral bandwidth by the spectral bandwidth of the absorptance peak.

In certain embodiments, a lens can be formed by forming a lens body and forming a lens coating over the lens body. At least a portion of the optical filter can be incorporated into the lens body. At least a portion of the optical filter can be incorporated into the lens coating. The lens coating can include an interference coating.

In some embodiments, a lens body can be formed by a method including forming a plurality of lens body elements and coupling the lens body elements to one another using one or more adhering layers. A polarizing film can be disposed between two of the plurality of lens body elements. In some embodiments, the polarizing film can be insert molded within the lens body.

Some embodiments provide a lens including a lens body and an optical filter characterized by a spectral absorptance profile including a plurality of absorptance peaks. Each of the plurality of absorptance peaks can have a maximum absorptance, a spectral bandwidth defined as the full width of the absorptance peak at 80% of the maximum absorptance of the absorptance peak, and a center wavelength located at a midpoint of the spectral bandwidth of the absorptance peak. The plurality of absorptance peaks can include a first absorptance peak having a center wavelength between about 558 nm and about 580 nm and a second absorptance peak having a center wavelength between about 445 nm and about 480 nm. The spectral bandwidth of each of the plurality of absorptance peaks can be between about 20 nm and about 50 nm.

In certain embodiments, each of the first absorptance peak and the second absorptance peak has an integrated absorptance peak area within the spectral bandwidth and an attenuation factor obtained by dividing the integrated absorptance peak area by the spectral bandwidth of the absorptance peak. The attenuation factor of each of the first absorptance peak and the second absorptance peak can be greater than or equal to about 0.8.

The plurality of absorptance peaks can include a third absorptance peak configured to substantially attenuate light at least between about 405 nm and about 425 nm and a fourth absorptance peak configured to substantially attenuate light at least between about 650 nm and about 670 nm, between about 705 nm and about 725 nm, or between about 700 nm and about 720 nm. In another embodiment, the third absorptance peak is configured to substantially attenuate light at least between about 400 nm and about 420 nm. Each of the third absorptance peak and the fourth absorptance peak can have an integrated absorptance peak area within the spectral bandwidth and an attenuation factor obtained by dividing the integrated absorptance peak area by the spectral bandwidth of the absorptance peak. The attenuation factor of each of the third absorptance peak and the fourth absorptance peak can be greater than or equal to about 0.8.

Some embodiments provide a lens that includes a lens body with an optical filter configured to increase the average chroma value of light transmitted through the lens within one or more portions of the visible spectrum. The chroma value is the C* attribute of the CIE L*C*h* color space. At least one portion of the visible spectrum can include a spectral range of about 630 nm to about 660 nm. The increase in average chroma value can include an increase that is perceivable by a human with substantially normal vision.

In certain embodiments, the optical filter is configured to increase the average chroma value of light transmitted through the lens within a spectral range of about 540 nm to about 600 nm by a relative magnitude of greater than or equal to about 3% compared to the average chroma value of light transmitted through a neutral filter within the same spectral range.

The optical filter can be configured to increase the average chroma value of light transmitted through the lens within a spectral range of about 440 nm to about 480 nm by a relative magnitude of greater than or equal to about 15% compared to the average chroma value of light transmitted through a neutral filter within the same spectral range.

In some embodiments, the optical filter does not substantially decrease the average chroma value of light transmitted through the lens within the one or more portions of the visible spectrum when compared to the average chroma value of light transmitted through a neutral filter. In certain embodiments, the optical filter does not substantially decrease the average chroma value of light transmitted through the lens within a spectral range of about 440 nm to about 660 nm when compared to the average chroma value of light transmitted through a neutral filter.

The optical filter can be configured to increase the average chroma value of light transmitted through the lens within a spectral range of about 630 to about 660 nm by a relative magnitude of greater than or equal to about 3% compared to the average chroma value of light transmitted through a neutral filter within the same spectral range.

The optical filter can be at least partially incorporated into the lens body. For example, the lens body can be loaded with a plurality of organic dyes, each of the plurality of organic dyes configured to increase the average chroma value of light transmitted through the lens within one or more portions of the visible spectrum.

In some embodiments, the optical filter is at least partially incorporated into a lens coating disposed over at least a portion of the lens body. For example, the optical filter can include an interference coating.

In some embodiments, the optical filter can be at least partially incorporated into an adhering layer, a polarizing layer, or a combination of the adhering layer and the polarizing layer.

Certain embodiments provide a method of manufacturing a lens, the method including forming a lens including an optical filter configured to increase the average chroma value of light transmitted through the lens within one or more portions of the visible spectrum. At least one portion of the visible spectrum can include a spectral range of about 630 nm to about 660 nm. The increase in average chroma value can include an increase that is perceivable by a human with substantially normal vision.

The step of forming a lens can include forming a lens body and forming a lens coating over the lens body. At least a portion of the optical filter can be incorporated into the lens body. At least a portion of the optical filter can be incorporated into the lens coating. For example, the lens coating can include an interference coating.

The step of forming a lens body can include forming a plurality of lens body elements and coupling the lens body elements to one another using one or more adhering layers. A polarizing film can be disposed between two of the plurality of lens body elements. The lens can include one or more components that substantially absorb ultraviolet radiation, including near ultraviolet radiation. In some embodiments, the polarizing film can be insert molded into the lens body.

Some embodiments provide a lens including a lens body and an optical filter configured to increase the average chroma value of light transmitted through the lens within one or more portions of the visible spectrum. One of the one or more portions of the visible spectrum can include a spectral range of about 540 nm to about 600 nm. The increase in average chroma value can include an increase that is perceivable by a human with substantially normal vision.

Certain embodiments provide a lens including a lens body and an optical filter configured to increase the average chroma value of light transmitted through the lens within one or more portions of the visible spectrum. Three of the one or more portions of the visible spectrum can include a spectral range of about 440 nm to about 510 nm, a spectral range of about 540 nm to about 600 nm, and a spectral range of about 630 nm to about 660 nm. The increase in average chroma value can include an increase that is perceivable by a human with substantially normal vision.

Some embodiments provide a lens for eyewear including a lens body and an optical filter including a plurality of organic dyes. Each of the plurality of organic dyes is configured to attenuate visible light in one or more spectral bands. Each of the one or more spectral bands includes an absorptance peak with a spectral bandwidth, a maximum absorptance, and an integrated absorptance peak area within the spectral bandwidth. The spectral bandwidth can be defined as the full width of the absorptance peak at 80% of the maximum absorptance of the absorptance peak. The attenuation factor of an absorptance peak can be obtained by dividing the integrated absorptance peak area within the spectral bandwidth by the spectral bandwidth of the absorptance peak. For one or more of the plurality of organic dyes, the attenuation factor of at least one absorptance peak is greater than or equal to about 0.8.

For example, one or more of the plurality of organic dyes can include an absorptance profile having a blue light absorptance peak with a center wavelength between about 470 nm and about 480 nm. In some embodiments, the spectral bandwidth of the blue light absorptance peak can be greater than or equal to about 20 nm, and the attenuation factor of the blue light absorptance peak can be greater than or equal to about 0.9.

One or more of the plurality of organic dyes can include an absorptance profile having a yellow light absorptance peak with a center wavelength between about 560 nm and about 580 nm. In some embodiments, the spectral bandwidth of the yellow light absorptance peak can be greater than or equal to about 20 nm, and the attenuation factor of the yellow light absorptance peak can be greater than or equal to about 0.85.

One or more of the plurality of organic dyes can include an absorptance profile having a red light absorptance peak with a center wavelength between about 600 nm and about 680 nm. In some embodiments, the spectral bandwidth of the red light absorptance peak can be greater than or equal to about 20 nm, and the attenuation factor of the red light absorptance peak is greater than or equal to about 0.9.

Each of the plurality of organic dyes can be selected to increase the chroma value of light transmitted through the lens in one or more chroma enhancement windows. The one or more chroma enhancement windows can include a first spectral range of about 440 nm to about 510 nm, a second spectral range of about 540 nm to about 600 nm, a third spectral range of about 630 nm to about 660 nm, or any combination of the first, second, and third spectral ranges.

Certain embodiments provide a lens including a lens body and an optical filter configured to attenuate visible light in a plurality of spectral bands. Each of the plurality of spectral bands includes an absorptance peak with a spectral bandwidth, a maximum absorptance, lower and upper edge portions that are substantially below the maximum absorptance, and a middle portion positioned between the lower and upper edge portions and including the maximum absorptance and a region substantially near the maximum absorptance. In some embodiments, one of the lower or upper edge portions of at least one absorptance peak lies within an object spectral window including a spectral region in which the object emits or reflects a substantial visible stimulus.

The optical filter can be configured such that one of the lower or upper edge portions of at least one absorptance peak lies within a background spectral window. The background spectral window includes a spectral region in which the background emits or reflects a substantial visible stimulus.

The optical filter can be at least partially incorporated into the lens body. The lens body can be impregnated with a plurality of organic dyes, each of the plurality of organic dyes configured to produce the absorptance peak in one of the plurality of spectral bands.

The optical filter can be at least partially incorporated into a lens coating disposed over at least a portion of the lens body. For example, the optical filter can include an interference coating. The optical filter can also be at least partially incorporated into an adhering layer, a polarizing layer, or a combination of the adhering layer and the polarizing layer.

Some embodiments provide a method of manufacturing a lens, the method including forming an optical filter configured to attenuate visible light in a plurality of spectral bands. Each of the plurality of spectral bands including an absorptance peak with a spectral bandwidth, a maximum absorptance, lower and upper edge portions that are substantially below the maximum absorptance, and a middle portion positioned between the lower and upper edge portions and including the maximum absorptance and a region substantially near the maximum absorptance. One of the lower or upper edge portions of at least one absorptance peak can lie within an object spectral window including a spectral region in which the object emits or reflects a substantial visible stimulus.

BRIEF DESCRIPTION OF THE DRAWINGS

Various embodiments are depicted in the accompanying drawings for illustrative purposes, and should in no way be interpreted as limiting the scope of the inventions. In addition, various features of different disclosed embodiments can be combined to form additional embodiments, which are part of this disclosure. Any feature or structure can be removed or omitted. Throughout the drawings, reference numbers may be reused to indicate correspondence between reference elements.

DETAILED DESCRIPTION OF PREFERRED EMBODIMENTS

Figure 1A:
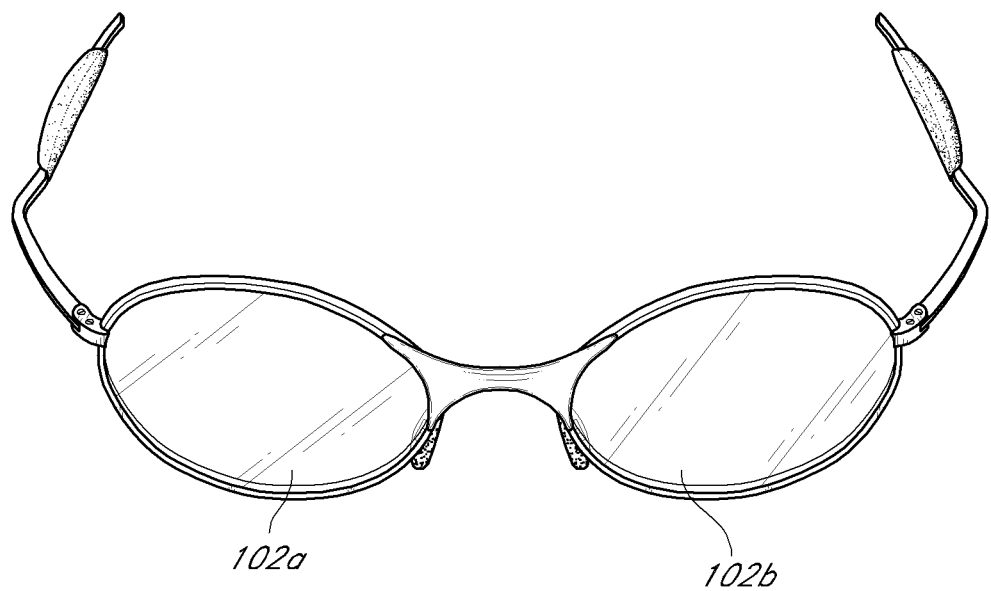
FIG. 1A is a perspective view of a pair of spectacles incorporating lenses with a chroma-enhancing optical filter.

Although certain preferred embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Objects that humans can visually observe in the environment typically emit, reflect, or transmit visible light from one or more surfaces. The surfaces can be considered an array of points that the human eye is unable to resolve any more finely. Each point on the surfaces does not emit, reflect, or transmit a single wavelength of light; rather, it emits, reflects, or transmits a broad spectrum of wavelengths that are interpreted as a single color in human vision. Generally speaking, if one were to observe the corresponding "single wavelength" of light for that interpreted color (for example, a visual stimulus having a very narrow spectral bandwidth, such as 1 nm), it would appear extremely vivid when compared to a color interpreted from a broad spectrum of observed wavelengths.

It has been discovered that an optical filter can be configured to remove the outer portions of a broad visual stimulus to make colors appear more vivid as perceived in human vision. The outer portions of a broad visual stimulus refer to wavelengths that, when substantially, nearly completely, or completely attenuated, decrease the bandwidth of the stimulus such that the vividness of the perceived color is increased. An optical filter for eyewear can be configured to substantially increase the colorfulness, clarity, and/or vividness of a scene. Such an optical filter for eyewear can allow the wearer to view the scene in high definition color (HD color). In some embodiments, portions of a visual stimulus that are not substantially attenuated include at least the wavelengths for which cone photoreceptor cells in the human eye have the greatest sensitivity. In certain embodiments, the bandwidth of the color stimulus when the optical filter is applied includes at least the wavelengths for which the cone photoreceptor cells have the greatest sensitivity. In some embodiments, a person wearing a lens incorporating an optical filter disclosed herein may perceive a substantial increase in the clarity of a scene. The increase in perceived clarity may result, for example, from increased contrast, increased chroma, or a combination of factors.

The vividness of interpreted colors is correlated with an attribute known as the chroma value of a color. The chroma value is one of the attributes or coordinates of the CIE L*C*h* color space. Together with attributes known as hue and lightness, the chroma can be used to define colors that are perceivable in human vision. It has been determined that visual acuity is positively correlated with the chroma values of colors in an image. In other words, the visual acuity of an observer is greater when viewing a scene with high chroma value colors than when viewing the same scene with lower chroma value colors.

An optical filter can be configured to enhance the chroma profile of a scene when the scene is viewed through a lens that incorporates the optical filter. The optical filter can be configured to increase or decrease chroma in one or more chroma enhancement windows in order to achieve any desired effect. The chroma-enhancing optical filter can be configured to preferentially transmit or attenuate light in any desired chroma enhancement windows. Any suitable process can be used to determine the desired chroma enhancement windows. For example, the colors predominantly reflected or emitted in a selected environment can be measured, and a filter can be adapted to provide chroma enhancement in one or more spectral regions corresponding to the colors that are predominantly reflected or emitted.

In the embodiment illustrated in FIG. 1A, eyewear 100 includes lenses 102a, 102b having a chroma-enhancing optical filter. The chroma-enhancing filter generally changes the colorfulness of a scene viewed through one or more lenses 102a, 102b, compared to a scene viewed through a lens with the same luminous transmittance but a different spectral transmittance profile. The eyewear can be of any type, including general-purpose eyewear, special-purpose eyewear, sunglasses, driving glasses, sporting glasses, indoor eyewear, outdoor eyewear, vision-correcting eyewear, contrast-enhancing eyewear, eyewear designed for another purpose, or eyewear designed for a combination of purposes.

Figure 1B:
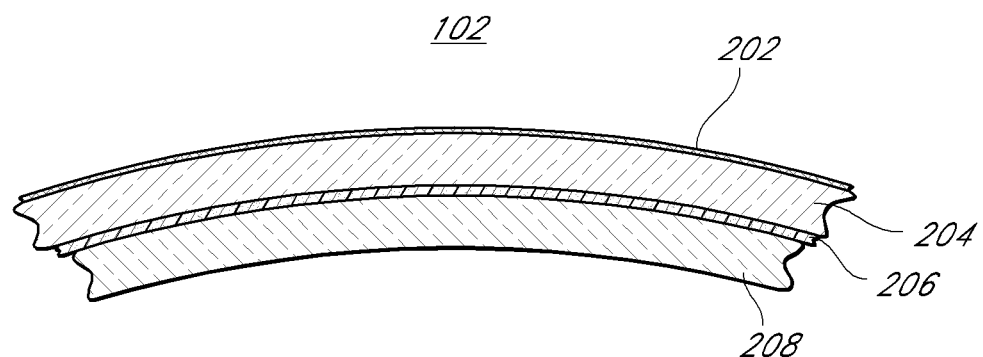
FIG. 1B is a cross-sectional view of one of the lenses shown in FIG. 1A.

In the embodiment illustrated in FIG. 1B, a lens 102 incorporates several lens elements. The lens elements include a lens coating 202, a first lens body element 204, a film layer 206, and a second lens body element 208. Many variations in the configuration of the lens 102 are possible. For example, the lens 102 can include a polarizing layer, one or more adhesive layers, a photochromic layer, an antireflection coating, a mirror coating, an interference coating, a scratch resistant coating, a hydrophobic coating, an antistatic coating, other lens elements, or a combination of lens components. If the lens 102 includes a photochromic layer, the photochromic material can include a neutral density photochromic or any other suitable photochromic. At least some of the lens components and/or materials can be selected such that they have a substantially neutral visible light spectral profile. Alternatively, the visible light spectral profiles can cooperate to achieve any desired lens chromaticity, a chroma-enhancing effect, another goal, or any combination of goals. The polarizing layer, the photochromic layer, and/or other functional layers can be incorporated into the film layer 206, the lens coating 202, one or more of the lens body elements 204, 208, or can be incorporated into additional lens elements. In some embodiments, a lens 102 incorporates fewer than all the lens elements shown in FIG. 1B.

The lens can include a UV absorption layer or a layer that includes UV absorption outside of the optical filter layer. Such a layer can decrease bleaching of the optical filter. In addition, UV absorbing agents can be disposed in any lens component or combination of lens components.

The lens body elements 204, 208 can be made from glass, a polymeric material, a co-polymer, a doped material, another material, or a combination of materials. In some embodiments, one or more portions of the optical filter can be incorporated into the lens coating 202, into one or more lens body elements 204, 208, into a film layer 206, into an adhesive layer, into a polarizing layer, into another lens element, or into a combination of elements.

The lens body elements 204, 208 can be manufactured by any suitable technique, such as, for example, casting or injection molding. Injection molding can expose a lens to temperatures that degrade or decompose certain dyes. Thus, when the optical filter is included in one or more lens body elements, a wider range of dyes may be selected for inclusion in the optical filter when the lens body elements are made by casting than when the lens body is made by injection molding. Further, a wider range of dyes or other optical filter structures may be available when the optical filter is implemented at least partially in a lens coating.

A sunglass lens substantially attenuates light in the visible spectral region. However, the light need not be attenuated uniformly or even generally evenly across the visible spectrum. Instead, the light that is attenuated can be tailored to achieve a specific chroma-enhancing profile or another goal. A sunglass lens can be configured to attenuate light in spectral bands that are selected such that the scene receives one or more of the improvements or characteristics disclosed herein. Such improvements or characteristics can be selected to benefit the wearer during one or more particular activities or in one or more specific environments.

Figure 2A:
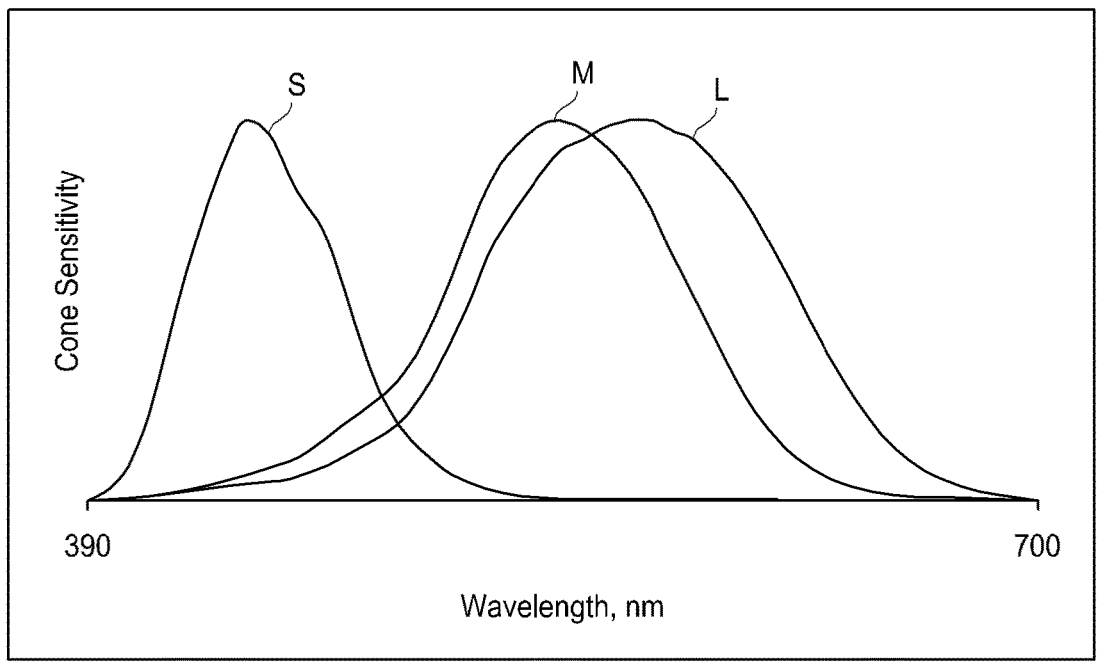
FIG. 2A is a graph showing sensitivity curves for cone photoreceptor cells in the human eye.

To design a filter that increases chroma for an array of colors, one can account for the mechanisms involved in the eye's perception of color. The photopically adapted eye (e.g., the human eye) shows peak sensitivities at 440, 545, and 565 nm. These peak sensitivities correspond to each of three optical sensors found in the eye's retina known as cones. The location and shape of the cone sensitivity profiles have recently been measured with substantial accuracy in Stockman and Sharpe, "The spectral sensitivities of the middle- and long-wavelength-sensitive cones derived from measurements in observers of known genotype," Vision Research 40 (2000), pp. 1711-1737, which is incorporated by reference herein and made a part of this specification. The sensitivity profiles S, M, L for cone photoreceptor cells in the human eye as measured by Stockman and Sharpe are shown in FIG. 2A.

Figure 2B:
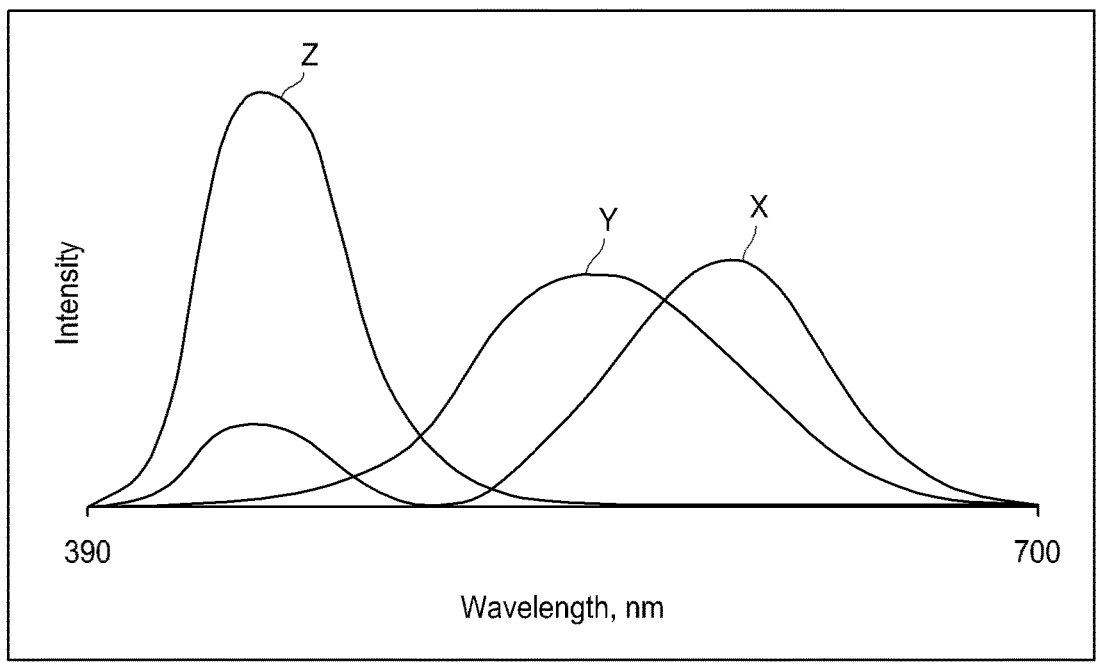
FIG. 2B is a graph showing the 1931 CIE XYZ tristimulus functions.

The cone sensitivity profiles can be converted from sensitivity data to quantities describing color such as, for example, the CIE tristimulus color values. The 1931 CIE XYZ tristimulus functions are shown in FIG. 2B. In some embodiments, the CIE tristimulus color values are used to design an optical filter. For example, the CIE color values can be used to calculate the effect of an optical filter on perceived color using values of chroma, $C^*$, in the CIE $L^*C^*h^*$ color space.

The human cone sensitivities can be converted to the 1931 CIE XYZ color space using the linear transformation matrix M described in Golz and Macleod, "Colorimetry for CRT displays," J. Opt. Soc. Am. A vol. 20, no. 5 (May 2003), pp. 769-781, which is incorporated by reference herein and made a part of this specification. The linear transformation is shown in Eq. 1:

$$M = \begin{bmatrix} 0.17156 & 0.52901 & 0.02199 \\ 0.15955 & 0.48553 & 0.04298 \\ 0.01916 & 0.03989 & 1.03993 \end{bmatrix} \quad \text{(Eq. 1)}$$

$$\begin{bmatrix} L \\ M \\ S \end{bmatrix} = M \begin{bmatrix} X \\ Y \\ Z \end{bmatrix}$$

To solve for the 1931 CIE XYZ color space values (X Y Z), the Stockman and Sharpe 2000 data can be scaled by factors of 0.628, 0.42, and 1.868 for L, M, and S cone sensitivities, respectively, and multiplied by the inverse of the linear transformation matrix M in the manner shown in Eqs. 2-1 and 2-2:

$$\begin{bmatrix} X \\ Y \\ Z \end{bmatrix} = M^{-1} \begin{bmatrix} L \\ M \\ S \end{bmatrix} \quad \text{(Eq. 2-1)}$$

where:

$$M^{-1} = \begin{bmatrix} 2.89186 & -3.13517 & 0.19072 \\ 0.95178 & 1.02077 & -0.02206 \\ -0.01677 & 0.09691 & 0.95724 \end{bmatrix} \quad \text{(Eq. 2-2)}$$

The CIE tristimulus values, X Y Z, can be converted to the 1976 CIE $L^*a^*b^*$ color space coordinates using the nonlinear equations shown in Eqs. 3-1 through 3-7. Where $X_n=95.02$, $Y_n=100.00$, and $Z_n=108.82$, $$L^* = 116\sqrt[3]{Y/Y_n} - 16 \quad \text{(Eq. 3-1)}$$

$$a^* = 500\left(\sqrt[3]{X/X_n} - \sqrt[3]{Y/Y_n}\right) \quad \text{(Eq. 3-2)}$$

$$b^* = 200\left(\sqrt[3]{Y/Y_n} - \sqrt[3]{Z/Z_n}\right) \quad \text{(Eq. 3-3)}$$

If $X/X_n$, $Y/Y_n$, or $Z/Z_n < 0.008856$, then:

$$L^* = 903.3(Y/Y_n) \quad \text{(Eq. 3-4)}$$

$$a^* = 500[f(X/X_n) - f(Y/Y_n)] \quad \text{(Eq. 3-5)}$$

$$b^* = 200[f(Y/Y_n) - f(Z/Z_n)] \quad \text{(Eq. 3-6)}$$

For $\alpha > 0.008856$; $\alpha = X/X_n$, $Y/Y_n$, or $Z/Z_n$ $$f(\alpha) = \sqrt[3]{\alpha}$$

Otherwise:

$$f(\alpha) = 7.87\alpha + 16/116 \quad \text{(Eq. 3-7)}$$

Chroma or $C^*$ can be then be calculated by further conversion from CIE $L^*a^*b^*$ to CIE $L^*C^*h^*$ using Eq. 4:

$$C^* = \sqrt{a^{*2} + b^{*2}} \quad \text{(Eq. 4)}$$

As mentioned above, the colors observed in the physical world are stimulated by wide bands of wavelengths. To simulate this and then calculate the effects of an optical filter, filtered and non-filtered bands of light are used as input to the cone sensitivity space. The effect on chroma can then be predicted via the transformations listed above.

When inputting a spectrum of light to the cone sensitivity space, the mechanism of color recognition in the human eye can be accounted for. Color response by the eye is accomplished by comparing the relative signals of each of the three cones types: S, M, and L. To model this with broad band light, a sum of the intensities at each wavelength in the input spectrum is weighted according to the cone sensitivity at that wavelength. This is repeated for all three cone sensitivity profiles. An example of this calculation is shown in Table A:

TABLE A

| Wavelength λ (nm) | Input light intensity, arbitrary units | | L Cone Sensitivity | | L Weighted light intensity |
|---|---|---|---|---|---|
| 500 | 0.12 | × | 0.27 | = | 0.032 |
| 501 | 0.14 | × | 0.28 | = | 0.039 |
| 502 | 0.16 | × | 0.31 | = | 0.05 |
| 503 | 0.17 | × | 0.33 | = | 0.056 |
| 504 | 0.25 | × | 0.36 | = | 0.09 |
| 505 | 0.41 | × | 0.37 | = | 0.152 |
| 506 | 0.55 | × | 0.39 | = | 0.215 |
| 507 | 0.64 | × | 0.41 | = | 0.262 |
| 506 | 0.75 | × | 0.42 | = | 0.315 |
| 509 | 0.63 | × | 0.44 | = | 0.277 |
| 510 | 0.54 | × | 0.46 | = | 0.248 |
| 511 | 0.43 | × | 0.48 | = | 0.206 |
| 512 | 0.25 | × | 0.49 | = | 0.123 |
| 513 | 0.21 | × | 0.50 | = | 0.105 |
| 514 | 0.18 | × | 0.51 | = | 0.092 |
| 515 | 0.16 | × | 0.52 | = | 0.083 |
| 516 | 0.15 | × | 0.54 | = | 0.081 |
| 517 | 0.13 | × | 0.56 | = | 0.073 |
| 518 | 0.11 | × | 0.57 | = | 0.063 |

TABLE A-continued

| Wavelength λ (nm) | Input light intensity, arbitrary units | | L Cone Sensitivity | | L Weighted light intensity | |
|---|---|---|---|---|---|---|
| 519 | 0.09 | × | 0.59 | = | 0.053 | Total weighted |
| 520 | 0.08 | × | 0.61 | = | 0.049 | light intensity, |
| Sum | 6.15 | | | | 2.664 | normalized 0.433 |

Normalized weighted light intensities for all three cone types can then be converted to the 1931 CIE XYZ color space via a linear transformation matrix, M. This conversion facilitates further conversion to the 1976 CIE L*a*b* color space and the subsequent conversion to the CIE L*C*h color space to yield chroma values.

To simulate the effect of a filter placed between the eye and the physical world, an input band of light can be modified according to a prospective filter's absorption characteristics. The weighted light intensity is then normalized according to the total sum of light that is transmitted through the filter.

In certain embodiments, to test the effect of a filter on various colors of light, the spectral profile or at least the bandwidth of an input is determined first. The appropriate bandwidth for the model's input is typically affected by the environment of use for the optical filter. A reasonable bandwidth for a sunglass lens can be about 30 nm, since this bandwidth represents the approximate bandwidth of many colors perceived in the natural environment. Additionally, 30 nm is a narrow enough bandwidth to permit transmitted light to fall within responsive portions of the cone sensitivity functions, which are approximately twice this bandwidth. A filter designed using a 30 nm input bandwidth will also improve the chroma of colors having other bandwidths, such as 20 nm or 80 nm. Thus, the effect of a filter on chroma can be determined using color inputs having a 30 nm bandwidth or another suitable bandwidth that is sensitive to a wide range of natural color bandwidths.

Other bandwidths are possible. The bandwidth can be significantly widened or narrowed from 30 nm while preserving the chroma-enhancing properties of many filter designs. The 30 nm bandwidth described above is representative of wider or narrower input bandwidths that can be used to produce desired features of an optical filter. The term "bandwidth" is used herein in its broad and ordinary sense. In some embodiments, the bandwidth of a peak encompasses the full width of a peak at half of the peak's maximum value (FWHM value) and any other commonly used measurements of bandwidth.

A sample calculation of the normalized L weighted light intensity using the 30 nm bandwidth and an example filter is shown in Table B:

TABLE B

| Wavelength λ (nm) | Incoming light intensity arbitrary units | | Filter T % | | L Cone Sensitivity | | Filtered L weighted light intensity | |
|---|---|---|---|---|---|---|---|---|
| 499 | 0 | × | 0.12 | × | 0.25 | = | 0.00 | |
| 500 | 1 | × | 0.34 | × | 0.27 | = | 0.09 | |
| 501 | 1 | × | 0.41 | × | 0.28 | = | 0.11 | |
| 502 | 1 | × | 0.42 | × | 0.31 | = | 0.13 | |
| 503 | 1 | × | 0.44 | × | 0.33 | = | 0.15 | |
| 504 | 1 | × | 0.51 | × | 0.36 | = | 0.18 | |
| 505 | 1 | × | 0.55 | × | 0.37 | = | 0.20 | |
| 506 | 1 | × | 0.61 | × | 0.39 | = | 0.24 | |
| 507 | 1 | × | 0.78 | × | 0.41 | = | 0.32 | |
| 508 | 1 | × | 0.75 | × | 0.42 | = | 0.32 | |
| 509 | 1 | × | 0.85 | × | 0.44 | = | 0.37 | |
| 510 | 1 | × | 0.87 | × | 0.46 | = | 0.40 | |
| 511 | 1 | × | 0.91 | × | 0.48 | = | 0.44 | |
| 512 | 1 | × | 0.95 | × | 0.49 | = | 0.47 | |
| 513 | 1 | × | 0.96 | × | 0.50 | = | 0.48 | |
| 514 | 1 | × | 0.97 | × | 0.51 | = | 0.49 | |
| 515 | 1 | × | 0.96 | × | 0.52 | = | 0.50 | |
| 516 | 1 | × | 0.98 | × | 0.54 | = | 0.53 | |
| 517 | 1 | × | 0.76 | × | 0.56 | = | 0.43 | |
| 518 | 1 | × | 0.75 | × | 0.57 | = | 0.43 | |
| 519 | 1 | × | 0.61 | × | 0.59 | = | 0.36 | |
| 520 | 1 | × | 0.55 | × | 0.61 | = | 0.34 | |
| 521 | 1 | × | 0.48 | × | 0.72 | = | 0.35 | |
| 522 | 1 | × | 0.42 | × | 0.78 | = | 0.33 | |
| 523 | 1 | × | 0.41 | × | 0.81 | = | 0.33 | |
| 524 | 1 | × | 0.35 | × | 0.84 | = | 0.29 | |
| 525 | 1 | × | 0.33 | × | 0.85 | = | 0.28 | |
| 526 | 1 | × | 0.31 | × | 0.88 | = | 0.27 | |
| 527 | 1 | × | 0.28 | × | 0.87 | = | 0.24 | |
| 528 | 1 | × | 0.27 | × | 0.89 | = | 0.24 | |
| 529 | 1 | × | 0.22 | × | 0.91 | = | 0.20 | Total Filtered |
| 530 | 0 | × | 0.18 | × | 0.92 | = | 0.00 | L Weighted |
| 531 | 0 | × | 0.15 | × | 0.93 | = | 0.00 | Light Intensity, |
| Sum | 30 | | 18.4 | | | | 9.51 | Normalized 0.52 |

In some embodiments, an optical filter is designed by using spectral profiles of candidate filters to calculate the effect of the candidate filters on chroma. In this way, changes in the filter can be iteratively checked for their effectiveness in achieving a desired result. Alternatively, filters can be designed directly via numerical simulation. Examples and comparative examples of optical filters and the effects of those optical filters on chroma are described herein. In each case, the chroma of input light passing through each filter is compared to the chroma of the same input without filtering. Plots of "absorptance %" against visible spectrum wavelengths show the spectral absorptance profile of the example or comparative example optical filter. Each plot of "chroma, C*, relative" against visible spectrum wavelengths shows the relative chroma of a 30 nm wide light stimulus of uniform intensity after the stimulus passes through a wavelength-dependent optical filter as a thinner curve on the plot, with the center wavelength of each stimulus being represented by the values on the horizontal axis. Each plot of "chroma, C*, relative" also shows the relative chroma of the same 30 nm wide light stimulus passing through a neutral filter that attenuates the same average percentage of light within the bandwidth of the stimulus as the wavelength-dependent optical filter.

One goal of filter design may be to determine the overall color appearance of a lens. In some embodiments, the perceived color of overall light transmitted from the lens is bronze, amber, violet, gray, or another color. In some cases, the consumer has preferences that are difficult to account for quantitatively. In certain cases, lens color adjustments can be accomplished within the model described in this disclosure. The impact of overall color adjustments to the filter design can be calculated using a suitable model. In some cases, color adjustments can be made with some, little, or no sacrifice to the chroma characteristics being sought. In some embodiments, a lens has an overall color with a relatively low chroma value. For example, the lens can have a chroma value of less than 60. A chroma-increasing optical filter used in such a lens may provide increased colorfulness for at least some colors as compared to when the same optical filter is used in a lens with an overall color having a higher chroma value.

Figure 3:
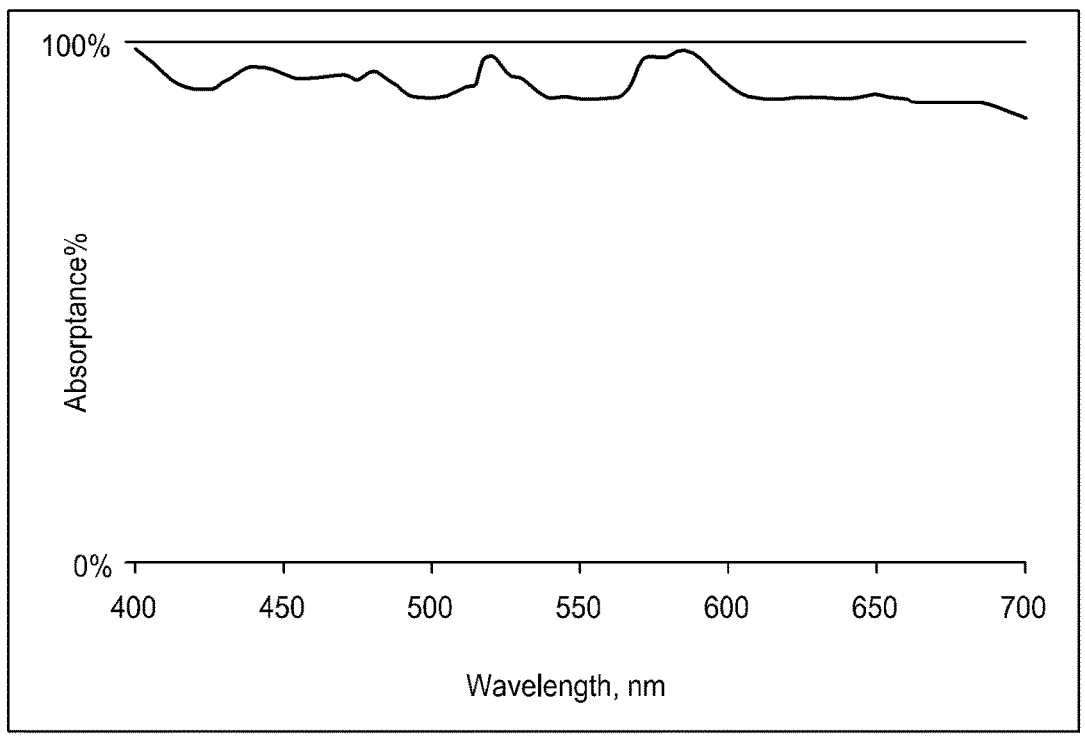
FIG. 3 is a graph showing the spectral absorptance profile of a sunglass lens with an optical filter.
Figure 4A:
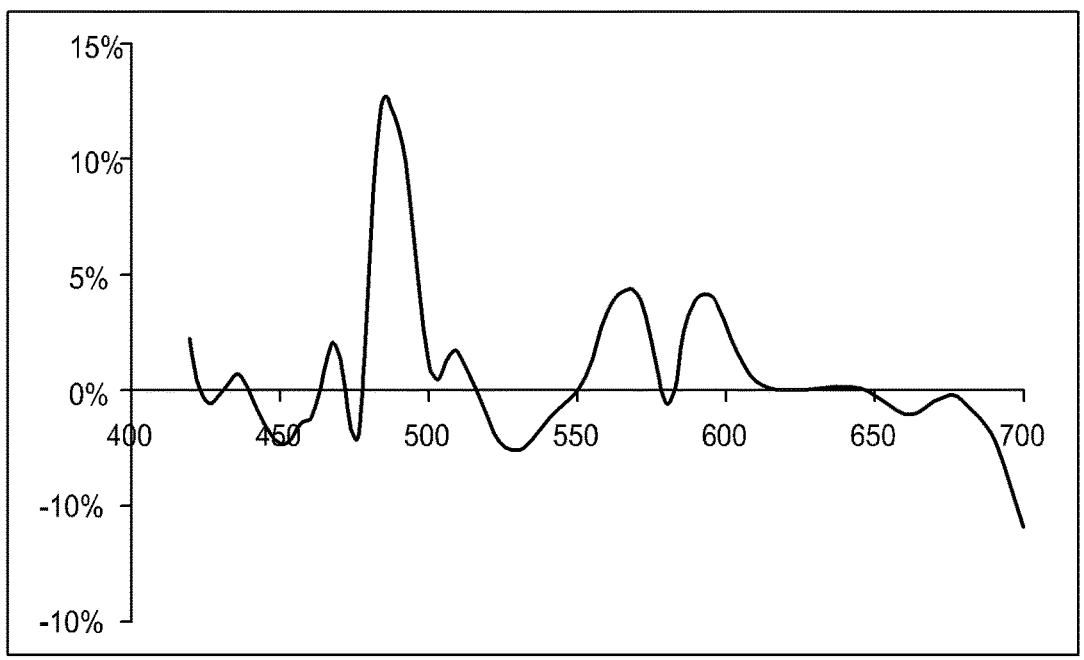
FIG. 4A is a graph showing the percentage difference in chroma of a lens with the absorptance profile shown in FIG. 3 compared to a neutral filter.
Figure 4B:
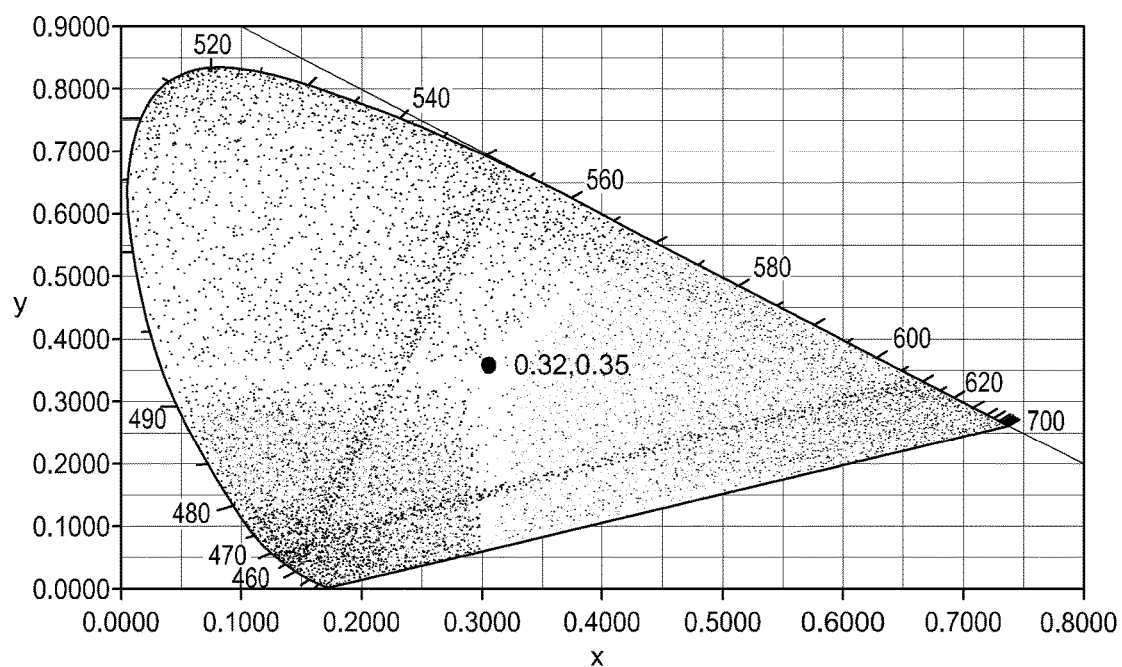
FIG. 4B is a chromaticity diagram for the lens having the absorptance profile shown in FIG. 3.

A comparative example of an optical filter has properties as shown in FIGS. 3, 4A, and 4B. FIG. 3 shows the absorptance profile of a comparative example lens with an optical filter, the LAGOON 189-02 grey lens available from Maui Jim, Inc. of Peoria, Ill. FIG. 4A shows a percentage difference in chroma between the output of a lens having the absorptance profile shown in FIG. 3 and the output of a filter that uniformly attenuates the same average percentage of light within each stimulus band as the lens of FIG. 3, wherein the input is a 30 nm uniform intensity stimulus and the horizontal axis indicates the center wavelength of each stimulus band. As can be seen in FIG. 4A, the comparative example lens characterized by the absorptance profile shown in FIG. 3 provides some increase in chroma in certain spectral regions and some decrease in chroma in other spectral regions, compared to a filter that provides neutral attenuation for each 30 nm stimulus. The average percentage attenuation provided by the neutral attenuation filter for each stimulus is the same as the average percentage attenuation provided by the comparative example filter. Specific bandwidths of light with uniform intensity were used to calculate the relative chroma profiles in this disclosure. In figures where the relative chroma profile of a filter is shown, the scale is maintained constant throughout this disclosure such that relative chroma shown in one figure can be compared to relative chroma shown in other figures, unless otherwise noted. In some figures, the chroma profile of a filter may be clipped in order to show detail and maintain consistent scale.

Figure 5:
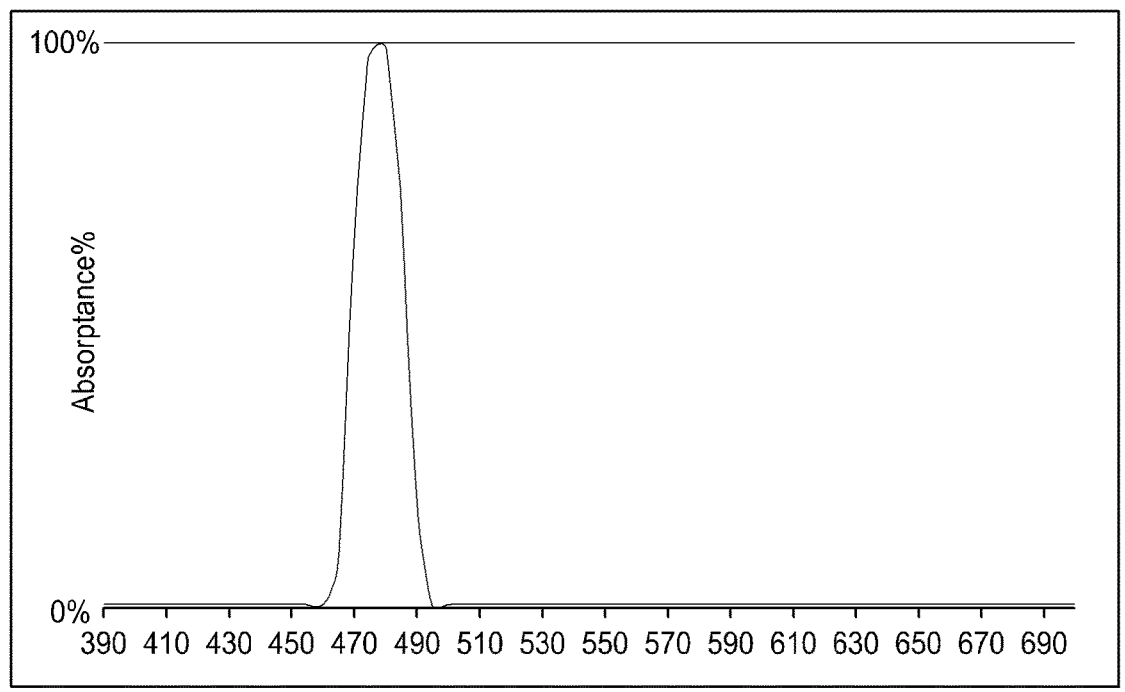
FIG. 5 is a graph showing the spectral absorptance profile of an optical filter.
Figure 6A:
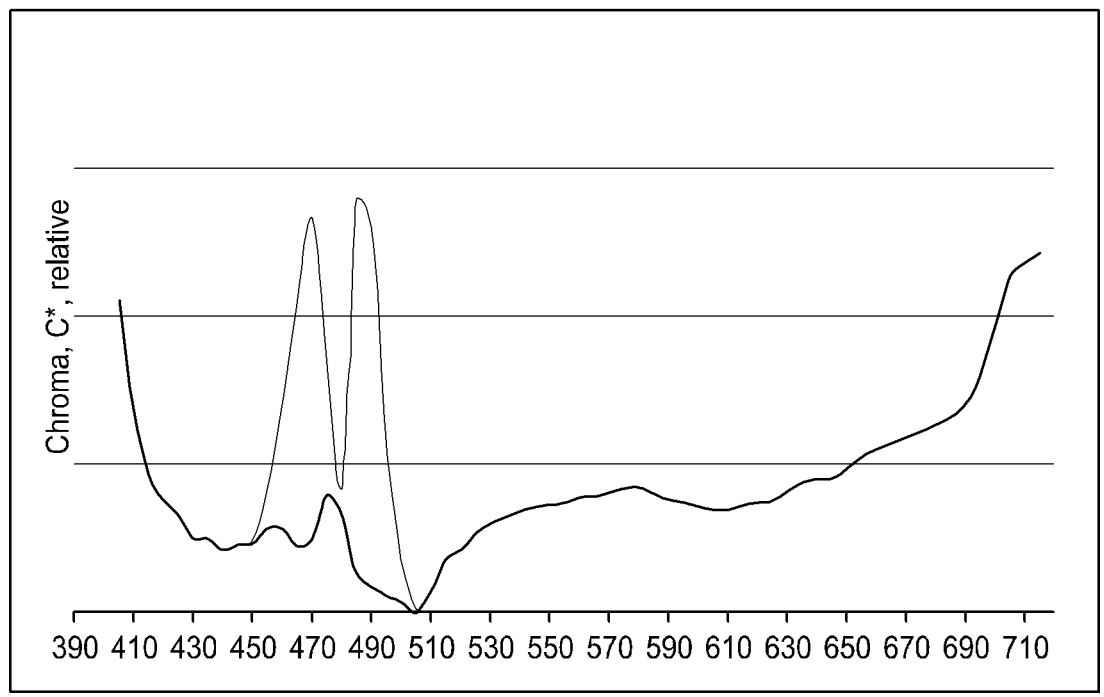
FIG. 6A is a graph showing the chroma profile of a filter with the absorptance profile shown in FIG. 5 and of neutral filter.
Figure 6B:
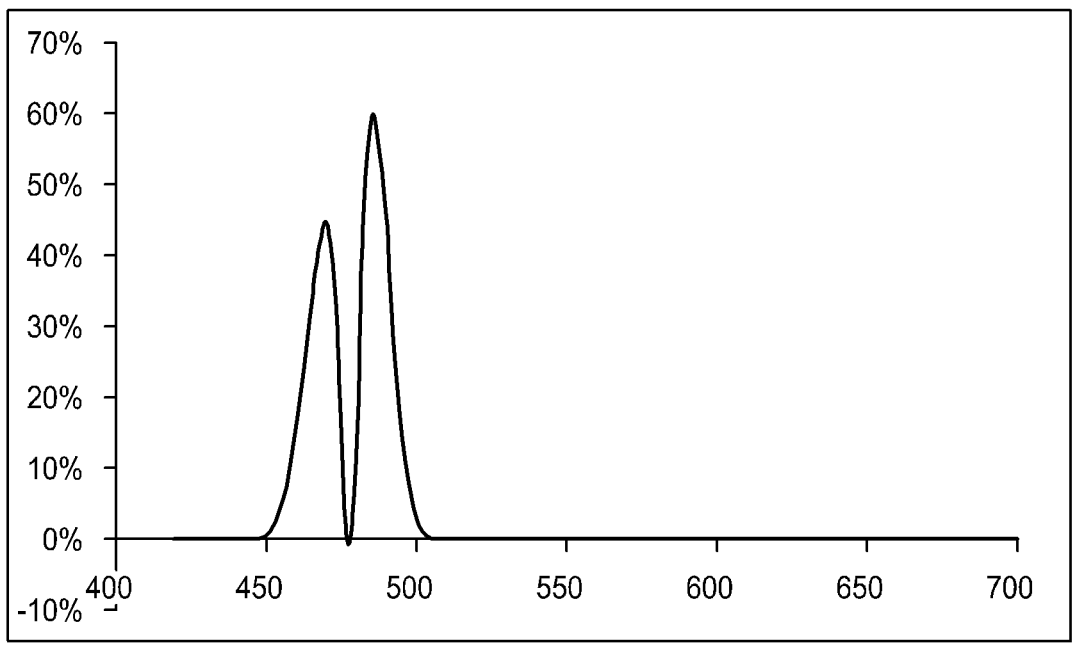
FIG. 6B is a graph showing the percentage difference in chroma of a filter with the absorptance profile shown in FIG. 5 compared to a neutral filter.

In some embodiments, an optical filter is configured to increase or maximize chroma in the blue to blue-green region of the visible spectrum. A filter with such a configuration can have an absorptance peak centered at about 478 nm or at about 480 nm, as shown in FIG. 5. The full width at half maximum (FWHM) of the absorptance peak shown in FIG. 5 is about 20 nm. However, other absorptance peak widths can be used, including bandwidths greater than or equal to about 10 nm, greater than or equal to about 15 nm, greater than or equal to about 20 nm, less than or equal to about 60 nm, less than or equal to about 50 nm, less than or equal to about 40 nm, between about 10 nm and about 60 nm, or between any of the other foregoing values. The bandwidth of an absorptance peak can be measured in any suitable fashion in addition to or in place of FWHM. For example, the bandwidth of an absorptance peak can include the full width of a peak at 80% of the maximum. FIG. 6A shows the relative chroma, as a function of wavelength, of a filter having the absorptance profile shown in FIG. 5. Once again, the thicker black line corresponds to the chroma profile of a neutral filter having the same integrated light transmittance within each 30 nm stimulus band as within each corresponding band of the optical filter shown in FIG. 5. FIG. 6B shows a percentage difference in chroma between the output of the optical filter of FIG. 5 and the output of a filter that uniformly attenuates the same average percentage of light within each stimulus band as the optical filter of FIG. 5, wherein the input is a 30 nm uniform intensity stimulus and the horizontal axis indicates the center wavelength of each stimulus band.

Figure 7:
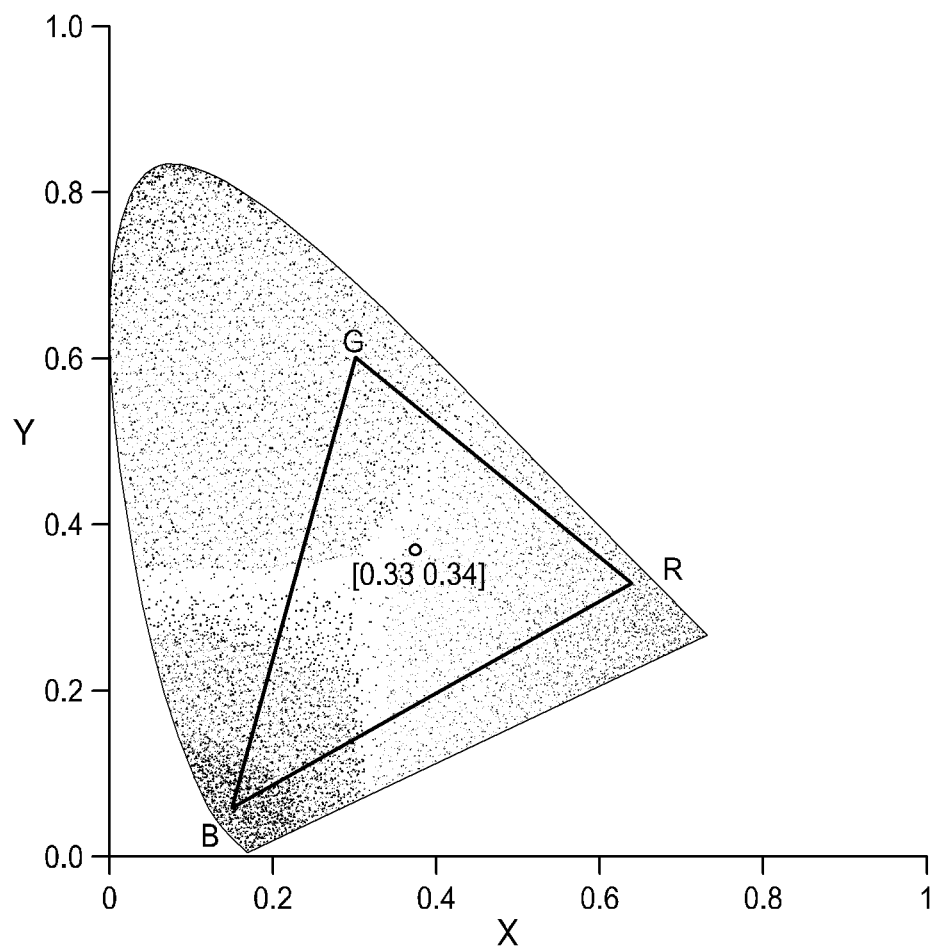
FIG. 7 is a chromaticity diagram for an optical filter having the absorptance profile shown in FIG. 5.

A CIE xy chromaticity diagram for the optical filter having an absorptance profile as shown in FIG. 5 is provided in FIG. 7. The chromaticity diagram shows the chromaticity of the filter as well as the gamut of an RGB color space. Each of the chromaticity diagrams provided in this disclosure shows the chromaticity of the associated filter or lens, where the chromaticity is calculated using CIE illuminant D65.

In certain embodiments, an optical filter is configured to increase or maximize chroma in the blue region of the visible spectrum. A filter with such a configuration can provide an absorptance peak with a center wavelength at about 453 nm, at about 450 nm, or between about 445 nm and about 460 nm. The bandwidth of the absorptance peak can be greater than or equal to about 10 nm, greater than or equal to about 15 nm, greater than or equal to about 20 nm, or another suitable value.

Figure 8:
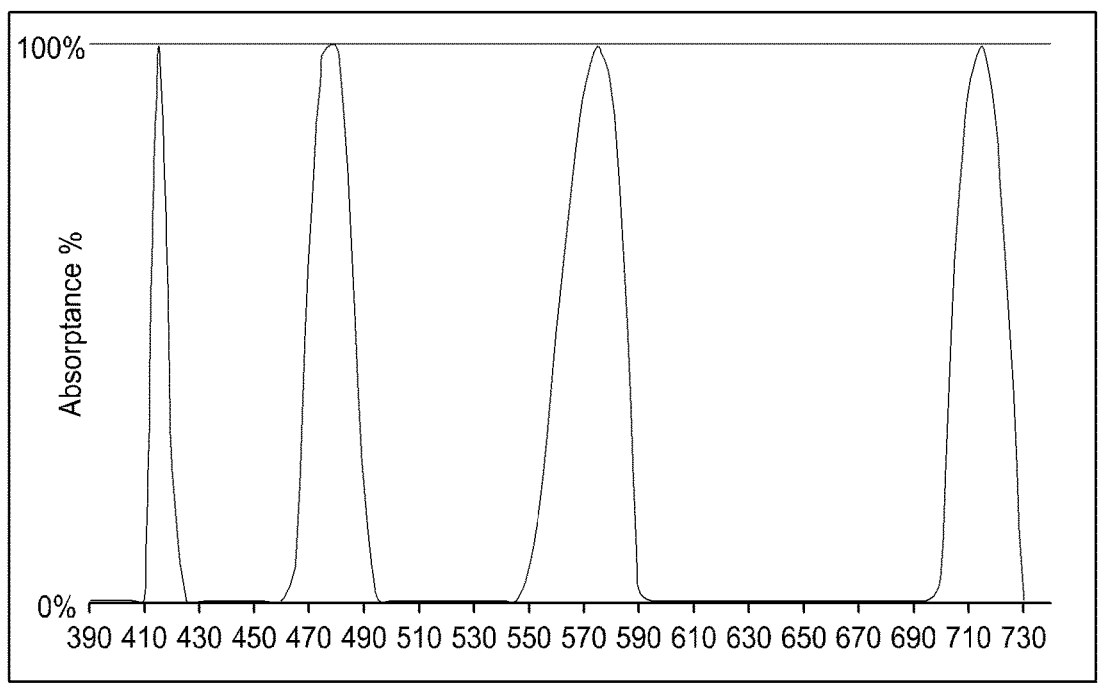
FIG. 8 is a graph showing the spectral absorptance profile of another optical filter.
Figure 9A:
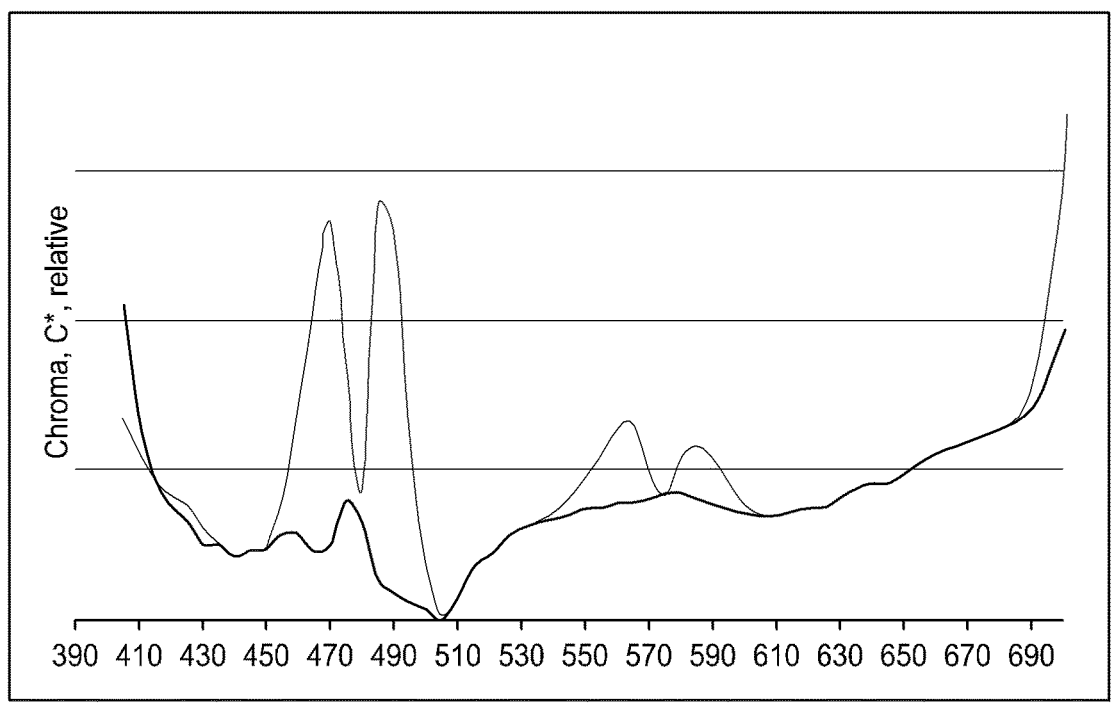
FIG. 9A is a graph showing the chroma profile of a filter with the absorptance profile shown in FIG. 8 and of a neutral filter.
Figure 9B:
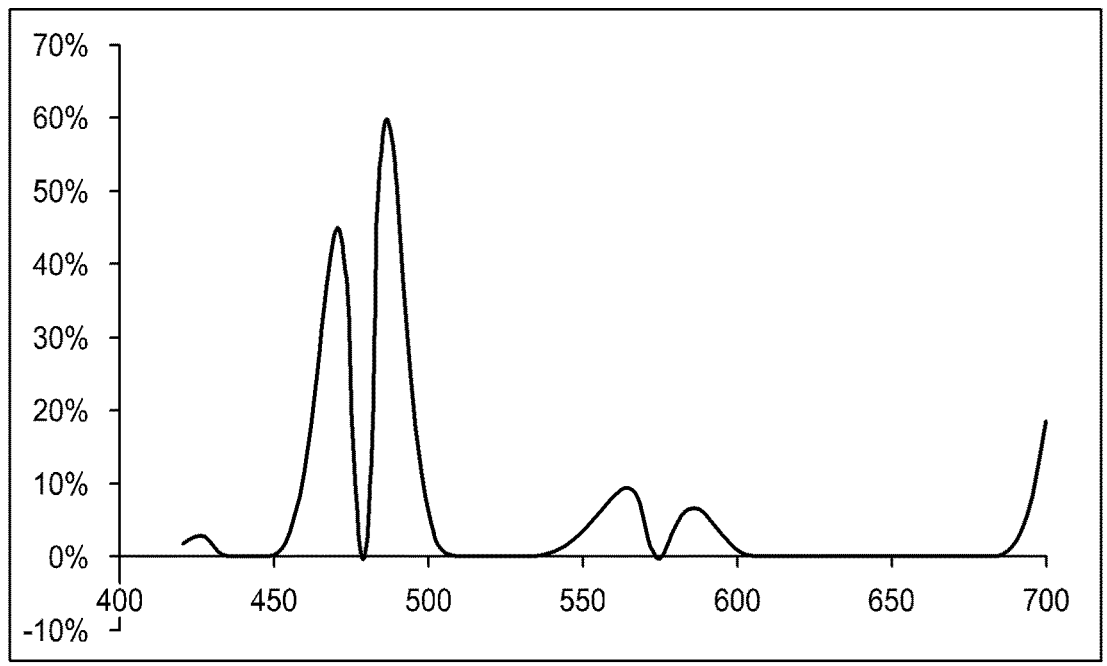
FIG. 9B is a graph showing the percentage difference in chroma of a filter with the absorptance profile shown in FIG. 8 compared to a neutral filter.
Figure 10:
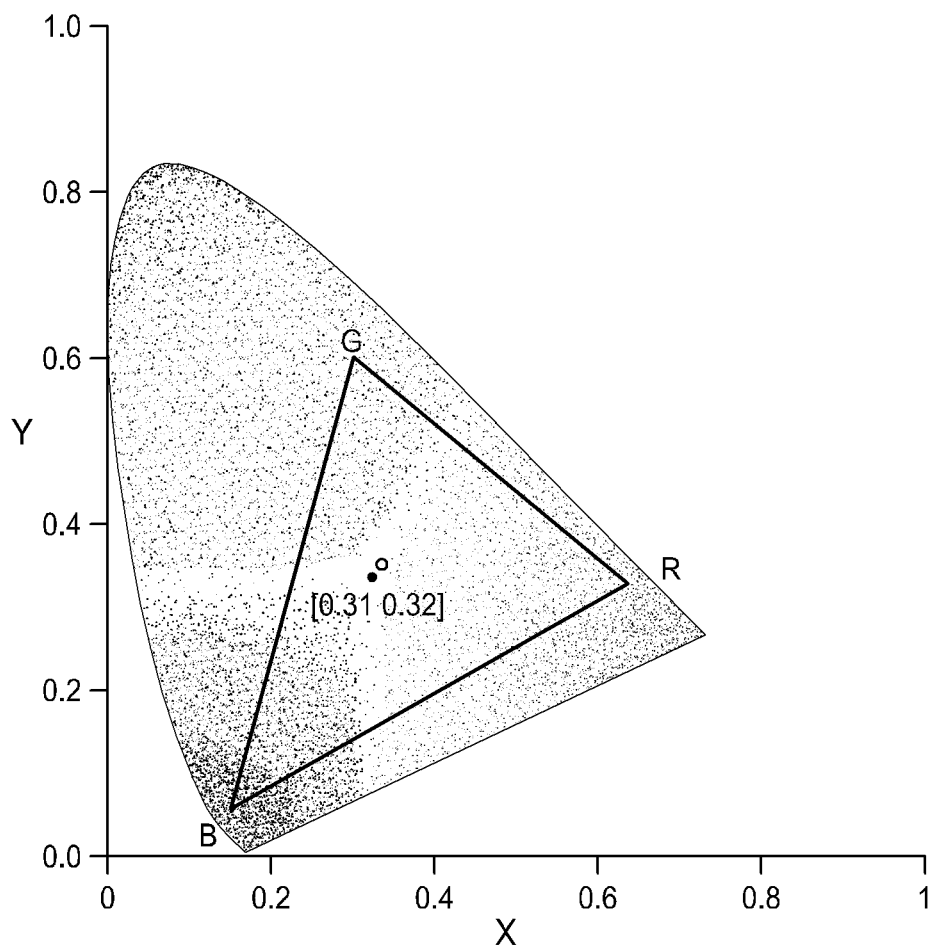
FIG. 10 is a chromaticity diagram for an optical filter having the absorptance profile shown in FIG. 8.

In some embodiments, an optical filter is configured to increase or maximize chroma across several, many, or most colors, or at least many colors that are commonly encountered in the environment of the wearer. Such an optical filter can include a plurality of absorptance peaks. For example, FIG. 8 shows a spectral absorptance profile of an embodiment of an optical filter including four absorptance peaks with center wavelengths at about 415 nm, about 478 nm, about 574 nm, and about 715 nm. Relative chroma profiles and a chromaticity diagram for the example filter are shown in FIGS. 9A, 9B and 10. The relative chroma profile shown in FIG. 9A shows that the optical filter of FIG. 8 provides a substantial increase in chroma in at least four spectral windows compared to a neutral filter having the same integrated light transmittance within each 30 nm stimulus band as within each corresponding band of the optical filter shown in FIG. 8. FIG. 9B shows a percentage difference in chroma between the output of the optical filter of FIG. 8 and the output of a filter that uniformly attenuates the same average percentage of light within each stimulus band as the optical filter of FIG. 8, wherein the input is a 30 nm uniform intensity stimulus and the horizontal axis indicates the center wavelength of each stimulus band.

Many other variations in the location and number of absorptance peaks are possible. For example, some embodiments significantly attenuate light between about 558 nm and about 580 nm by providing a peak at about 574 nm and adding an additional peak at about 561 nm. Such embodiments can provide substantially greater chroma in the green region, which is centered near about 555 nm.

In certain embodiments, an optical filter increases chroma in the visible spectrum by increasing the degree to which light within the bandwidth of each absorptance peak is attenuated. The degree of light attenuation within the spectral bandwidth of an absorptance peak can be characterized by an "attenuation factor" defined as the integrated absorptance peak area within the spectral bandwidth of the absorptance peak divided by the spectral bandwidth of the absorptance peak. An example of an absorptance peak with an attenuation factor of 1 is a square wave. Such an absorptance peak attenuates substantially all light within its spectral bandwidth and substantially no light outside its spectral bandwidth. In contrast, an absorptance peak with an attenuation factor of less than 0.5 attenuates less than half of the light within its spectral bandwidth and may attenuate a significant amount of light outside its spectral bandwidth. It may not be possible to make an optical filter having an absorptance peak with an attenuation factor of exactly 1, although it is possible to design an optical filter having an absorptance peak with an attenuation factor that is close to 1.

In certain embodiments, an optical filter is configured to have one or more absorptance peaks with an attenuation factor close to 1. Many other configurations are possible. In some embodiments, an optical filter has one or more absorptance peaks with an attenuation factor greater than or equal to about 0.8, greater than or equal to about 0.9, greater than or equal to about 0.95, greater than or equal to about 0.98, between about 0.8 and about 0.99, greater than or equal to about 0.8 and less than 1, or between any of the other foregoing values. Collectively, the foregoing limitations on attenuation factor can be called "attenuation factor criteria." In certain embodiments, the attenuation factor of each absorptance peak in an optical filter meets one or more of the attenuation factor criteria. In some embodiments, the attenuation factor of each absorptance peak having a maximum absorptance over a certain absorptance threshold in an optical filter meets one or more of the attenuation factor criteria. The absorptance threshold can be about 0.5, about 0.7, about 0.9, about 1, between 0.5 and 1, or another value. It is understood that while certain spectral features are described herein with reference to an optical filter, each of the spectral features can equally apply to the spectral profile of a lens containing the optical filter, unless indicated otherwise.

Figure 11:
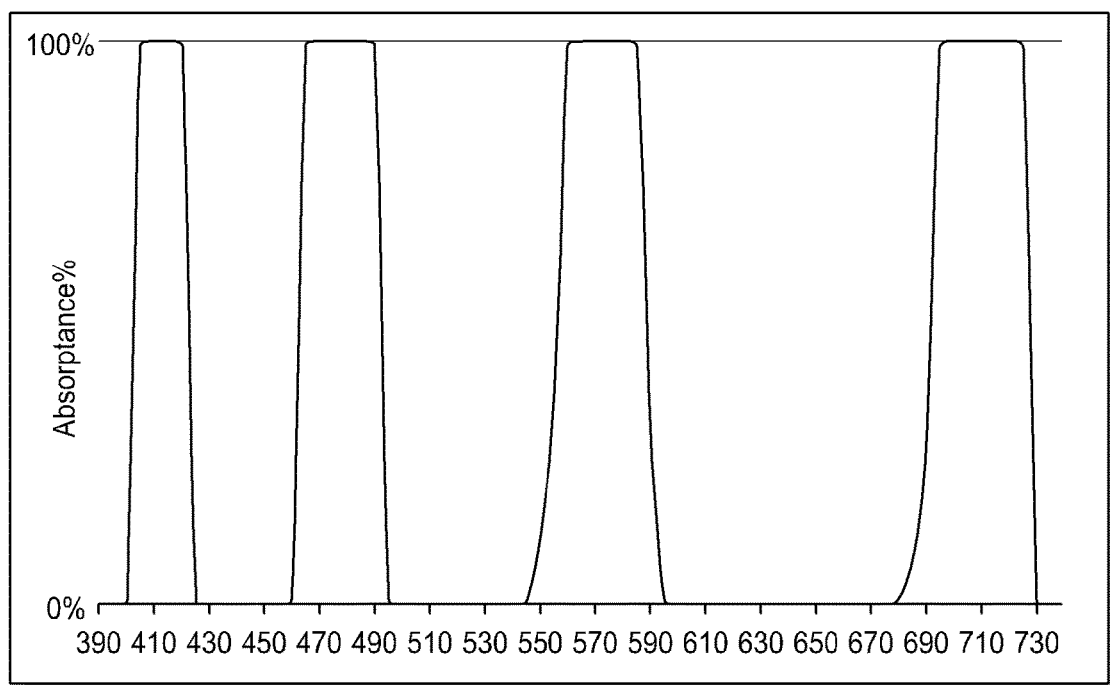
FIG. 11 is a graph showing the spectral absorptance profile of another optical filter.
Figure 12A:
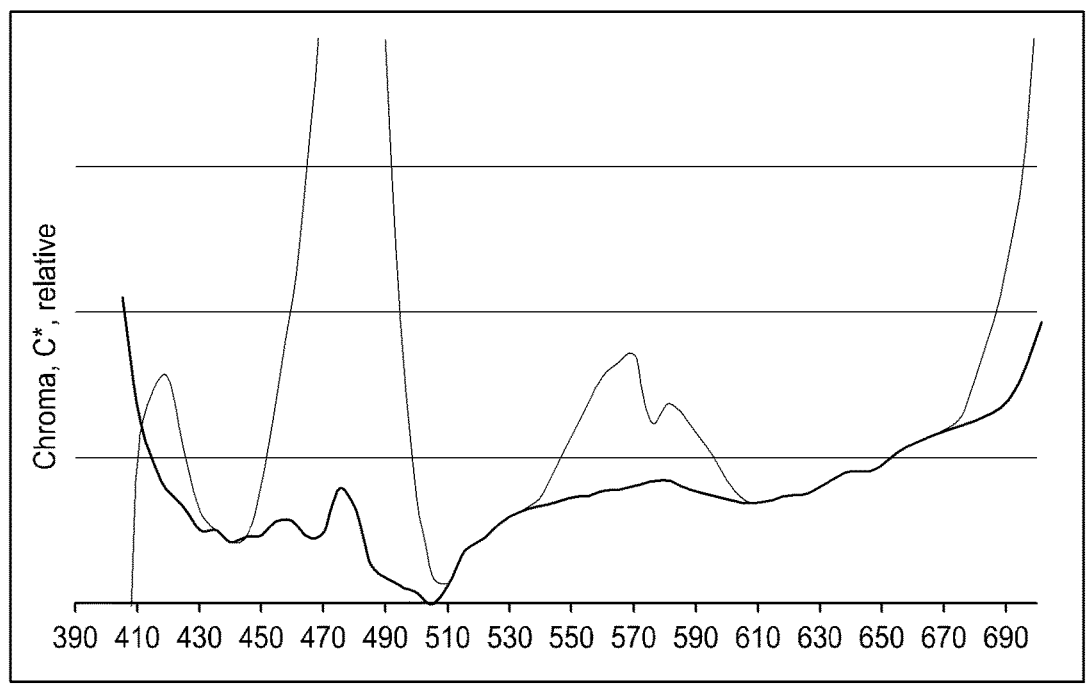
FIG. 12A is a graph showing the chroma profile of a filter with the absorptance profile shown in FIG. 11 and of a neutral filter.
Figure 12B:
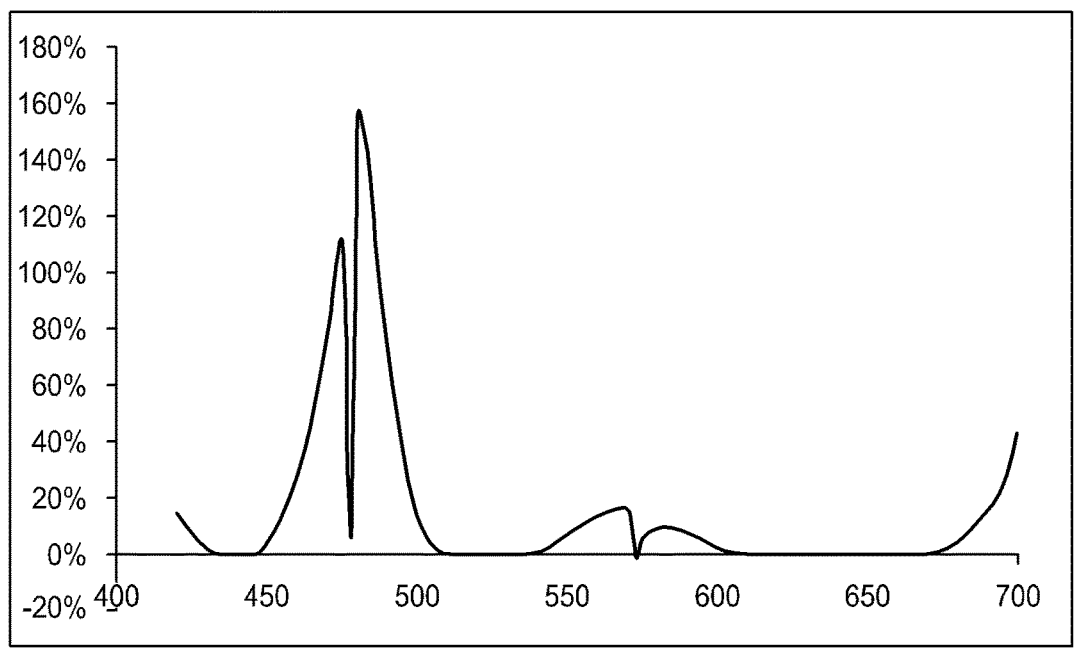
FIG. 12B is a graph showing the percentage difference in chroma of a filter with the absorptance profile shown in FIG. 11 compared to a neutral filter.
Figure 13:
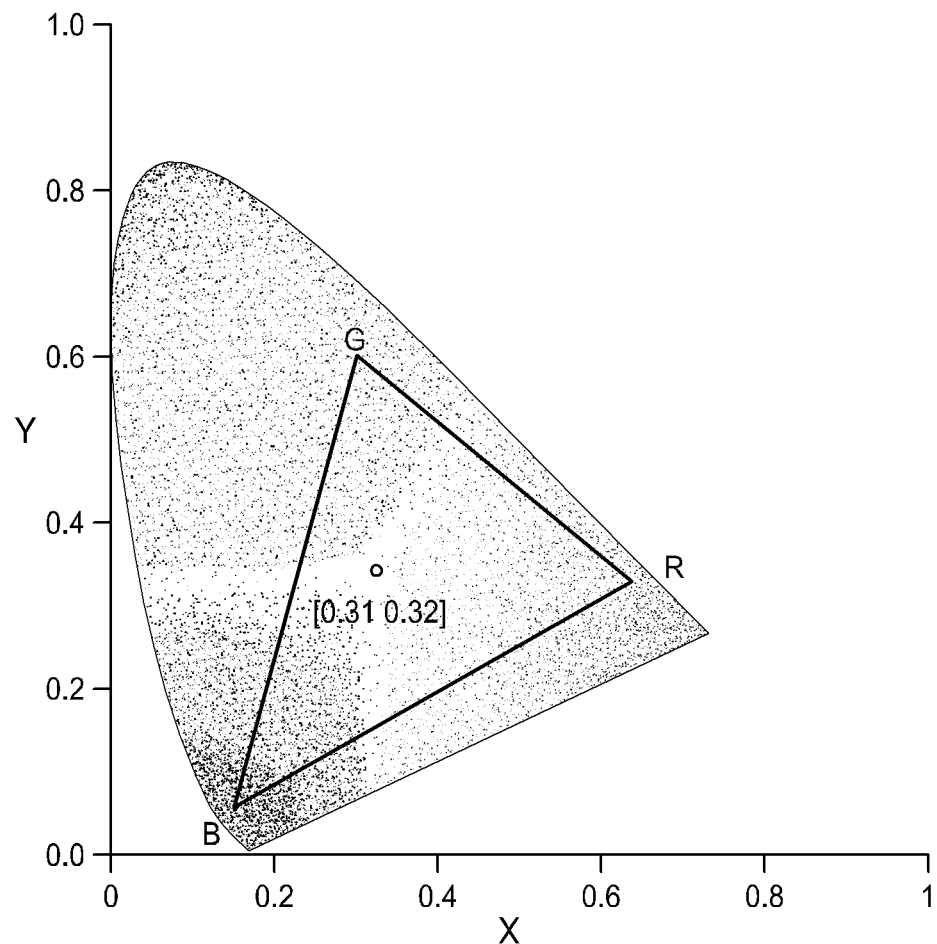
FIG. 13 is a chromaticity diagram for an optical filter having the absorptance profile shown in FIG. 11.

In some embodiments, an optical filter has absorptance peaks in each of four spectral bands, each of which has an attenuation factor greater than or equal to about 0.95. Because it is rare to observe monochromatic light in the physical world, some narrow bands of light can be nearly or completely blocked out without significant detriment to the overall variety of perceived spectral colors in the natural world. In other words, the optical filter can be employed in everyday vision without the loss of any substantial visual information. A spectral absorptance profile of an example optical filter having these attributes is shown in FIG. 11. Relative chroma profiles and a chromaticity diagram for the same optical filter are shown in FIGS. 12A, 12B, and 13. The relative chroma profiles shown in FIG. 12A include the chroma profile of a neutral filter having the same integrated light transmittance within each 30 nm stimulus band as within each corresponding band of the optical filter shown in FIG. 8, indicated by a thicker black line, and the chroma profile of the wavelength-dependent filter shown in FIG. 8, which is indicated by a thinner black line and is generally higher than the neutral filter profile. FIG. 12B shows a percentage difference in chroma between the output of the optical filter of FIG. 11 and the output of a filter that uniformly attenuates the same average percentage of light within each stimulus band as the optical filter of FIG. 11, wherein the input is a 30 nm uniform intensity stimulus and the horizontal axis indicates the center wavelength of each stimulus band.

In some embodiments, an optical filter has one or more absorptance peaks with a bandwidth that is at least partially within a chroma enhancement window. The width of the chroma enhancement window can be between about 22 nm and about 45 nm, between about 20 nm and about 50 nm, greater than or equal to about 20 nm, greater than or equal to about 15 nm, or another suitable bandwidth range. In certain embodiments, an optical filter is configured such that every absorptance peak with an attenuation factor greater than or equal to an absorptance threshold has a bandwidth within a chroma enhancement window. For example, the bandwidth of each of the absorptance peaks can be greater than or equal to about 10 nm, greater than or equal to about 15 nm, greater than or equal to about 20 nm, greater than or equal to about 22 nm, less than or equal to about 60 nm, less than or equal to about 50 nm, less than or equal to about 40 nm, between about 10 nm and about 60 nm, between about 20 nm and about 45 nm, or between any of the other foregoing values.

Figure 14:
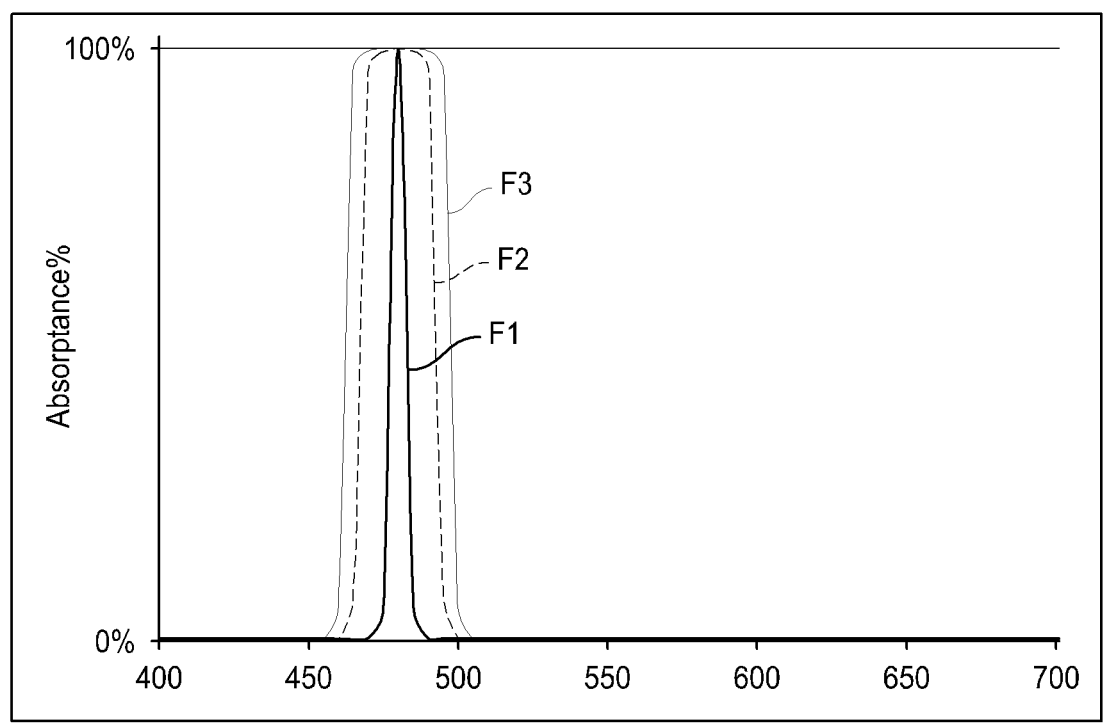
FIG. 14 is a graph showing the spectral absorptance profiles of three different optical filters.
Figure 15A:
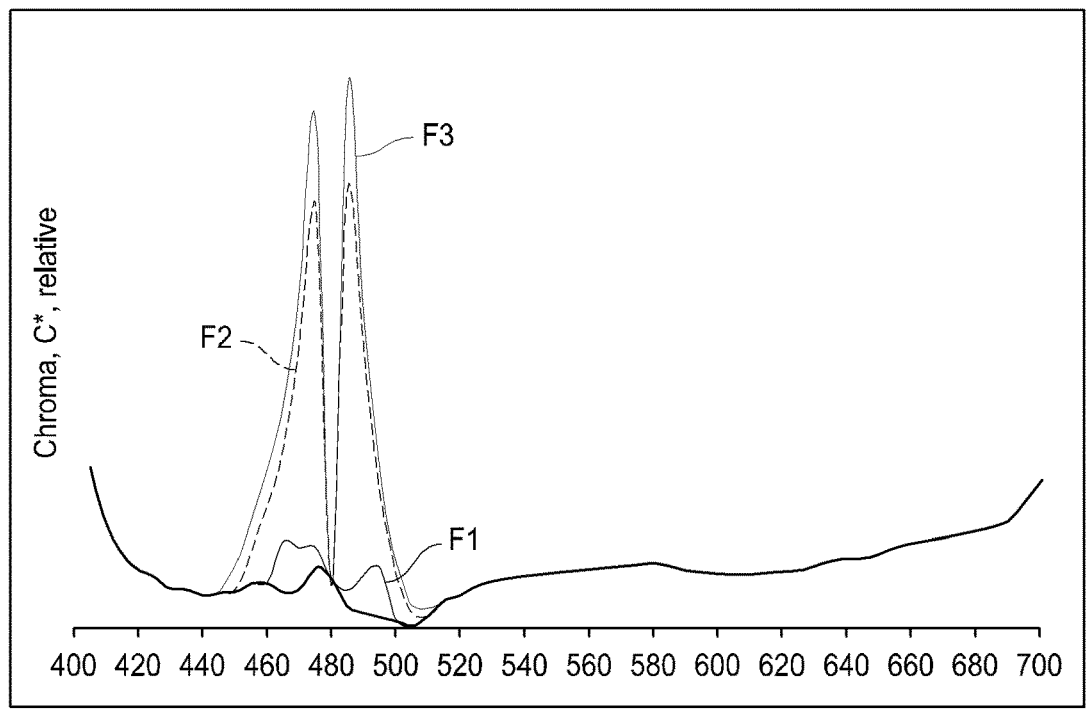
FIG. 15A is a graph showing the chroma profiles of three filters, each filter with one of the absorptance profiles shown in FIG. 14, and of a neutral filter.
Figure 15B:
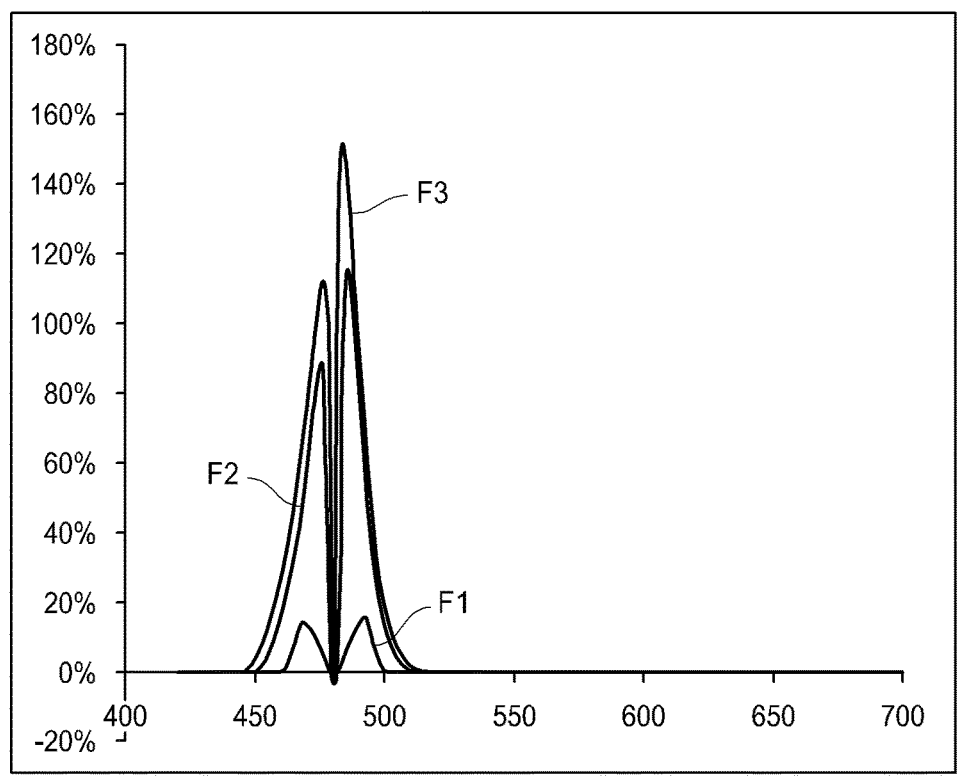
FIG. 15B is a graph showing the percentage differences in chroma of the three different filters with the absorptance profiles shown in FIG. 14 compared to a neutral filter.
Figure 16:
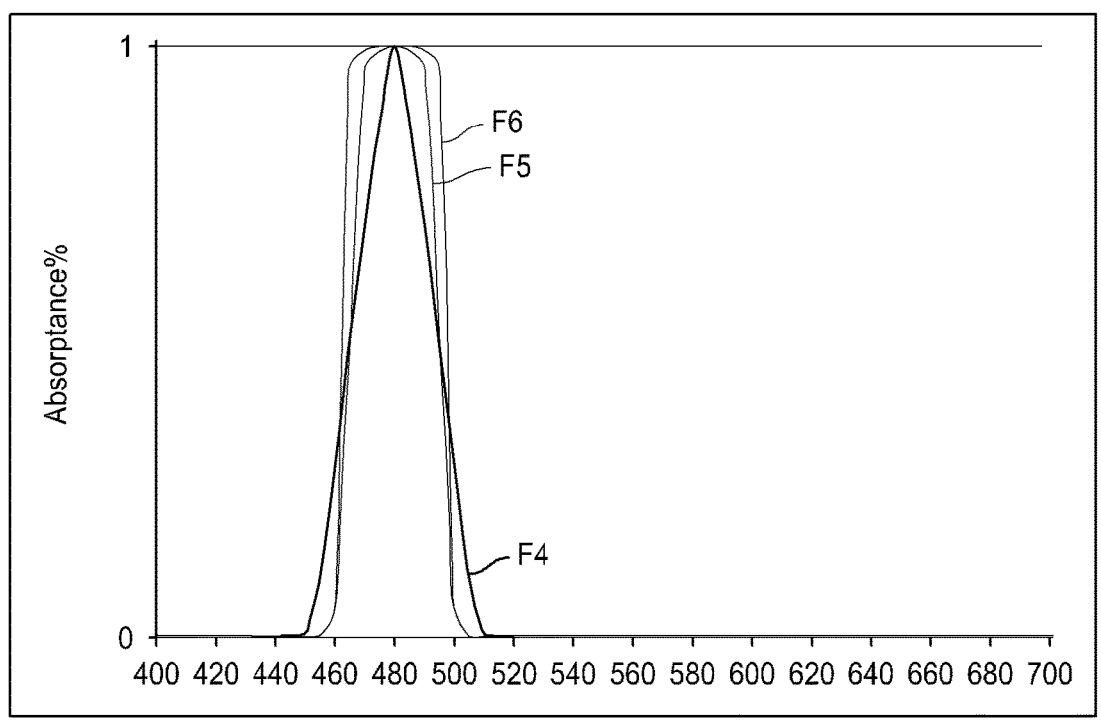
FIG. 16 is a graph showing the spectral absorptance profiles of three different optical filters.

Variations in the bandwidth (e.g., the FWHM value) and in the slopes of the sides of an absorptance peak can have marked effects on chroma. Generally, increases in the FWHM and/or slopes of the chroma-enhancing peaks are accompanied by increases in chroma and vice-versa, in the case of chroma-lowering peaks. In FIGS. 14 and 16, example optical filters are shown where the FWHM and slopes of an absorptance peak are separately varied. The effects of these variations on chroma are shown in the accompanying chroma profiles in FIGS. 15A-15B and 17A-17B. In FIG. 14, an overlay of absorptance peaks centered at 478 nm for three different filters F1, F2, and F3 is shown. The absorptance peaks have equal side slopes and varying FWHM values, with filter F1 having the lowest FWHM value and filter F3 having the highest FWHM value. The relative chroma profile in FIG. 15A shows the effect of the filters F1, F2, and F3 shown in FIG. 14 on chroma. The absorptance and chroma profiles of each of the filters F1, F2, and F3 are shown with the same corresponding line style in each graph, with a neutral filter included as a thick line in FIG. 15A. FIG. 15B shows a percentage difference in chroma between the output of the three optical filters F1, F2, and F3 of FIG. 14 and the output of a filter that uniformly attenuates the same average percentage of light within each stimulus band as the optical filters of FIG. 14, wherein the input in each case is the same 30 nm uniform intensity stimulus and the horizontal axis indicates the center wavelength of each stimulus band.

FIG. 16 shows an overlay of three absorptance peaks centered at 478 nm, with equal FWHM and varying slopes.

Figure 17A:
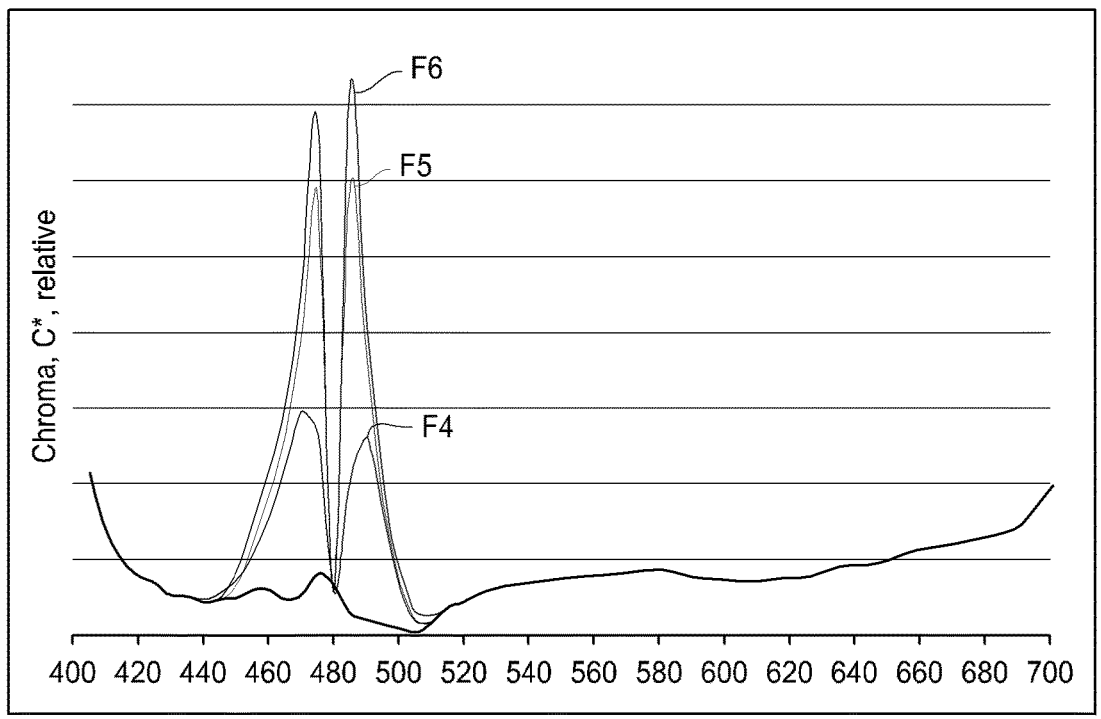
FIG. 17A is a graph showing the chroma profiles of three filters, each filter with one of the absorptance profiles shown in FIG. 16, and of a neutral filter.
Figure 17B:
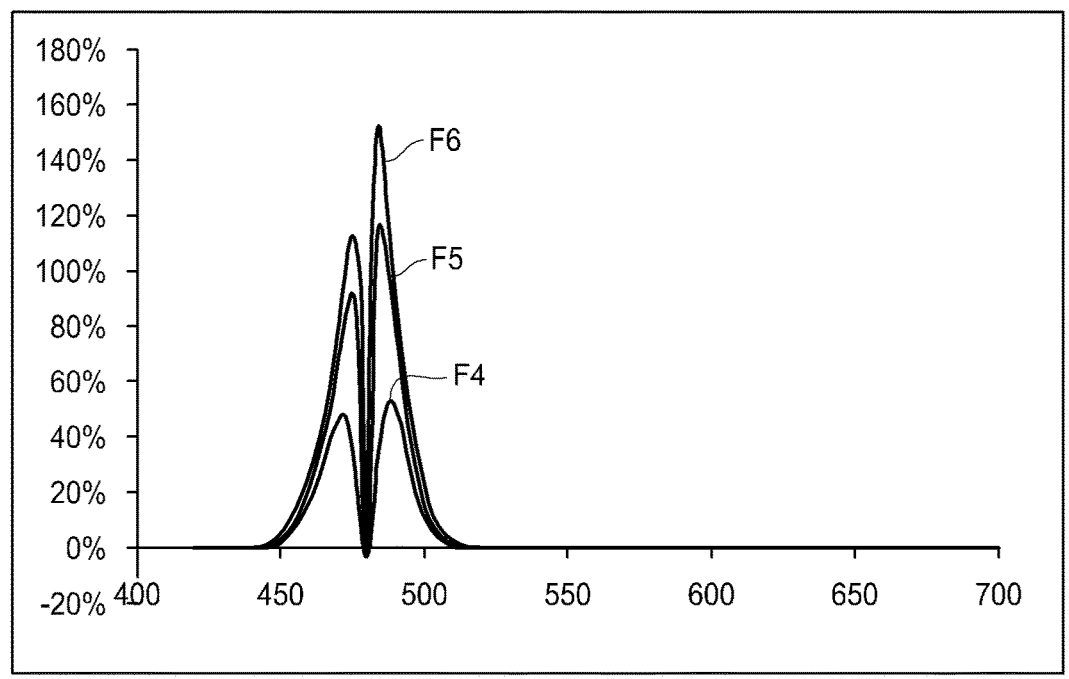
FIG. 17B graph showing the percentage differences in chroma of the three different filters with the absorptance profiles shown in FIG. 16 compared to a neutral filter.

FIG. 17A shows the effect of the filters F4, F5, and F6 shown in FIG. 16 on chroma, with a neutral filter again included as a thick solid line. FIG. 17B shows a percentage difference in chroma between the output of the three optical filters F4, F5, and F6 of FIG. 16 and the output of a filter that uniformly attenuates the same average percentage of light within each stimulus band as the optical filters of FIG. 16, wherein the input in each case is the same 30 nm uniform intensity stimulus and the horizontal axis indicates the center wavelength of each stimulus band.

Figure 18:
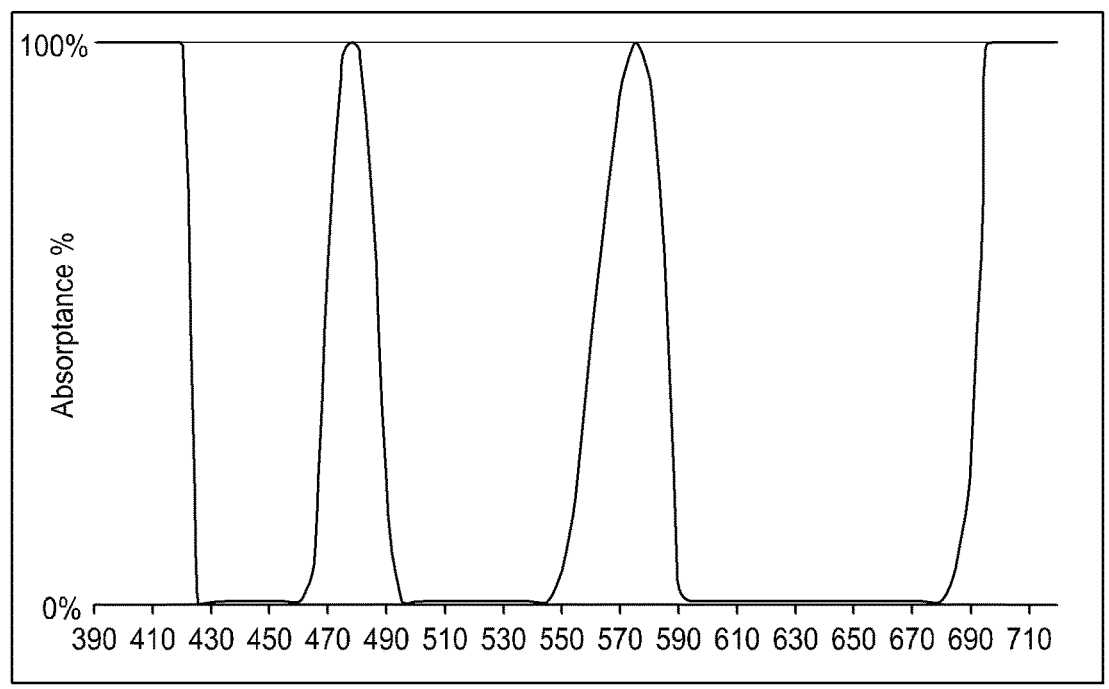
FIG. 18 is a graph showing the spectral absorptance profile of another optical filter.
Figure 19A:
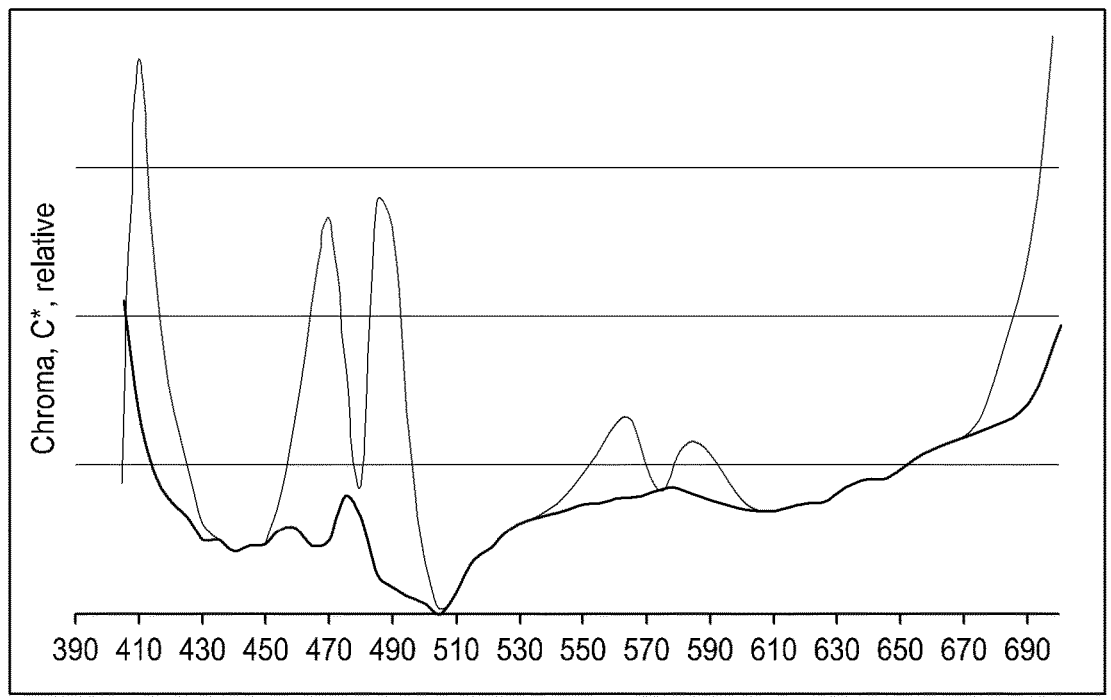
FIG. 19A is a graph showing the chroma profile of a filter with the absorptance profile shown in FIG. 18 and of a neutral filter.
Figure 19B:
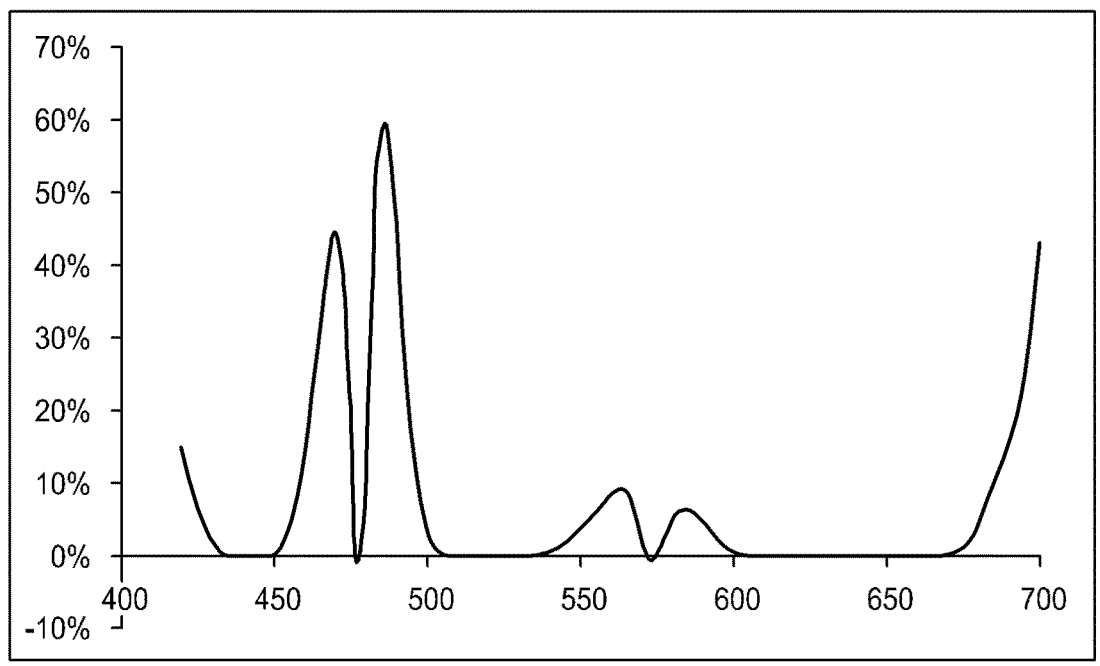
FIG. 19B is a graph showing the percentage difference in chroma of a filter with the absorptance profile shown in FIG. 18 compared to a neutral filter.
Figure 20:
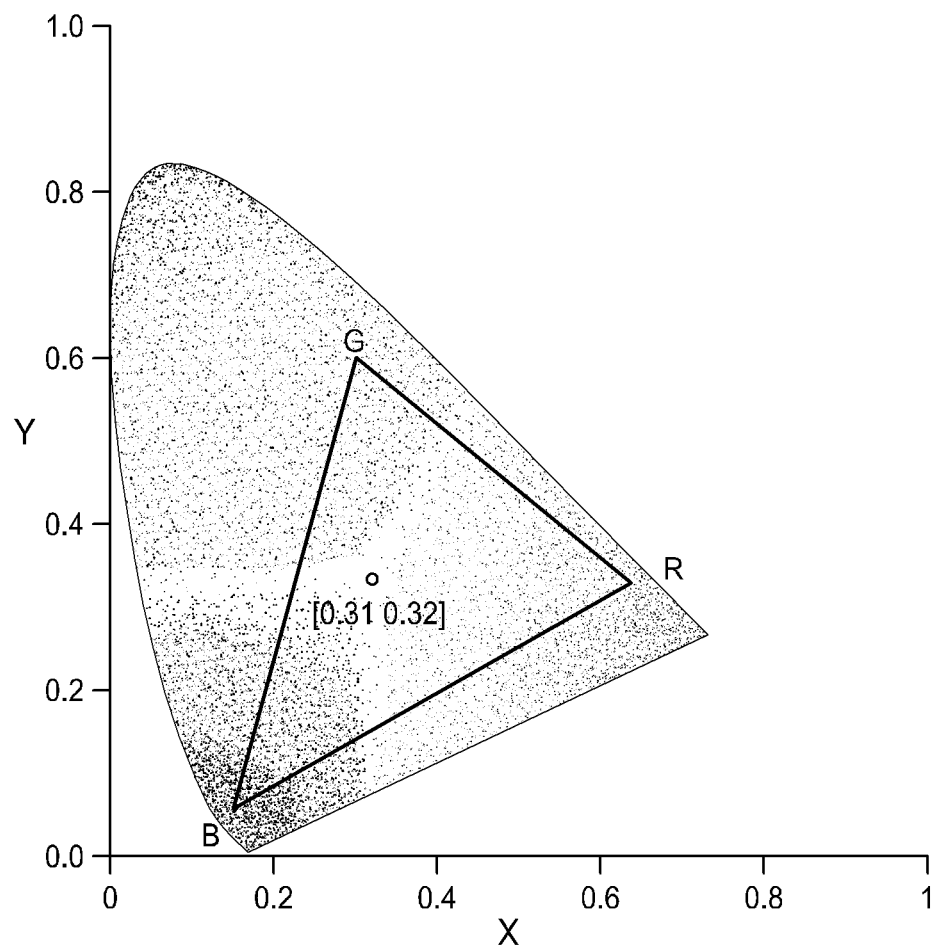
FIG. 20 is a chromaticity diagram for an optical filter having the absorptance profile shown in FIG. 18.

Returning to the optical filter shown in FIG. 11, the outer two absorptance peaks centered at 415 nm and 715 nm have outside slopes (i.e., at the lower limit of the 415 nm peak and at the upper limit of the 715 nm peak) that affect light wavelengths at generally the fringes of the visible spectrum. In some embodiments, the absorptance profiles of these peaks can be altered to significantly, mostly, or almost entirely attenuate light at wavelengths outside of about the 400 nm to 700 nm range, which can be regarded as the dominant portion of the visible range. The spectral absorptance profile of an example optical filter having these attributes is shown in FIG. 18. Relative chroma profiles and the chromaticity diagram for the same optical filter are shown in FIGS. 19A, 19B, and 20. FIG. 19B shows a percentage difference in chroma between the output of the optical filter of FIG. 18 and the output of a filter that uniformly attenuates the same average percentage of light within each stimulus band as the optical filter of FIG. 18, wherein the input is a 30 nm uniform intensity stimulus and the horizontal axis indicates the center wavelength of each stimulus band.

By controlling chroma according to the techniques disclosed herein, the chroma of one or more color bands can also be decreased in situations where less colorfulness in those color bands is desired. In some embodiments, an optical filter can be configured to decrease chroma in one or more color bands and increase chroma in other color bands. For example, eyewear designed for use while hunting ducks can include one or more lenses with an optical filter configured to lower the chroma of a blue background and increase the chroma for green and brown feathers of a duck in flight. More generally, an optical filter can be designed to be activity-specific by providing relatively lower chroma in one or more spectral regions associated with a specific background (e.g., the ground, the sky, an athletic field or court, a combination, etc.) and providing relatively high chroma in one or more spectral regions associated with a specific foreground or object (e.g., a ball). Alternatively, an optical filter can have an activity-specific configuration by providing increased chroma in both a background spectral region and an object spectral region.

Figure 21:
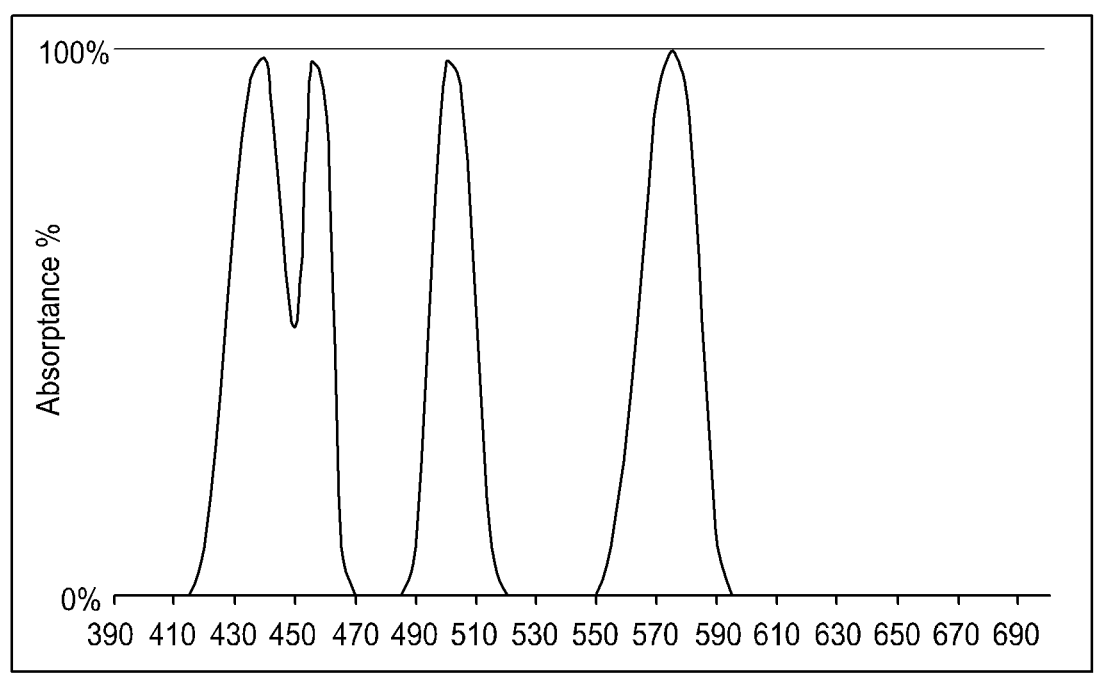
FIG. 21 is a graph showing the spectral absorptance profile of another optical filter.
Figure 22A:
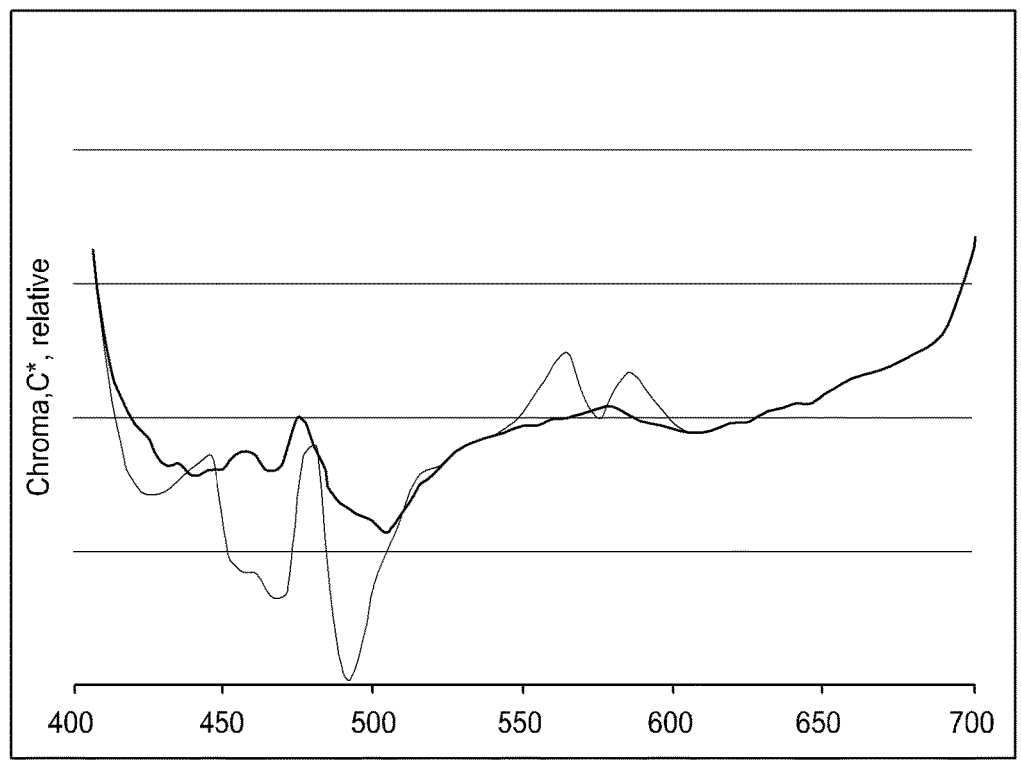
FIG. 22A is a graph showing the chroma profile of a filter with the absorptance profile shown in FIG. 21 and of a neutral filter.
Figure 22B:
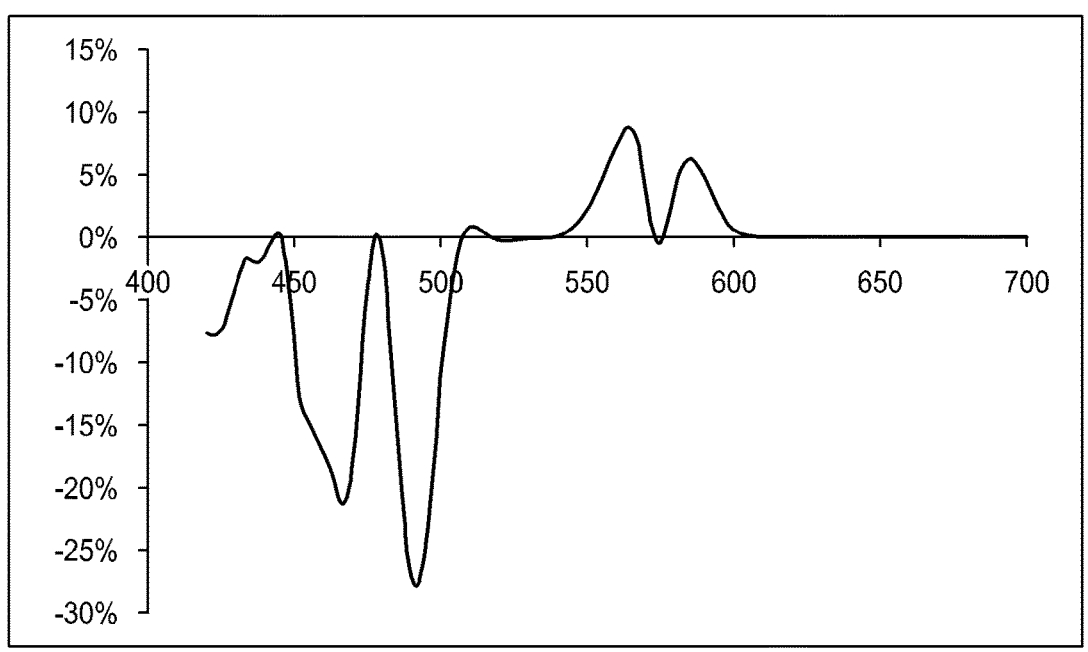
FIG. 22B is a graph showing the percentage difference in chroma of a filter with the absorptance profile shown in FIG. 21 compared to a neutral filter.
Figure 23:
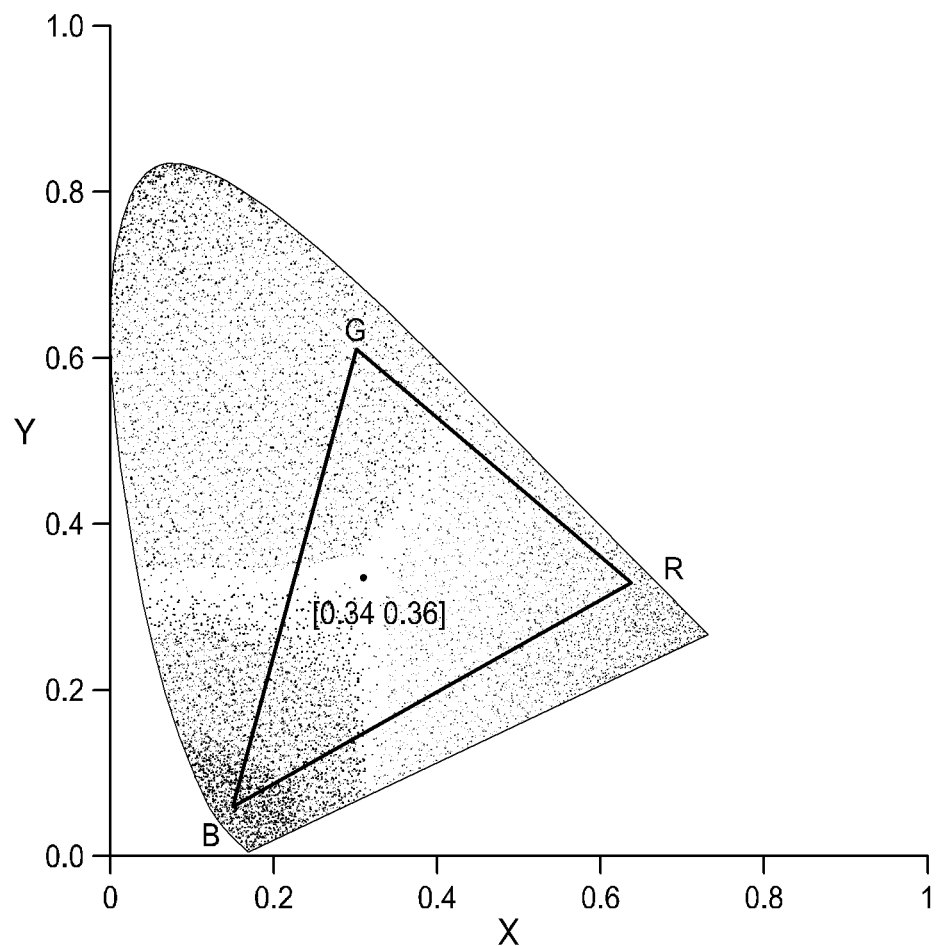
FIG. 23 is a chromaticity diagram for an optical filter having the absorptance profile shown in FIG. 21.

The ability to identify and discern moving objects is generally called "Dynamic Visual Acuity." An increase in chroma in the spectral region of the moving object is expected to improve this quality because increases in chroma are generally associated with higher color contrast. Furthermore, the emphasis and de-emphasis of specific colors can further improve Dynamic Visual Acuity. A spectral absorptance profile of an example optical filter configured to increase Dynamic Visual Acuity is shown in FIG. 21. The optical filter shown is configured to provide high chroma in the green to orange spectral region and relatively lower chroma in the blue spectral region. The relative chroma profiles and the chromaticity diagram of the same optical filter are shown in FIGS. 22A, 22B, and 23. FIG. 22B shows a percentage difference in chroma between the output of the optical filter of FIG. 21 and the output of a filter that uniformly attenuates the same average percentage of light within each stimulus band as the optical filter of FIG. 21, wherein the input is a 30 nm uniform intensity stimulus and the horizontal axis indicates the center wavelength of each stimulus band.

Figure 24:
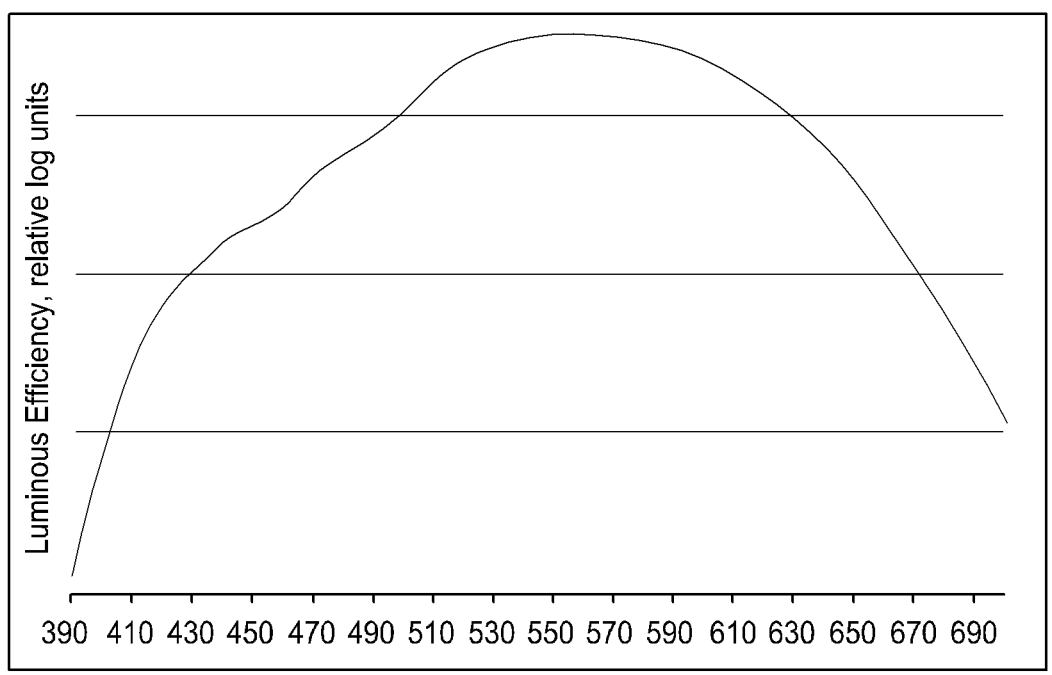
FIG. 24 is a graph showing the luminous efficiency profile of the human eye.

In some embodiments, an optical filter is configured to account for variation in luminous efficiency over the visible spectrum. By accounting for luminous efficiency, the filter can compensate for differences in relative sensitivities at different wavelengths of the human eye to various color bands can be compared. Luminous efficiency over the visible spectrum, consistent with the Stockman and Sharpe cone sensitivity data, is shown in FIG. 24.

Figure 25:
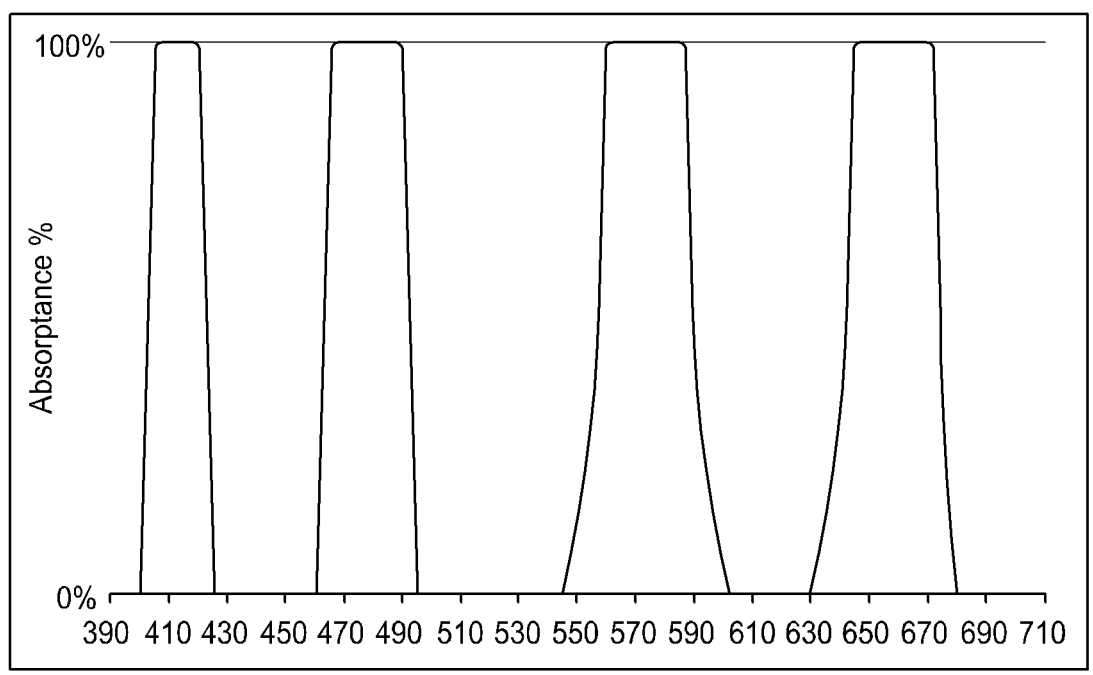
FIG. 25 is a graph showing the spectral absorptance profile of another optical filter.
Figure 26A:
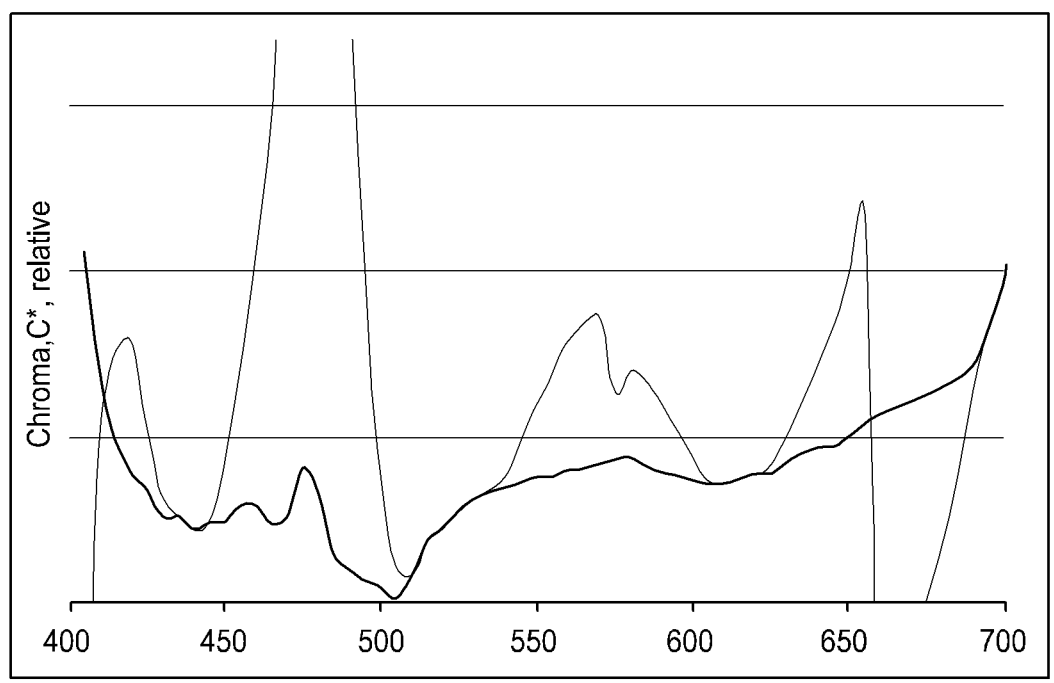
FIG. 26A is a graph showing the chroma profile of a filter with the absorptance profile shown in FIG. 25 and of a neutral filter.
Figure 26B:
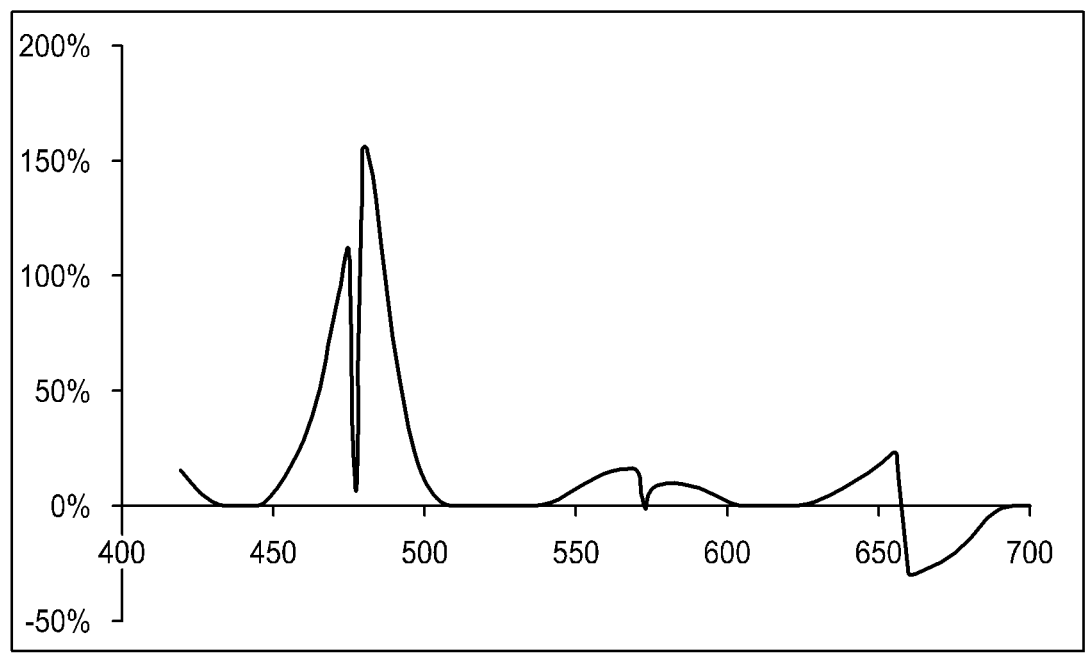
FIG. 26B is a graph showing the percentage difference in chroma of a filter with the absorptance profile shown in FIG. 25 compared to a neutral filter.
Figure 27:
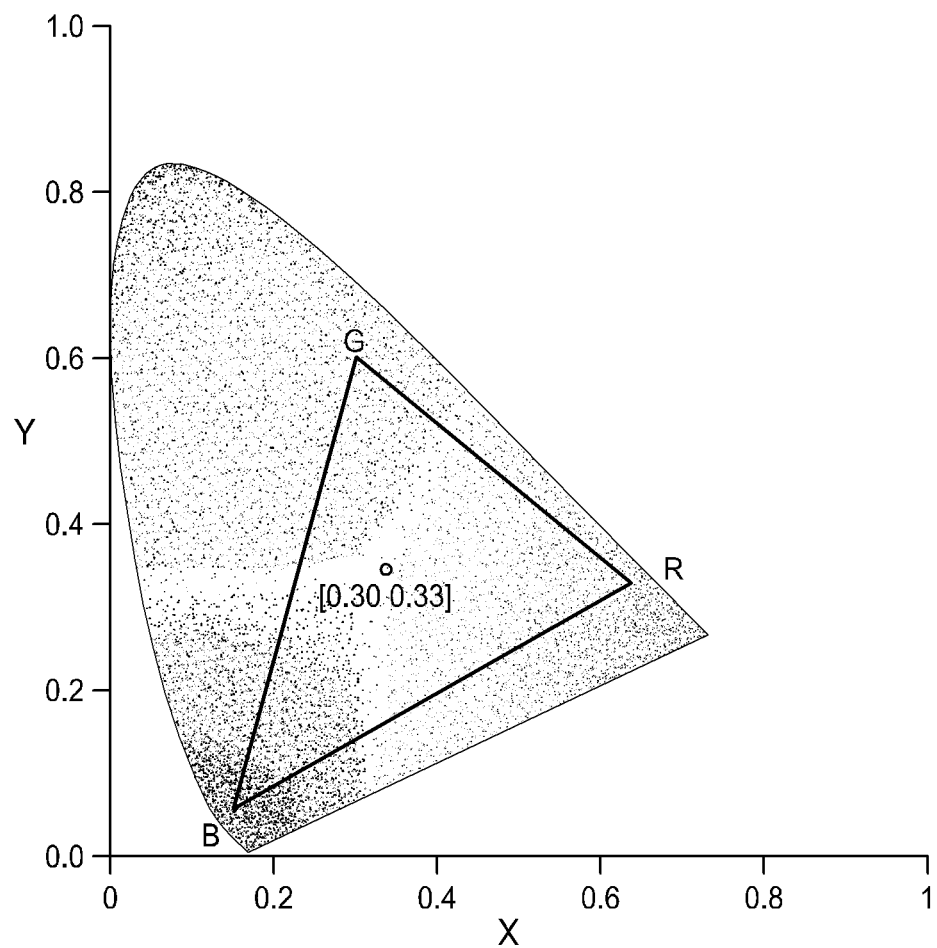
FIG. 27 is a chromaticity diagram for an optical filter having the absorptance profile shown in FIG. 25.

In certain embodiments, an optical filter is configured to selectively increase chroma in the red wavelengths at which the human eye is most sensitive. For example, the red color band can be described as the spectral range extending between about 625 nm and about 700 nm. When looking at the luminous efficiency function shown in FIG. 24, it is apparent that the eye is significantly more sensitive to red light between about 625 nm and 660 nm than at longer wavelengths. Accordingly, a spectral absorptance profile of an optical filter with this configuration is shown in FIG. 25. The optical filter has the same profile as the one shown in FIG. 11 except that it has an alternate peak in the red band centered at about 658 nm instead of a peak centered at about 715 nm. The result is increased chroma over the red band up to 655 nm with an accompanying decrease in chroma for red above 660 nm, where the eye is less sensitive. The relative chroma profiles and the chromaticity diagram for the same optical filter are shown in FIGS. 26A, 26B, and 27. FIG. 26B shows a percentage difference in chroma between the output of the optical filter of FIG. 25 and the output of a filter that uniformly attenuates the same average percentage of light within each stimulus band as the optical filter of FIG. 25, wherein the input is a 30 nm uniform intensity stimulus and the values along horizontal axis indicate the center wavelength of each stimulus band.

Figure 28:
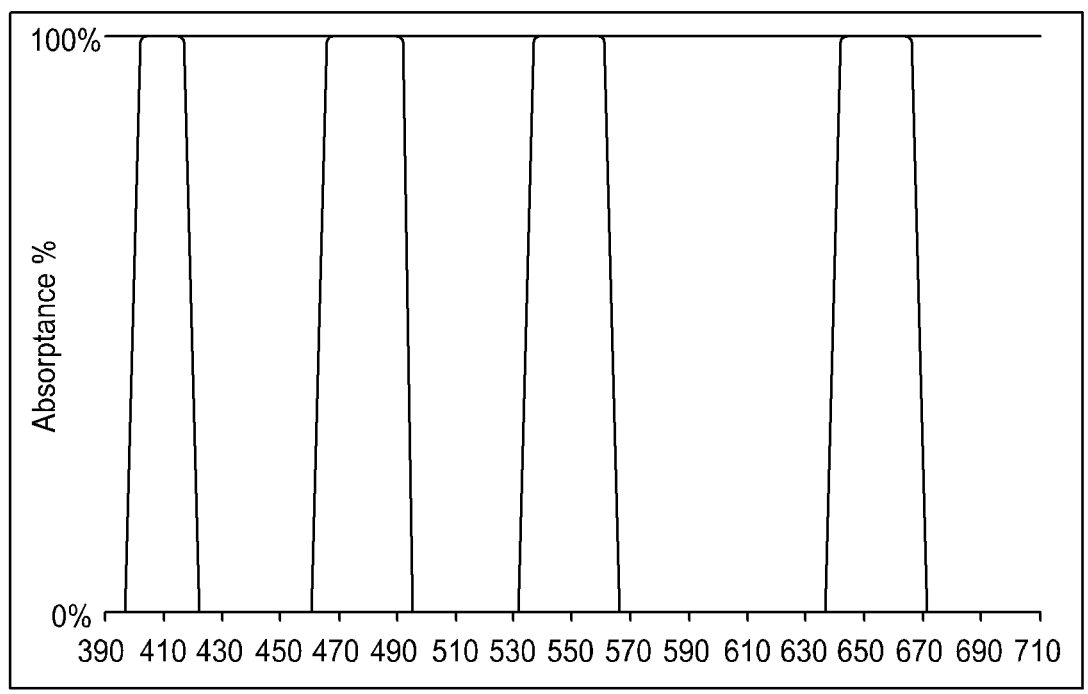
FIG. 28 is a graph showing the spectral absorptance profile of another optical filter.
Figure 29A:
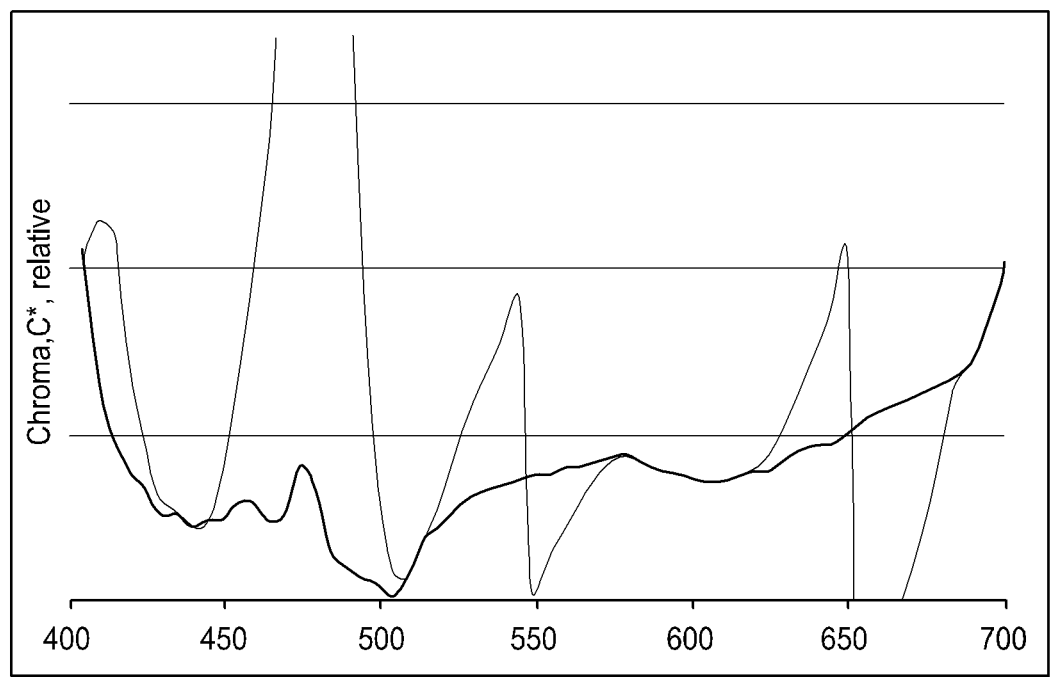
FIG. 29A is a graph showing the chroma profile of a filter with the absorptance profile shown in FIG. 28 and of a neutral filter.
Figure 29B:
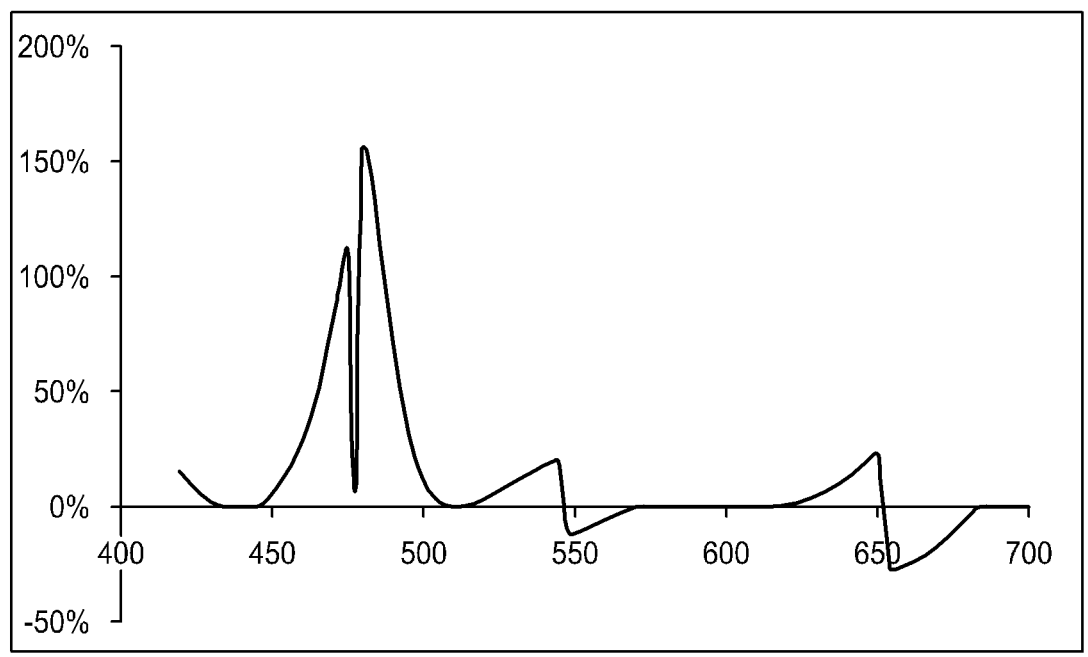
FIG. 29B is a graph showing the percentage difference in chroma of a filter with the absorptance profile shown in FIG. 28 compared to a neutral filter.
Figure 30:
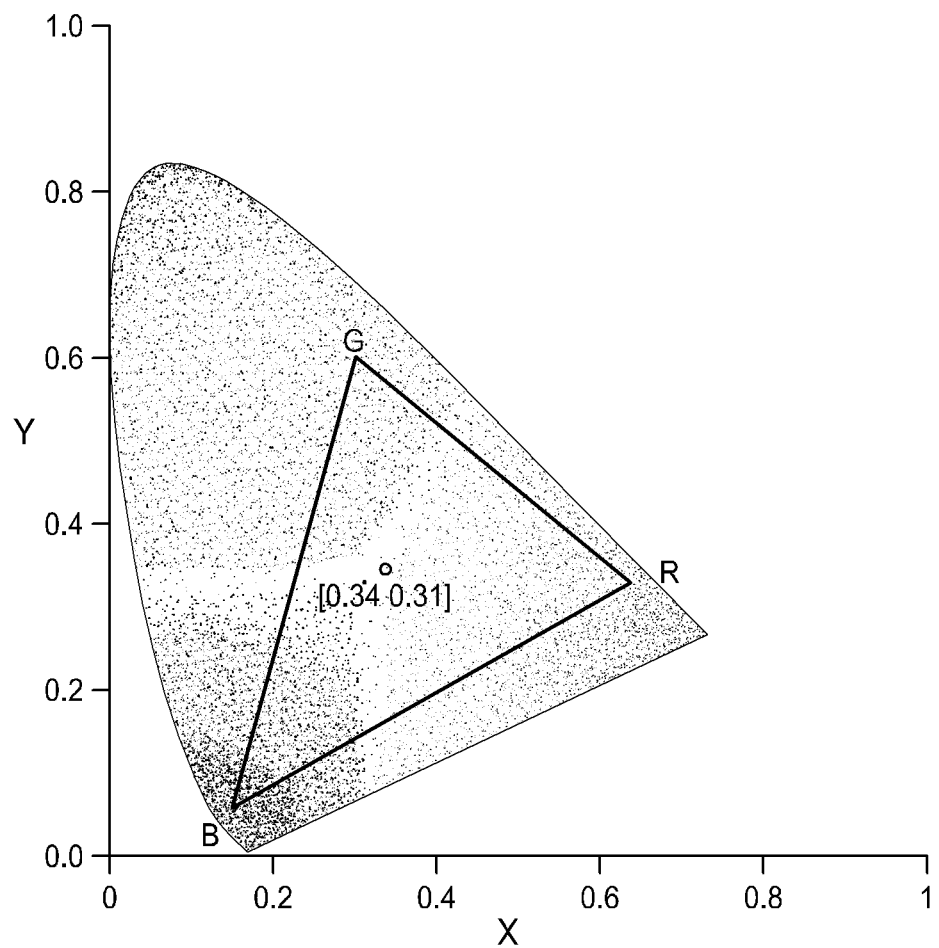
FIG. 30 is a chromaticity diagram for an optical filter having the absorptance profile shown in FIG. 28.

Additionally, chroma can be increased for wavelengths in the middle of the green range using an absorptance peak centered at about 553 nm, at about 561 nm, or at a wavelength between about 550 nm and about 570 nm. Such a filter can also decrease chroma of yellow colors, so it may be used in activities that benefit from identifying green objects that are viewed against a yellow background. A spectral absorptance profile for an optical filter that provides increased chroma for the middle of the green spectral range is shown in FIG. 28. The relative chroma profiles and the chromaticity diagram for the same optical filter are shown in FIGS. 29A, 29B, and 30, respectively. FIG. 29B shows a percentage difference in chroma between the output of the optical filter of FIG. 28 and the output of a filter that uniformly attenuates the same average percentage of light within each stimulus band as the optical filter of FIG. 28, wherein the input is a 30 nm uniform intensity stimulus and the horizontal axis indicates the center wavelength of each stimulus band.

In order to fabricate the filter profiles shown above, a variety of approaches can be applied, such as through the use of dielectric stacks, multilayer interference coatings, rare earth oxide additives, organic dyes, or a combination of multiple polarization filters as described in U.S. Pat. No. 5,054,902, the entire contents of which are incorporated by reference herein and made a part of this specification. Another suitable fabrication technique or a combination of techniques can also be used.

Figure 31:
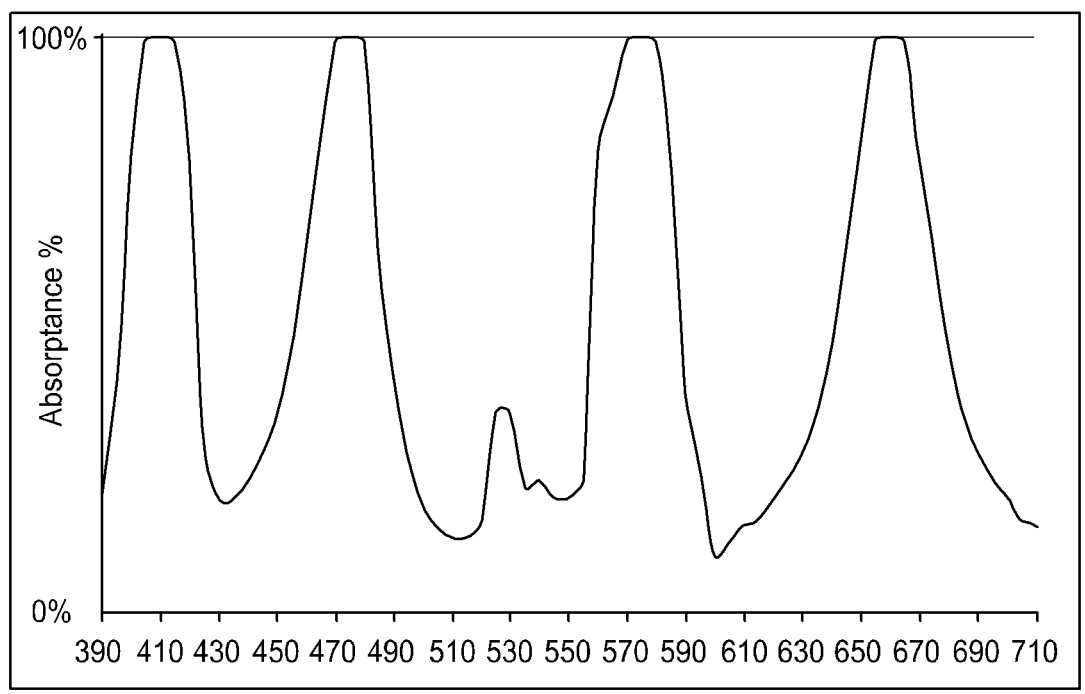
FIG. 31 is a graph showing the spectral absorptance profile of a non-polarized lens with an example optical filter.
Figure 32A:
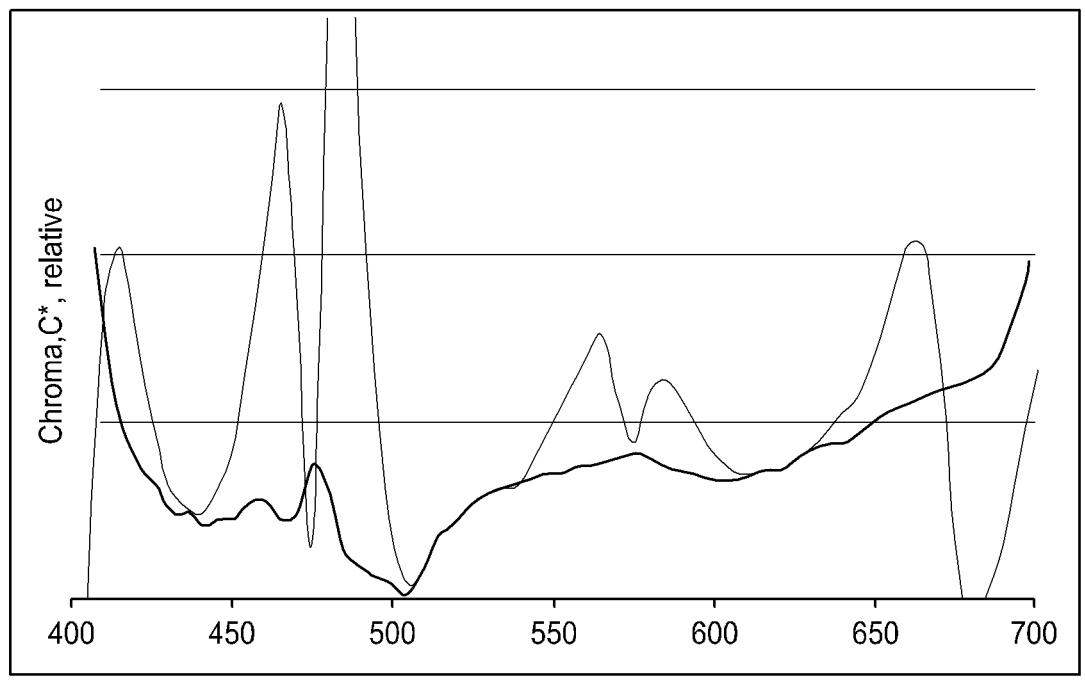
FIG. 32A is a graph showing the chroma profile of a non-polarized lens with the spectral absorptance profile shown in FIG. 31 and of a neutral filter.
Figure 32B:
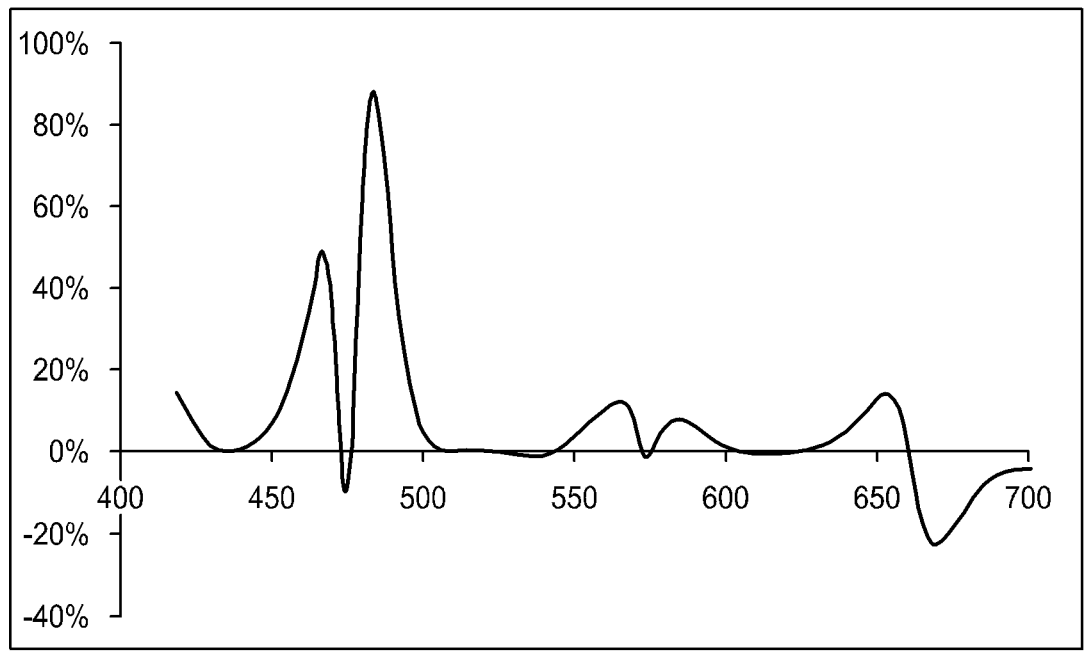
FIG. 32B is a graph showing the percentage difference in chroma of a lens with the absorptance profile shown in FIG. 31 compared to a neutral filter.
Figure 33:
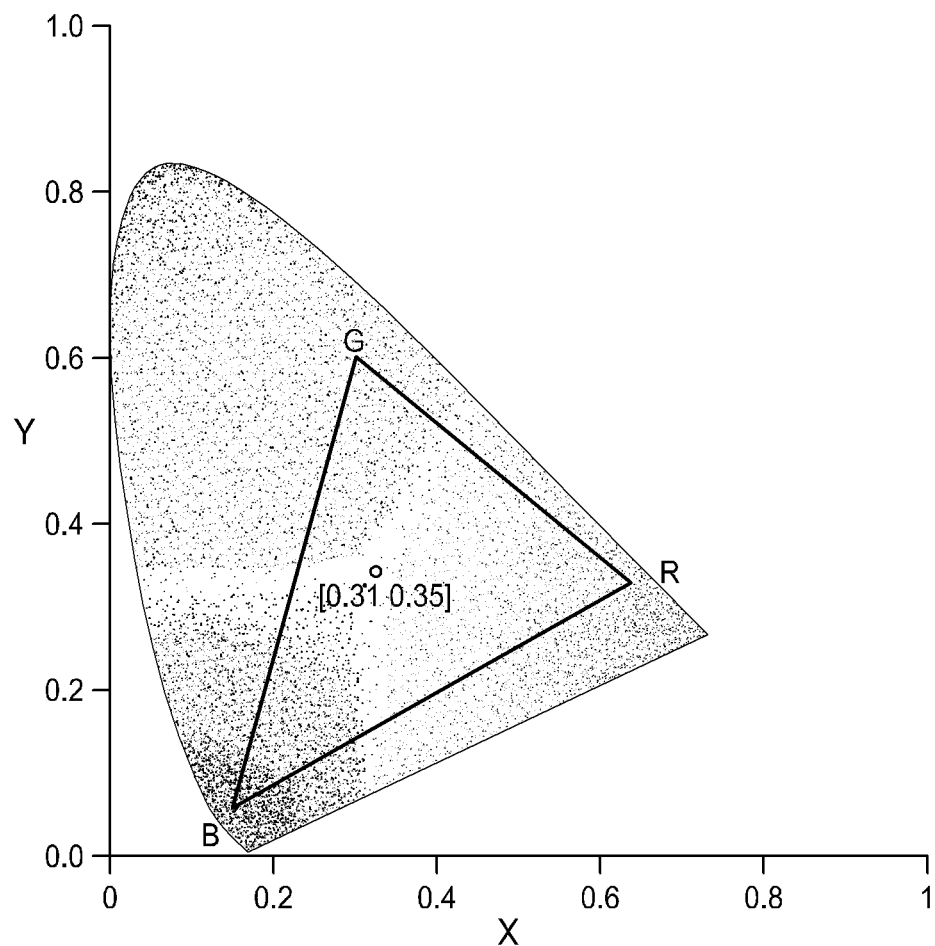
FIG. 33 is a chromaticity diagram for the lens with the spectral absorptance profile shown in FIG. 31.

In certain embodiments, an optical filter includes one or more organic dyes that provide absorptance peaks with a relatively high attenuation factor. For example, in some embodiments, a lens has an optical filter incorporating organic dyes supplied by Exciton of Dayton, Ohio. At least some organic dyes supplied by Exciton are named according to the approximate center wavelength of their absorptance peak. An approximated spectral absorptance profile of a non-polarized polycarbonate lens with an optical filter incorporating Exciton ABS 407, ABS 473, ABS 574, and ABS 659 dyes is shown in FIG. 31. The organic dye formulation of the optical filter provides absorptance peaks at about 407 nm, 473 nm, 574 nm, and 659 nm. The relative chroma profiles and the chromaticity diagram of the lens are shown in FIGS. 32A, 32B, and 33, respectively. FIG. 32B shows a percentage difference in chroma between the output of the optical filter of FIG. 31 and the output of a filter that uniformly attenuates the same average percentage of light within each stimulus band as the optical filter of FIG. 31, wherein the input is a 30 nm uniform intensity stimulus and the horizontal axis indicates the center wavelength of each stimulus band.

Figure 34:
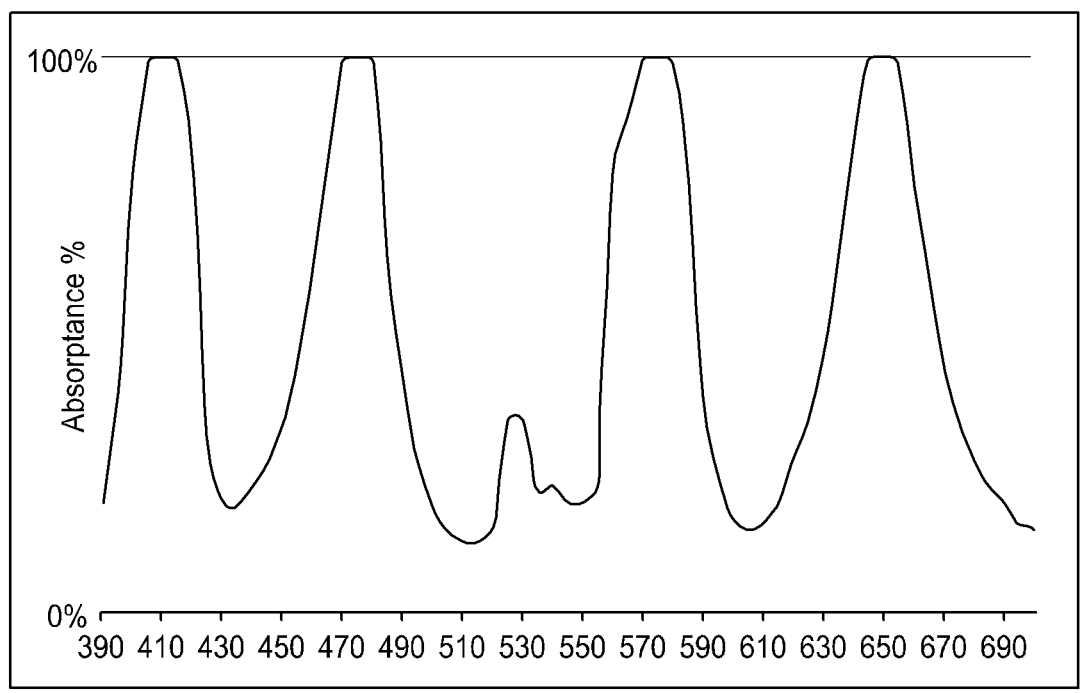
FIG. 34 is a graph showing the spectral absorptance profile of a non-polarized lens with another example optical filter.
Figure 35A:
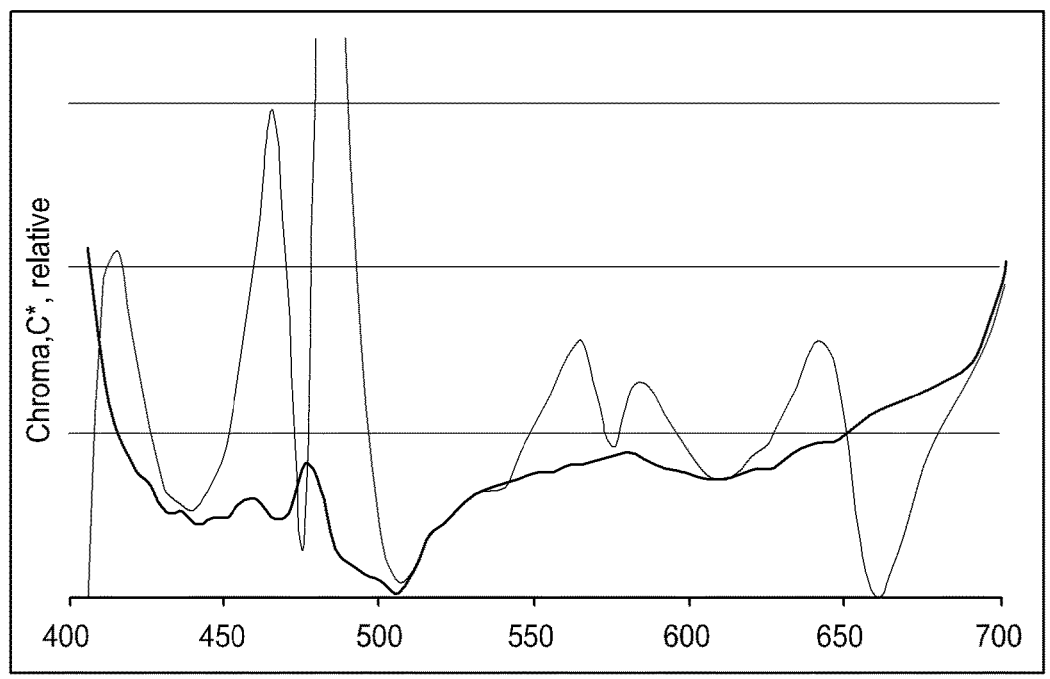
FIG. 35A is a graph showing the chroma profile of the lens with the spectral absorptance profile shown in FIG. 34 and of a neutral filter.
Figure 35B:
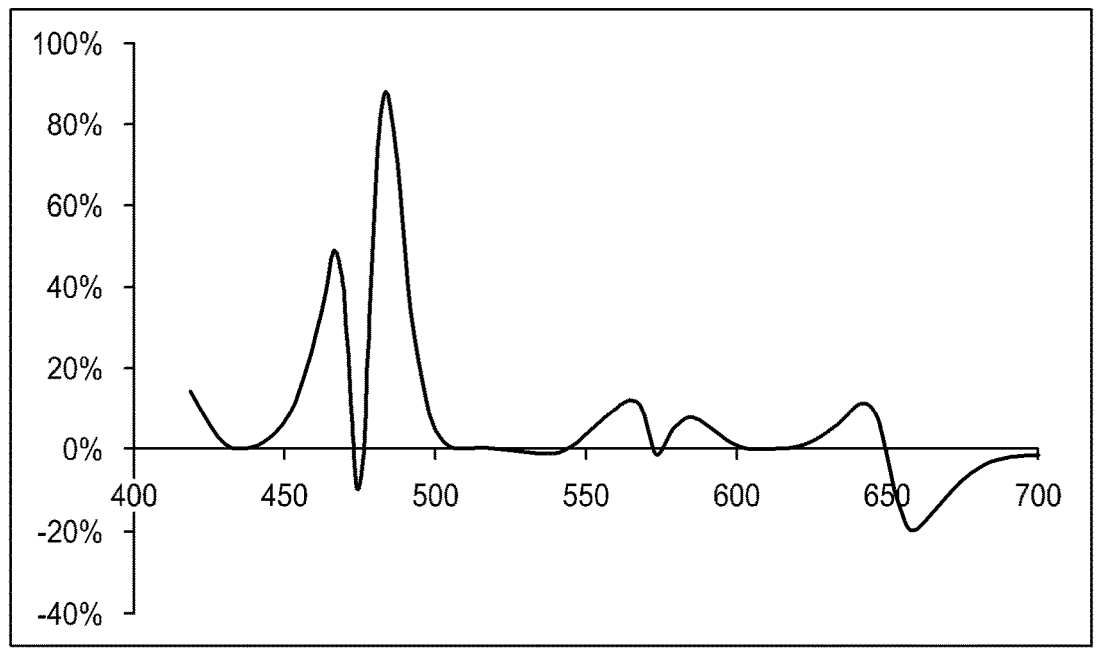
FIG. 35B is a graph showing the percentage difference in chroma of a lens with the absorptance profile shown in FIG. 34 compared to a neutral filter.
Figure 36:
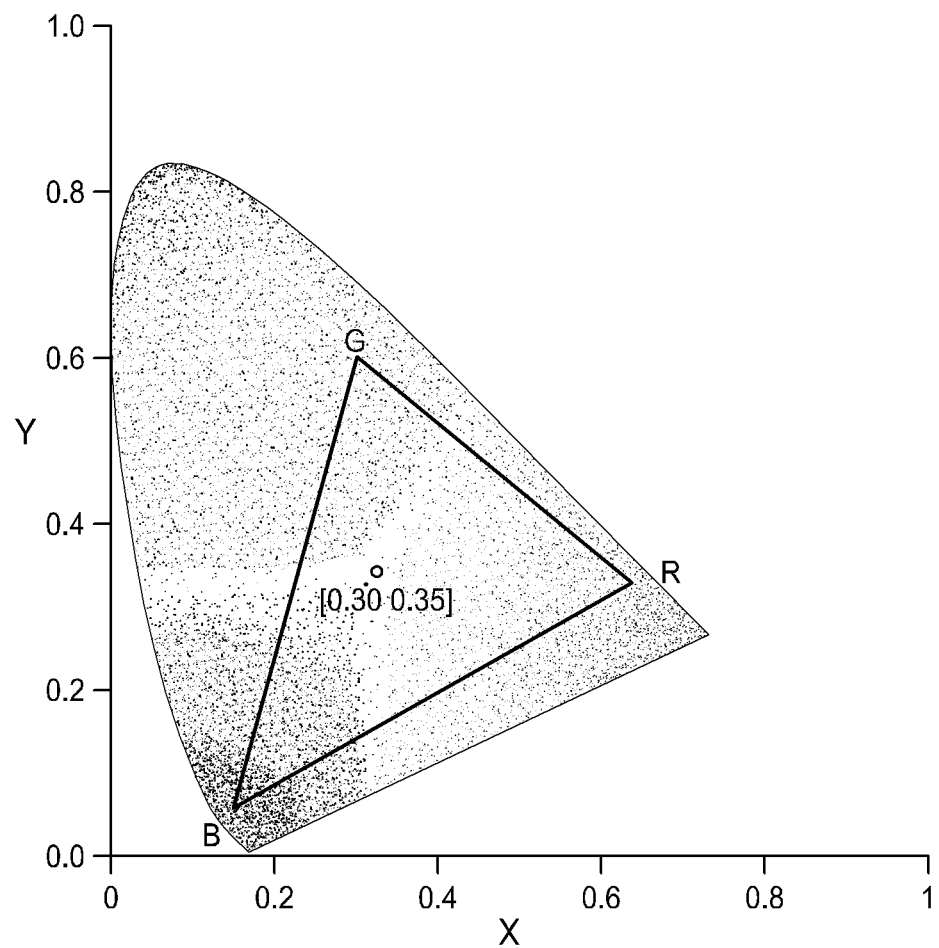
FIG. 36 is a chromaticity diagram for the lens with the spectral absorptance profile shown in FIG. 34.

Some embodiments are similar to the embodiments described in the previous paragraph, but include a red absorptance peak positioned at 647 nm using Exciton ABS 647 dye instead of Exciton ABS 659 dye. In such embodiments, the chroma for the higher luminous efficiency red hues located closer to the peak of the human eye's sensitivity is increased. The spectral absorptance profile of a non-polarized polycarbonate lens with an optical filter in this configuration is shown in FIG. 34. The profile includes absorptance peaks at 407 nm, 473 nm, 574 nm, and 647 nm. The relative chroma profiles and the chromaticity diagram of the lens are shown in FIGS. 35A, 35B, and 36, respectively. FIG. 35B shows a percentage difference in chroma between the output of the optical filter of FIG. 34 and the output of a filter that uniformly attenuates the same average percentage of light within each stimulus band as the optical filter of FIG. 34, wherein the input is a 30 nm uniform intensity stimulus and the horizontal axis indicates the center wavelength of each stimulus band.

Figure 37:
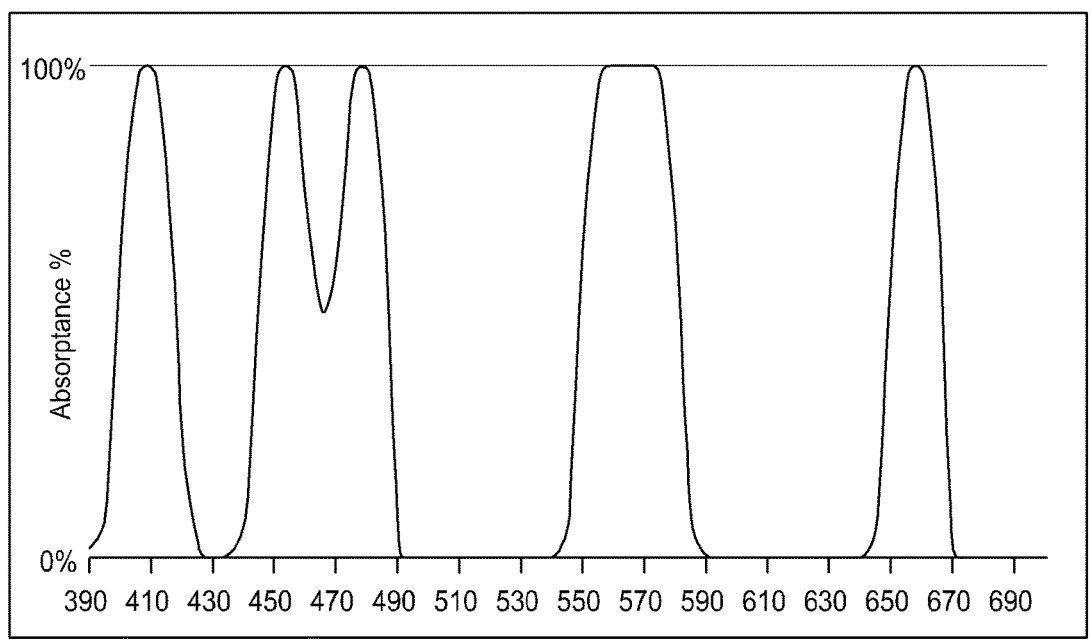
FIG. 37 is a graph showing the spectral absorptance profile of another optical filter.

In some embodiments, another optical filter is configured to increase or maximize chroma across several, many, or most colors, or at least many colors that are commonly encountered in the environment of the wearer. Such an optical filter can include a plurality of absorptance peaks. The plurality of absorptance peaks can include an absorptance peak having a center wavelength between about 415 nm and about 455 nm, at about 478 nm, and between about 555 nm and 580 nm, and at about 660 nm. The FWHM values of the plurality of absorptance peaks can be between about 20 nm and about 50 nm, greater than about 20 nm, about 22 nm, about 45 nm, another suitable value, or a combination of values. In some embodiments, the FWHM value of the absorptance peak with a center wavelength between about 555 nm and about 580 nm is about twice the FWHM value of at least some of the other absorptance peaks in the spectral profile. An approximated spectral absorptance profile of an example filter having absorptance peaks reflected by the embodiments described in this paragraph is shown in FIG. 37. The example filter has a sharp drop in absorptance at about 490 nm that permits substantial transmission of light at 491 nm and through a wide band (for example, through a spectral band greater than or equal to about 20 nm in bandwidth) in the neighborhood of 491 nm (for example, through a band of wavelengths near 491 nm and greater than or equal to about 491 nm).

Figure 38A:
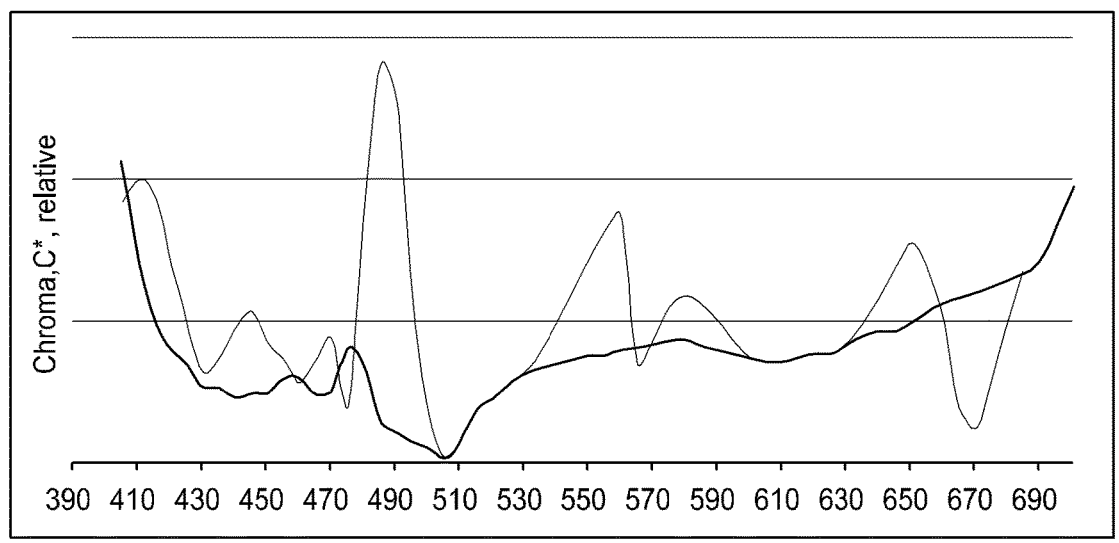
FIG. 38A is a graph showing the chroma profile of a filter with absorptance profile shown in FIG. 37 and of a neutral filter.
Figure 38B:
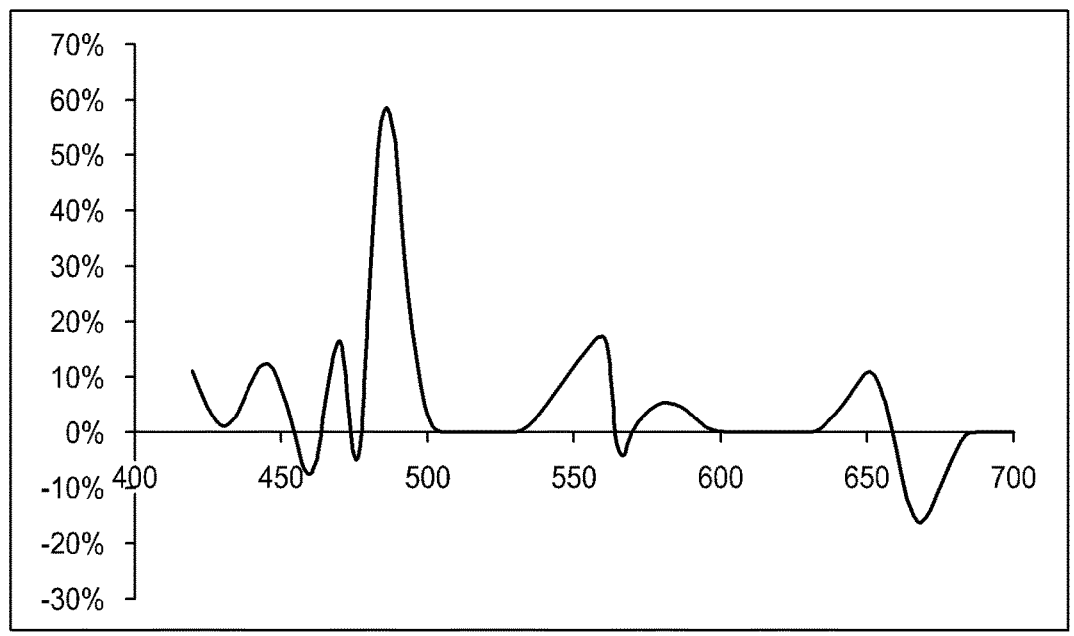
FIG. 38B is a graph showing the percentage difference in chroma of a filter with the absorptance profile shown in FIG. 37 compared to a neutral filter.
Figure 39:
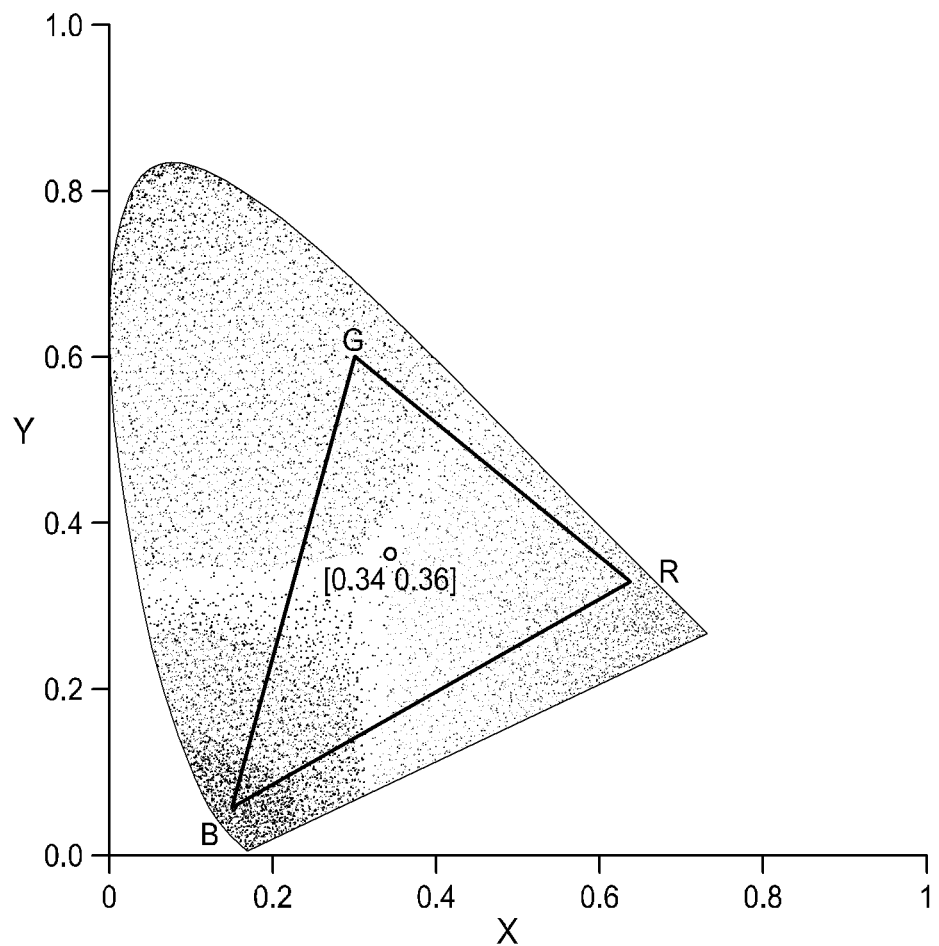
FIG. 39 is a chromaticity diagram for the filter with the spectral absorptance profile shown in FIG. 37.

A relative chroma profile for a filter having the absorptance profile of FIG. 37 is shown in FIG. 38A. The chroma profile of FIG. 38A is shown with a vertical scale different from other chroma profiles in this disclosure in order to show larger variation in chroma. The example filter produces substantial increases in relative chroma over the unfiltered case in multiple spectral bands, including in spectral bands between about 410 nm and about 460 nm, between about 465 nm and about 475 nm, between about 480 nm and about 500 nm, between about 540 nm and about 565 nm, between about 570 nm and 600 nm, and between about 630 nm and about 660 nm. FIG. 38B shows a percentage difference in chroma between the output of the optical filter of FIG. 37 and the output of a filter that uniformly attenuates the same average percentage of light within each stimulus band as the optical filter of FIG. 37, wherein the input is a 30 nm uniform intensity stimulus and the horizontal axis indicates the center wavelength of each stimulus band. A chromaticity diagram for this example filter is shown in FIG. 39.

In some embodiments, two or more dyes can be used to create a single absorptance peak or a plurality of absorptance peaks in close proximity to one another. For example, an absorptance peak with a center wavelength positioned between about 555 nm and about 580 nm can be creating using two dyes having center wavelengths at about 561 nm and 574 nm. In another embodiment, an absorptance peak with a center wavelength positioned between about 555 nm and about 580 nm can be creating using two dyes having center wavelengths at about 556 nm and 574 nm. While each dye may individually produce an absorptance peak having a FWHM value of less than about 30 nm, when the dyes are used together in an optical filter, the absorptance peaks may combine to form a single absorptance peak with a FWHM value of about 45 nm or greater than about 40 nm.

Filters incorporating organic dyes can be fabricated using any suitable technique. In some embodiments, a sufficient quantity of one or more organic dyes is used to lower transmittance in one or more spectral regions to less than or equal to about 1%. To achieve peak transmittances under 1% in 1.75 mm thick polycarbonate lenses, dyes can be mixed into a batch of polycarbonate resin. If the mixture includes 5 lbs of polycarbonate resin, the following loadings of Exciton dyes can be used for the optical filter associated with the absorptance profile shown in FIG. 31: 44 mg of ABS 407, 122 mg of ABS 473, 117 mg of ABS 574, and 63 mg of ABS 659. In the foregoing example, the ratios of dye loadings in polycarbonate can be generalized as follows: out of 1000 total units of dye, the filter could include about 130 units of violet-absorbing dye, about 350 units of blue-absorbing dye, about 340 units of green-absorbing dye, and about 180 units of deep red-absorbing dye.

In the same quantity of polycarbonate resin, the following loadings of Exciton dyes can be used for the optical filter associated with the absorptance profile shown in FIG. 34: 44 mg of ABS 407, 122 mg of ABS 473, 117 mg of ABS 574, and 41 mg of ABS 647. In the foregoing example, the ratios of dye loadings in polycarbonate can be generalized as follows: out of 995 total units of dye, the filter could include about 135 units of violet-absorbing dye, about 375 units of blue-absorbing dye, about 360 units of green-absorbing dye, and about 125 units of red-absorbing dye. In certain embodiments, a lens can be created from the resin and dye mixture by a casting process, a molding process, or any other suitable process.

Other dyes for plastic exist that can also provide substantial increases in chroma. For example, Crysta-Lyn Chemical Company of Binghamton, N.Y. offers DLS 402A dye, with an absorptance peak at 402 nm. In some embodiments, the DLS 402A dye can be used in place of the Exciton ABS 407 dye in the formulations described above. Crysta-Lyn also offers DLS 461B dye that provides an absorptance peak at 461 nm. DLS 461B dye can be used in place of the Exciton ABS 473 dye in the formulations described above. Crysta-Lyn DLS 564B dye can be used in place of the Exciton ABS 574 dye in those formulations, while Crysta-Lyn DLS 654B dye can be used in place of Exciton ABS 659 dye. In some embodiments, the dye can be incorporated into one or more lens components, and the decision regarding which lens components include the dye can be based on properties, such as stability or performance factors, of each specific dye.

In another example, an optical filter is designed with relative amounts of certain dyes. The magnitude of absorptance peaks can be selected by adjusting the absolute mass loading of the dyes while maintaining the relative relationships between loadings of different dyes. For example, in a particular embodiment, an organic dye optical filter includes: 70 mg of Exciton ABS 473 dye, 108 mg of Exciton ABS 561 dye, 27 mg of Exciton ABS 574 dye, and 41 mg of Exciton ABS 659. The ratios of dye loadings in polyurethane can be generalized as follows: out of 1000 total units of dye, the filter could include about 280 units of blue-absorbing dye, about 440 units of yellow-green-absorbing dye, about 110 units of green-absorbing dye, and about 170 units of deep red-absorbing dye. A lens was cast using the foregoing dye loadings in 251 g of polyurethane. The resulting lens had a thickness of 1.9 mm. Loading levels can be adjusted to account for the characteristics of the particular base material used. For example, the loading levels may be somewhat or slightly higher when using a material with a lower density, such as certain types of polycarbonate. Likewise, the loading levels can be somewhat or slightly lower when a higher density material is used.

Figure 40:
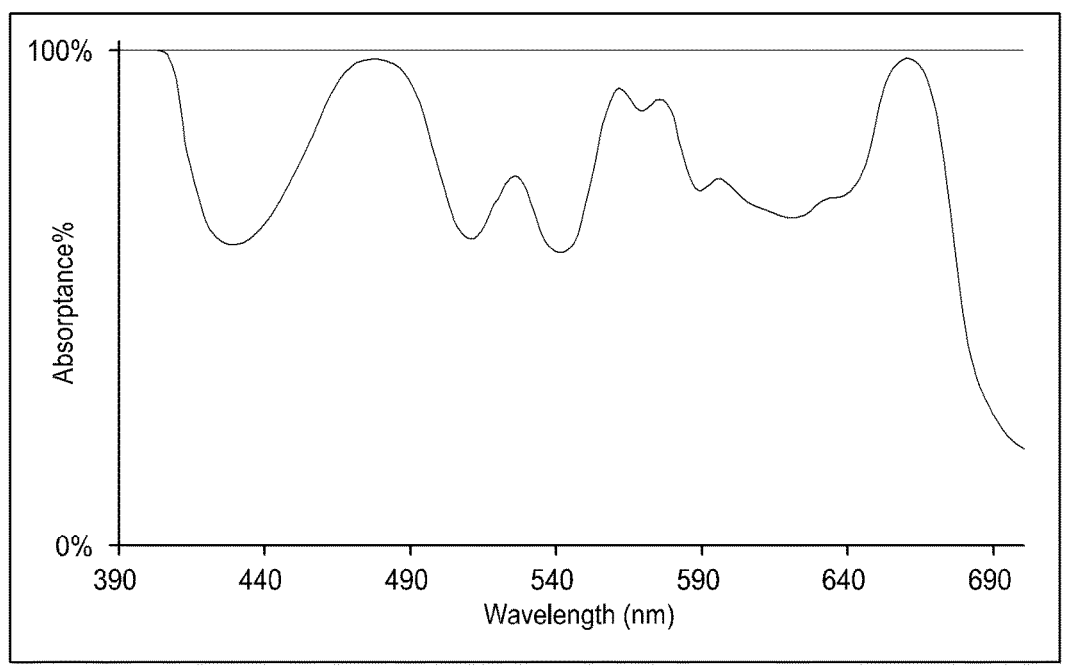
FIG. 40 is a graph showing the spectral absorptance profile of a cast lens with an optical filter.
Figure 41A:
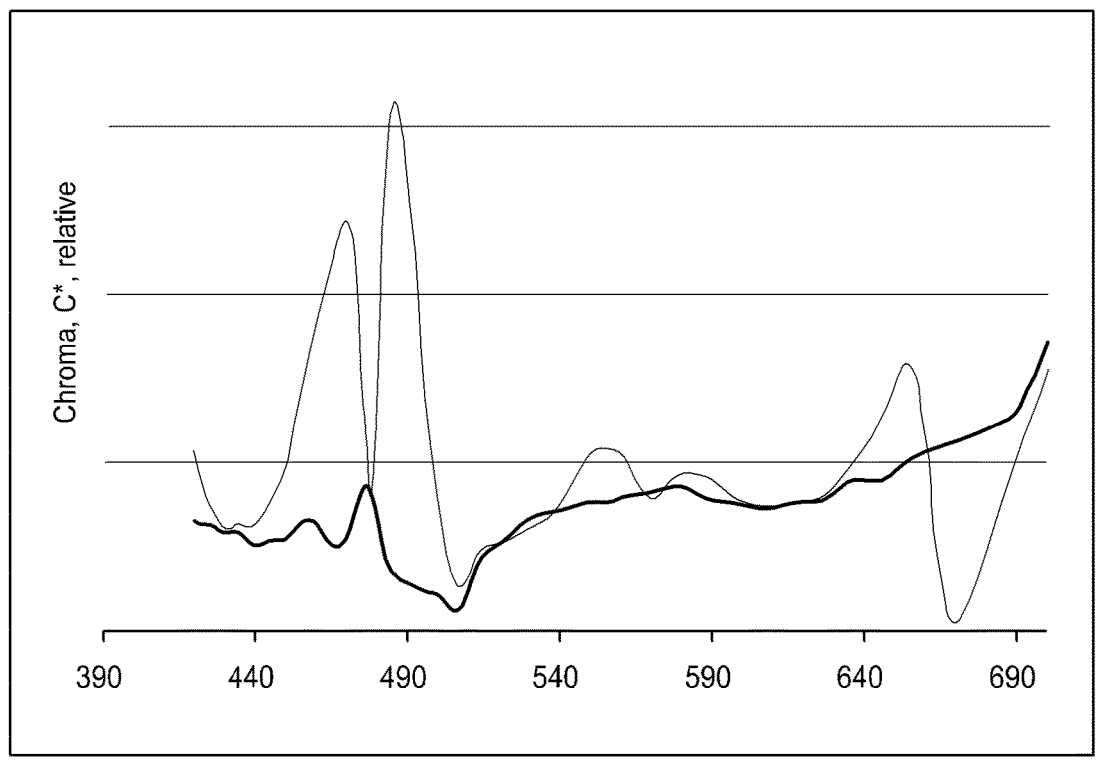
FIG. 41A is a graph showing the chroma profile of a lens with the absorptance profile shown in FIG. 40 and of a neutral filter.
Figure 41B:
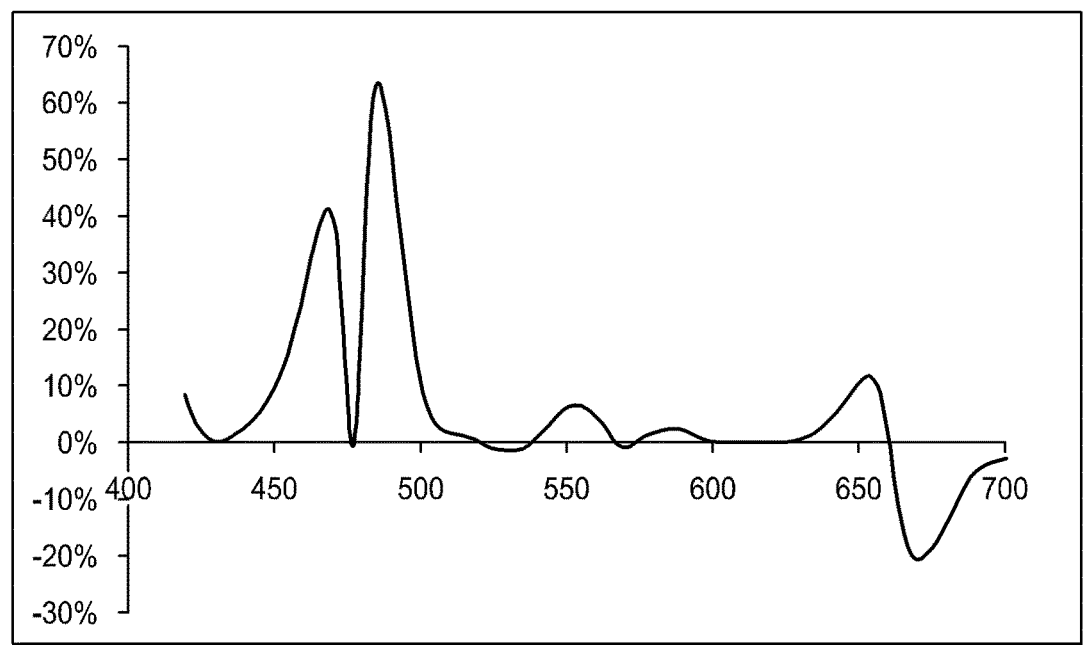
FIG. 41B is a graph showing the percentage difference in chroma of a lens with the absorptance profile shown in FIG. 40 compared to a neutral filter.
Figure 42:
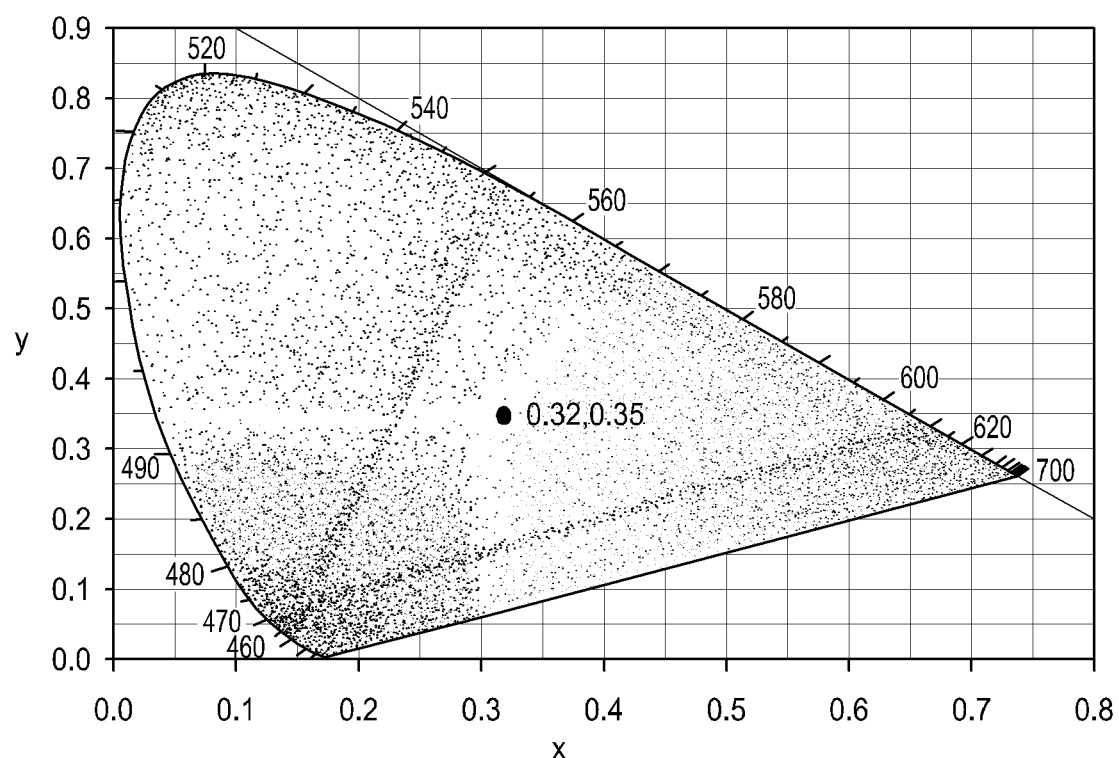
FIG. 42 is a chromaticity diagram for the lens with the spectral absorptance profile shown in FIG. 40.

The absorptance profile of the cast lens is shown in FIG. 40. In the absorptance profile shown in FIG. 40, the absorptance peak centered at about 477 nm has a full width at 80% of the maximum absorptance of the absorptance peak of about 46 nm and an attenuation factor of about 0.92. The absorptance peak centered at about 569 nm has a full width at 80% of the maximum absorptance of the absorptance peak of about 35 nm and an attenuation factor of about 0.86. The absorptance peak centered at about 660 nm has a full width at 80% of the maximum absorptance of the absorptance peak of about 27 nm and an attenuation factor of about 0.91. The cast lens provided an increase in chroma in multiple spectral regions, as shown in FIGS. 41A and 41B. The chroma profile of FIG. 41A is shown at a scale different from other chroma profiles in this disclosure. FIG. 41B shows a percentage difference in chroma between the output of the optical filter of FIG. 40 and the output of a filter that uniformly attenuates the same average percentage of light within each stimulus band as the optical filter of FIG. 40, wherein the input is a 30 nm uniform intensity stimulus and the horizontal axis indicates the center wavelength of each stimulus band. A chromaticity diagram for the cast lens is shown in FIG. 42.

Figure 50:
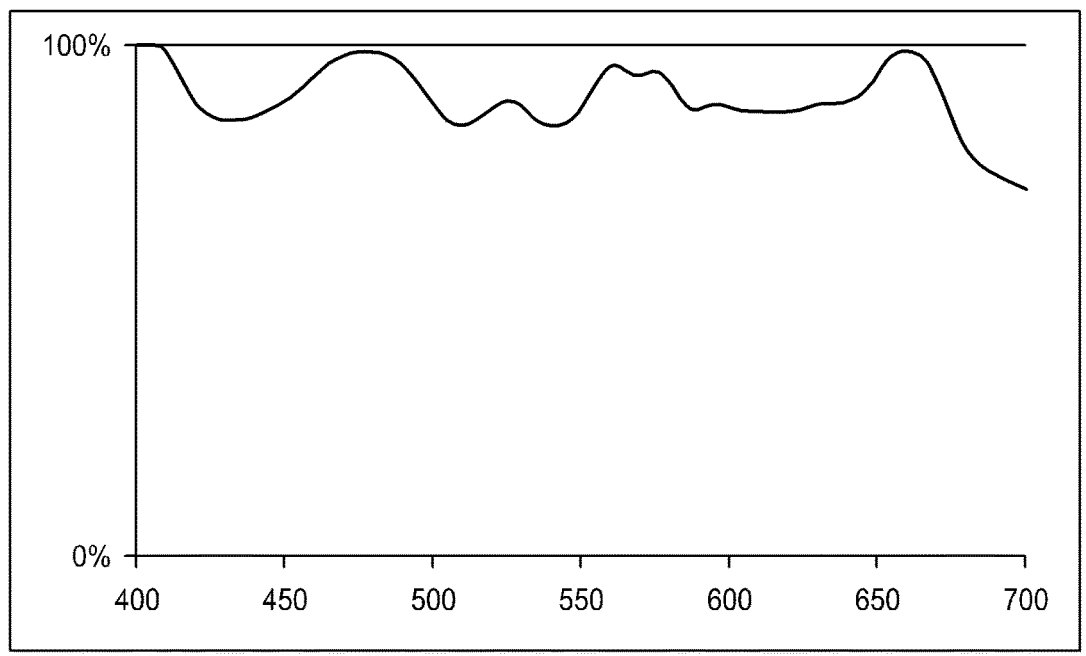
FIG. 50 is a graph showing the absorptance profile of a cast lens having an optical filter with the absorptance profile of FIG. 40 and a polarizer having a substantially neutral gray tint.
Figure 51:
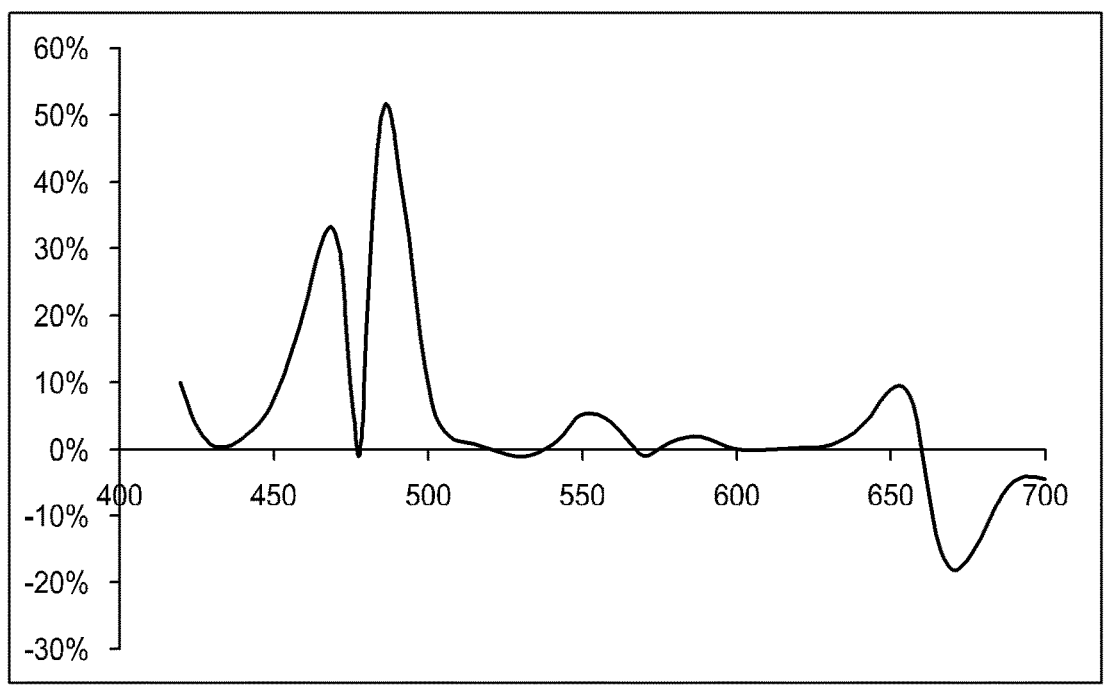
FIG. 51 is a graph showing the percentage difference in chroma of a lens with the absorptance profile shown in FIG. 50 compared to a neutral filter.
Figure 52:
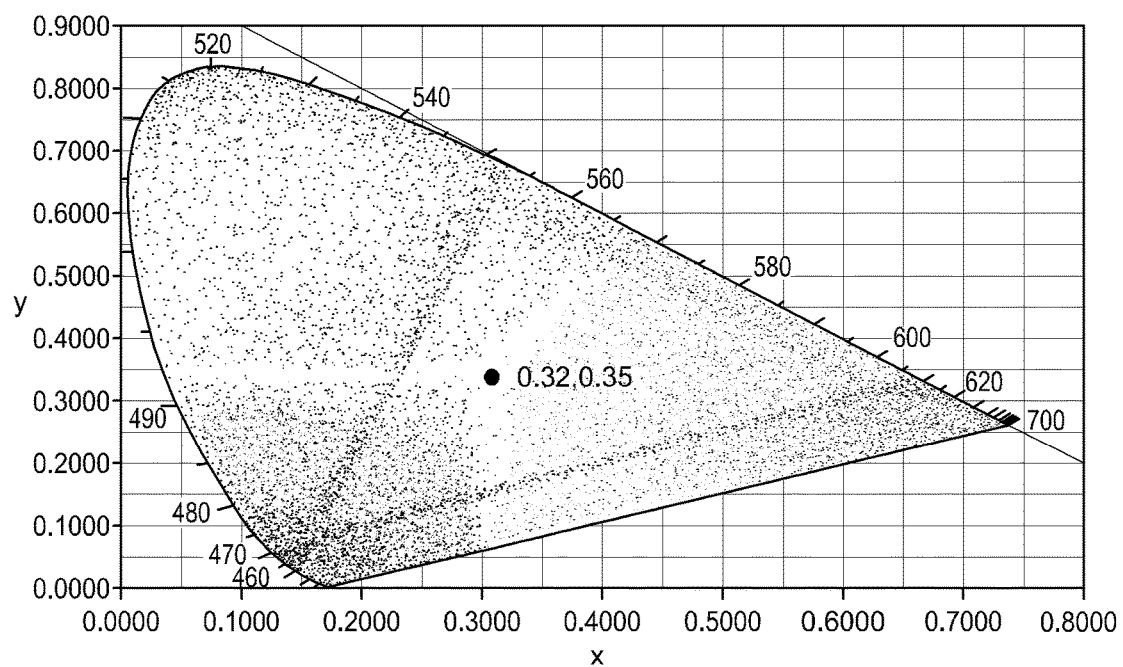
FIG. 52 is a chromaticity diagram for the lens with the optical filter shown in FIG. 50.

FIG. 50 illustrates the absorptance profile as a function of wavelength of an optical filter of FIG. 40 combined with a light-grey polarizer film where the luminous transmittance using CIE standard illuminant D65 is about 9.3%. The luminous transmittance of a polarizing sunglass lens incorporating a chroma enhancement filter as disclosed herein can be less than or equal to about 15%, less than or equal to about 12%, less than or equal to about 10%, less than or equal to about 9%, greater than or equal to about 7%, greater than or equal to about 8%, between about 7%-15%, between about 7%-12%, between about 9%-12%, or another suitable value. Moreover, a lens may exhibit a heterogeneous transmittance profile having a combination of two or more transmittance regions having different transmittances. FIG. 51 shows a percentage difference in chroma between the output of a lens having the absorptance profile of FIG. 50 and the output of a filter that uniformly attenuates the same average percentage of light within each stimulus band as the lens with the absorptance profile of FIG. 50, wherein the input is a 30 nm uniform intensity stimulus and the horizontal axis indicates the center wavelength of each stimulus band. A chromaticity diagram for a lens with the absorptance profile of FIG. 50 is shown in FIG. 52.

In some embodiments, one or more of the dyes used in any filter composition disclosed herein can be replaced by one or more dyes having similar spectral attributes. For example, if a dye, such as the Exciton ABS 473 dye, is not sufficiently stable to endure the lens formation process, one or more substitute dyes with improved stability and a similar absorptance profile can be used, instead. Some lens formation processes, such as injection molding, can subject the lens and optical filter to high temperatures, high pressures, and/or chemically active materials. Replacement dyes can be selected to have similar absorptance profiles of the dyes disclosed herein but improved stability or performance. For example, a replacement dye can exhibit high stability during injection molding of the lens or high stability under sunlight. In one embodiment, at least one of two or more dyes can be used in place of Exciton ABS 473 dye. In one embodiment, Exciton ABS 473 dye was replaced with a dye that has an absorptance peak with a center wavelength of about 477 nm in polycarbonate. In some embodiments, the attenuation factor associated with the 477 nm absorptance peak is greater than or equal to about 0.8, greater than or equal to about 0.9, about 0.93, or another suitable value.

In some embodiments, a lens can include dyes or other materials that are selected or configured to increase the photo stability of the chroma enhancing filter and other lens components. Any technique known in the art can be used to mitigate degradation of filter materials and/or other lens components.

The relative quantities of any dye formulations disclosed herein can be adjusted to achieve a desired objective, such as, for example, a desired overall lens color, a chroma-enhancing filter having particular properties, another objective, or a combination of objectives. An optical filter can be configured to have an absorptance profile with any combination of the absorptance peaks disclosed herein and/or any combination of other absorptance peaks in order to achieve desired chroma-enhancing properties.

As described above, FIG. 41 illustrates a chroma profile of a cast lens with an optical filter compared to the chroma profile of a neutral filter with the same average attenuation within each 30 nm stimulus band. The chroma profile of the cast lens is represented by the lighter line and is generally higher than the chroma profile of the neutral filter, which is represented by the thicker line. The cast lens is configured to provide multiple spectral regions of increased chroma compared to the neutral filter. In some embodiments, a lens includes an optical filter containing one or more organic dyes. The one or more organic dyes can increase or decrease chroma in one or more spectral regions. As shown in FIG. 41, an optical filter can be configured to increase chroma in five or more spectral ranges. The spectral ranges over which an optical filter increases or decreases chroma can be called chroma enhancement windows (CEWs).

In some embodiments, CEWs include portions of the visible spectrum in which an optical filter provides a substantial change in chroma compared to a neutral filter having the same average attenuation within each 30 nm stimulus band, as perceived by a person with normal vision. In certain cases, a substantial enhancement of chroma can be seen when a filter provides a chroma increase greater than or equal to about 2% compared to the neutral filter. In other cases, a chroma increase greater than or equal to about 3% or greater than or equal to about 5% compared to the neutral filter is considered a substantial increase. Whether a chroma change represents a substantial increase can depend on the spectral region in which the increase is provided. For example, a substantial chroma enhancement can include an increase in chroma greater than or equal to about 6% over a neutral filter when the visual stimulus is centered at about 560 nm. A substantial chroma enhancement can include an increase in chroma greater than or equal to about 3% over a neutral filter when the visual stimulus is centered at about 660 nm. A substantial chroma enhancement can include an increase in chroma greater than or equal to about 15% over a neutral filter when the visual stimulus is centered at about 570 nm. Accordingly, the amount of change in chroma relative to the neutral filter that is considered substantial may differ depending on the spectral range of the CEW.

In certain embodiments, a substantial chroma enhancement is provided by an optical filter configured to increase chroma in one or more CEWs over a neutral filter without any significant decrease in chroma compared to a neutral filter within the one or more CEWs. A substantial chroma enhancement can also be provided by an optical filter configured to increase chroma in one or more CEWs over a neutral filter without any significant decrease in chroma compared to a neutral filter within a particular spectral range, such as, for example, between about 420 nm and about 650 nm.

FIGS. 43 through 48 illustrate various CEW configurations for a variety of chroma-enhancing optical filters. The spectral ranges of the CEWs can correspond to the spectral regions where an optical filter exhibits substantially changed chroma compared to a neutral filter in one or more of FIGS. 6, 9, 12, 15, 17, 19, 22, 26, 29, 32, 35, 38, and 41. The particular CEW configurations disclosed here are non-limiting examples that illustrate the wide variety of lens or eyewear configurations that exist.

Figure 43:
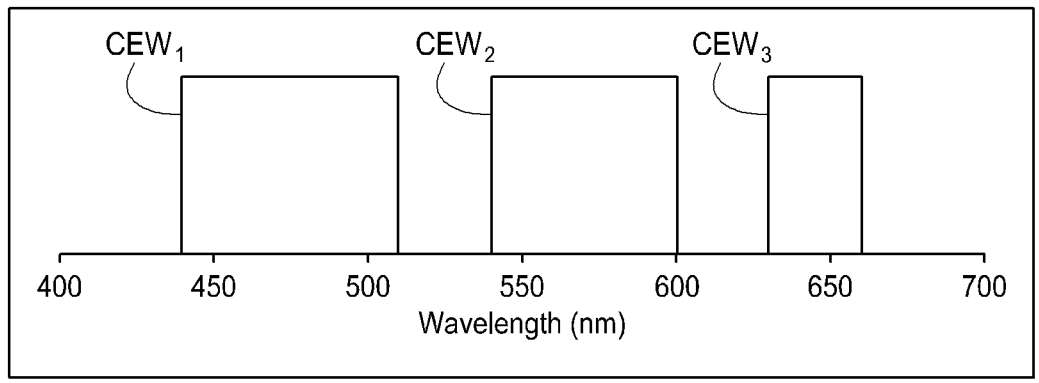
FIGS. 43-48 illustrate example chroma enhancement window configurations for optical filters.

One example of an optical filter CEW configuration is shown in FIG. 43. In this example, $CEW_1$ encompasses a spectral range of about 440 nm to about 510 nm. $CEW_2$ encompasses a spectral range of about 540 nm to about 600 nm. $CEW_3$ encompasses a spectral range of about 630 nm to about 660 nm. Each CEW may be defined as a spectral range within which a lens or eyewear is configured to provide chroma enhancement. Alternatively, the lower end of one or more CEWs can encompass a wavelength above which the lens or eyewear provides chroma enhancement. The upper end of one or more CEWs can encompass a wavelength below which the lens or eyewear provides chroma enhancement. In some embodiments, the average increase in chroma within $CEW_1$ compared to a neutral filter having the same average attenuation within each 30 nm stimulus band is greater than or equal to about 20%. The average increase in chroma within $CEW_2$ compared to the neutral filter can be greater than or equal to about 3%. The average increase in chroma within $CEW_3$ compared to a neutral filter can be greater than or equal to about 5%.

Figure 44:
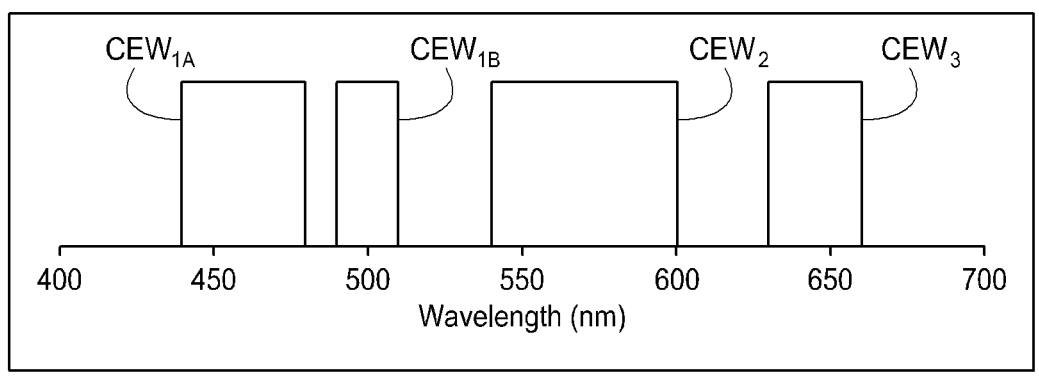

Another example of an optical filter CEW configuration is shown in FIG. 44. $CEW_{1A}$ encompasses a spectral range of about 440 nm to about 480 nm. $CEW_{1B}$ encompasses a spectral range of about 490 nm to about 510 nm. The average increase in chroma compared to a neutral filter can be greater than or equal to about 15% for the $CEW_{1A}$ region and greater than or equal to about 15% for the $CEW_{1B}$ region.

Figure 45:
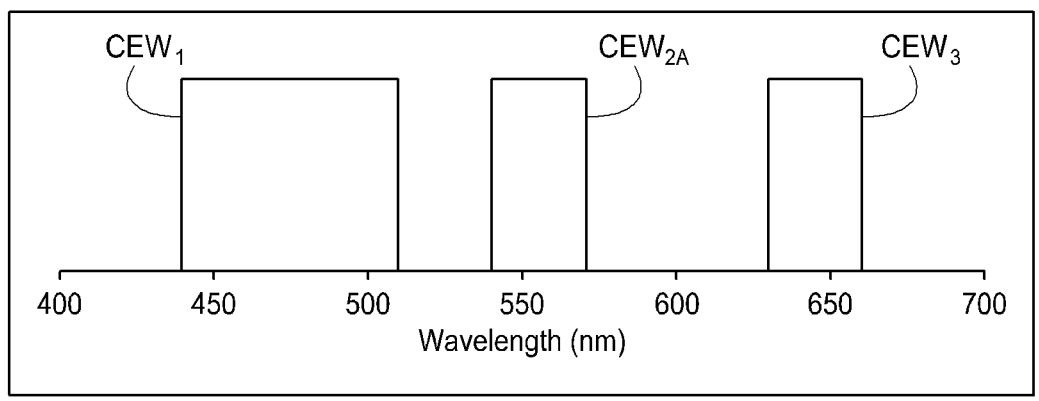
Figure 46:
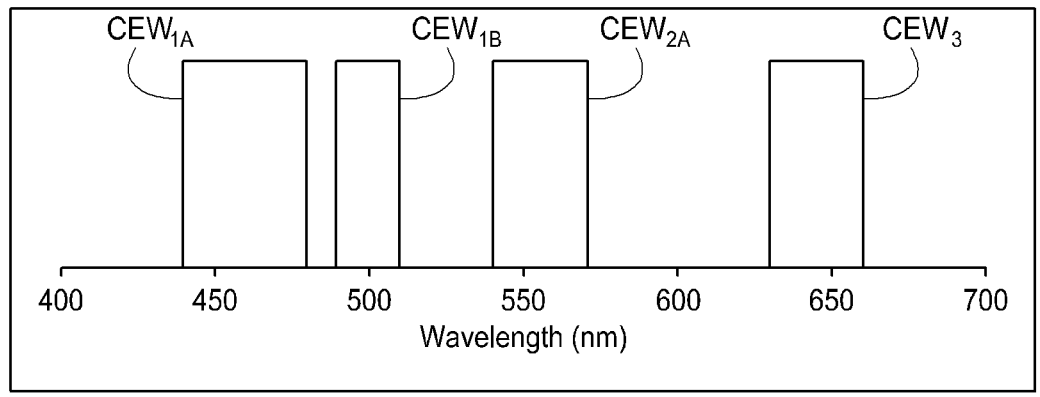

A further example of an optical filter CEW configuration is shown in FIG. 45, which is a configuration in which $CEW_{2A}$ encompasses a spectral range of about 540 nm to about 570 nm. FIG. 46 illustrates an additional embodiment in which an optical filter provides a CEW configuration including $CEW_{1A}$, $CEW_{1B}$, $CEW_{2A}$, and $CEW_3$. The average increase in chroma compared to a neutral filter can be greater than or equal to about 4% for the $CEW_{2A}$ spectral region, for example.

Figure 47:
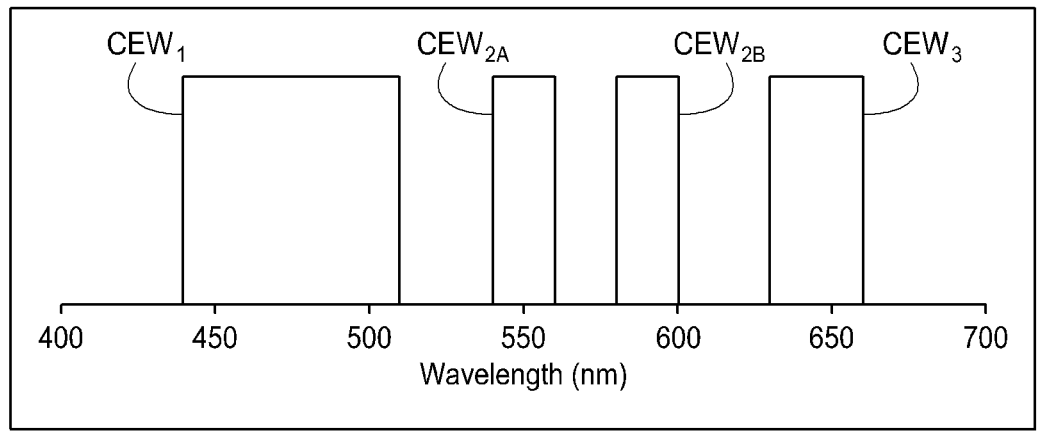
Figure 48:
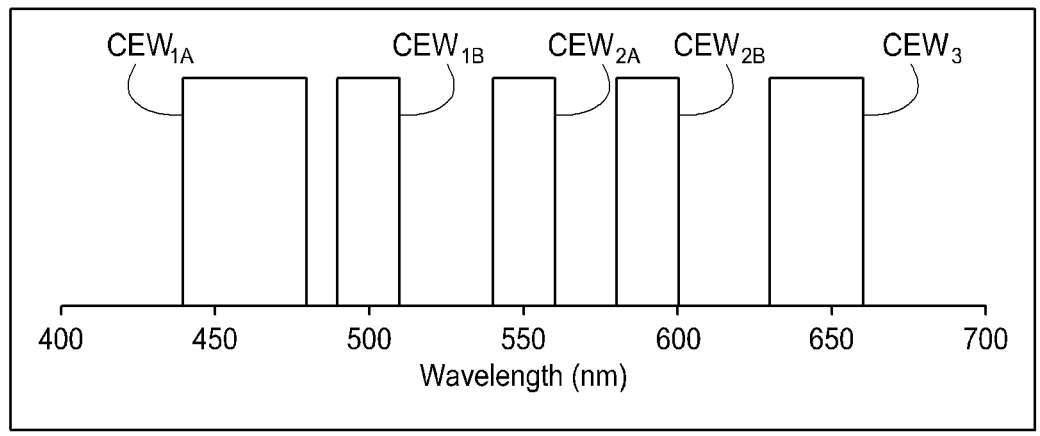

FIG. 47 illustrates an example of an optical filter CEW configuration with an additional enhancement window, $CEW_{2B}$. The $CEW_{2B}$ window encompasses a spectral range between about 580 nm and about 600 nm. The average increase in chroma compared to a neutral filter can be greater than or equal to about 2% for the $CEW_{2B}$ spectral region, for example. FIG. 48 illustrates the relative chroma enhancement of an optical filter configured to provide five or more chroma enhancement windows, including: $CEW_{2A}$, $CEW_{2B}$, $CEW_{1A}$, $CEW_{1B}$, and $CEW_3$. Each of FIGS. 43 through 48 illustrates a non-limiting example of an optical filter CEW configuration, and this disclosure should not be interpreted as limited to any specific configuration or combination of configurations.

In some embodiments, an optical filter is configured to enhance object visibility while preserving the natural appearance of viewed scenes. Such optical filters (and eyewear that include such filters) can be configured for a wide range of recreational, sporting, professional, and other activities. As a representative example, filters and eyewear can be configured to be worn while playing a game of golf.

In certain embodiments, eyewear and optical filters provide one or more CEWs corresponding to a specific activity. A filter can include one or more CEWs in a portion of the visible spectrum in which an object of interest, such as, for example, a golf ball, emits or reflects a substantial spectral stimulus. When referring to the spectral stimulus of an object of interest, a corresponding CEW may be referred to as the object spectral window. When referring to spectral stimulus of a background behind an object, a corresponding CEW may be referred to as the background spectral window. Moreover, when referring to the spectral stimulus of the general surroundings, the spectral window may be referred to as the surrounding spectral window. An optical filter can be configured such that one or more edges of an absorptance peak lie within at least one spectral window. In this way, an optical filter can enhance chroma in the spectral ranges corresponding to a given spectral stimulus (e.g. object, background, or surroundings).

Golf balls and corresponding eyewear can be provided in which a golf ball cover is configured to produce wavelength-converted light, and the eyewear includes lenses having an object chroma enhancement window corresponding to a spectral reflectance of the cover, a spectral transmittance of any transparent or translucent outer portion of the cover, and/or a spectrum of wavelength-converted light emitted by the cover.

Golf balls are provided that have a cover that is configured to wavelength-convert light that is incident at a first wavelength or in a first wavelength range. The wavelength-converted light can be emitted at longer wavelengths than the wavelength of the absorbed incident light. The wavelength-converted light has at least a portion corresponding to an object chroma enhancement window of corresponding eyewear. In representative examples, the golf balls have covers that include a fluorescent material that produces fluorescence in a spectral region corresponding to a spectral transmittance of a viewing filter. In additional embodiments, a portion of the object chroma enhancement window corresponds to a spectral region in which light is preferentially reflected by the cover.

Methods of enhancing object visibility with respect to a background include providing a filter that increases the chroma of the object to be viewed. A light spectrum produced by the filter can define an object chroma enhancement window. An optical filter is provided that includes a spectral window corresponding to the object chroma enhancement window, and a background chroma enhancement window corresponding to a reflected or emitted spectral profile of the background. An improved optical filter can provide for chroma enhancement within the spectral windows. In some embodiments, the contrast agent is a wavelength-conversion agent, a colorant, or both. In alternative examples, the optical filter includes a spectral-width window that broadens the transmission spectrum of the filter. In some particular examples, the object chroma enhancement window, the background chroma enhancement window, and the spectral-width window include wavelengths from about 440 nm to about 480 nm, about 510 nm to about 580 nm, and about 600 nm to about 660 nm, respectively. In additional examples, the windows include wavelengths between about 400 nm and about 700 nm. Lenses can include spectral windows that exhibit chroma enhancement within the same spectral ranges that define the spectral windows. In such embodiments, the lens can provide increased chroma or decreased chroma within one or more of the spectral windows discussed herein.

These and other features and aspects of certain embodiments are described below with reference to golf and other sporting and non-sporting applications. For convenience, several representative examples pertaining to golf are described, but it will be apparent that these examples can be modified in arrangement and detail for other leisure, recreational, sporting, industrial, professional, or other activities.

Viewing a golf ball's trajectory and determining its location are important to golfers of various skill levels. Trajectories of a golf ball hit by an inexperienced golfer are unpredictable and frequently place the ball in locations in which the ball is hard to find. Such failures to promptly find a golf ball can increase the time used to play a round and can reduce the number of rounds that can be played on a course in a day. Because time spent looking for errant golf balls contributes to slow play, many courses and many tournaments have rules concerning how long a golfer is permitted to search for a lost golf ball before putting a replacement ball into play. For more experienced or expert golfers, loss of a golf ball results in imposition of a penalty that adds strokes to the golfer's score. Such penalty strokes are annoying, especially when the loss of a ball results from an inability to find the ball due to poor viewing conditions and a limited time in which to search.

Figure 49:
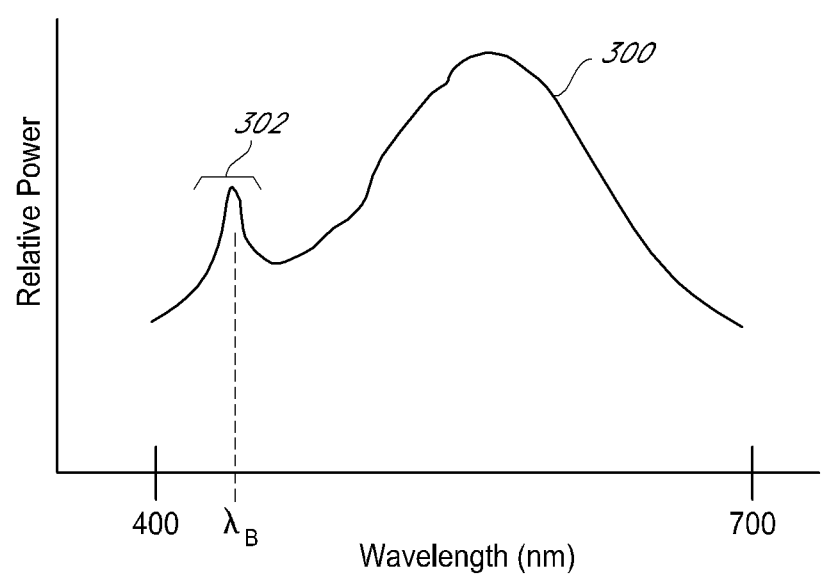
FIG. 49 illustrates a spectral power distribution representative of the light reflected or emitted from a golf ball under outdoor illumination conditions.

With reference to FIG. 49, a spectral power distribution 300 of radiation from a golf ball in outdoor illumination such as direct sunlight or other illumination conditions includes a blue-enhanced portion 302 located in a wavelength region near a wavelength 4. The blue-enhanced portion 302 can be produced by conversion of radiation within a range of wavelengths shorter than that of the portion 302 to radiation at wavelengths within the blue-enhanced portion 302. Such wavelength-conversion can result from fluorescence, phosphorescence, or other processes. As used herein, any process in which radiation at a shorter wavelength is converted into radiation at a longer wavelength is referred to as a wavelength-conversion process. As noted above, a typical example of such a process is fluorescence in which radiation at a first wavelength is absorbed to produce radiation at a longer wavelength. Because the human eye is less sensitive to radiation at wavelengths shorter than the wavelengths of the blue-enhanced portion 302 than to radiation within the blue-enhanced portion 302, conversion of radiation from the shorter wavelengths into longer wavelength radiation tends to make the golf ball appear whiter and brighter. The spectral power distribution of FIG. 49 corresponds to a golf ball that appears white and spectral power distributions for non-white golf balls can have additional spectral features characteristic of the golf ball's color.

Spectral power at wavelengths shorter than the conventional cutoff of human visual response at wavelengths of about 400 nm is not shown in FIG. 49. Radiation at these shorter wavelengths produces limited human visual response. Conversion of these shorter wavelengths into longer wavelengths by fluorescence or other wavelength-conversion process can produce radiation that makes an appreciable contribution to visual response. This conversion process can be enhanced by the selection of a golf ball cover that produces such wavelength-converted light or by incorporating suitable fluorescent, phosphorescent, or other wavelength-conversion agents into the golf ball cover. A typical wavelength-conversion agent produces a blue-enhanced region at a wavelength $\lambda_B$ that is typically in the range between about 440 nm to about 480 nm, but wavelength-conversion agents for other wavelength ranges can be used. If the golf ball (or other object of interest) need not appear white, colored wavelength-conversion agents can be used, such as colored fluorescent agents. In this example, $\lambda_B$ and more particularly the wavelength range in which $\lambda_B$ typically occurs (i.e. from about 440 nm to about 480 nm) represent an object spectral window.

The spectral power distribution 300 illustrated in FIG. 49 is representative of the optical radiation from a golf ball under outdoor illumination conditions. More accurate spectral power distribution values depend on the exact illumination conditions. Typical illumination conditions include illumination from direct sunlight and overcast skies as well as illumination produced in deep shadows. Under these different illumination conditions, different spectral power distributions are produced. For example, an overcast sky typically produces a spectral power distribution having less total energy as well as relatively less energy at shorter (more blue) wavelengths. Nevertheless, the spectral power distributions associated with these varying illumination conditions have corresponding blue-enhanced portions produced by wavelength-conversion processes.

Visual perception of a golf ball that produces the spectral power distribution of FIG. 49 is improved by enhancing the chroma of the blue portion 302 (the wavelength-converted portion) of the golf ball spectral power distribution. The blue-enhanced portion 302 has excess blue spectral power relative to the ambient illumination. Providing a blue light chroma enhancing filter therefore permits improved tracking and location of the golf ball. While enhancing the chroma of the blue portion 302 of the spectral power distribution of FIG. 49 permits increased golf ball visibility under many conditions, the extent of this increased visibility depends on the background in which the golf ball is viewed. For common backgrounds encountered in golf such as fairway or putting surface grasses, chroma enhancement of the blue portion 302 can increase golf ball visibility. Wearing eyewear that includes lenses that increase the chroma of the blue-enhanced portion 302 can permit the golfer to more readily follow the trajectory of a golf ball and to locate the golf ball after it has come to rest.

While such eyewear can increase golf ball visibility and permit easier tracking and location of a golf ball, altering the spectral power distribution of light passing to the golfer's eyes can produce scenes that appear unnatural or even disturbing to the golfer. During play of a typical round, the golfer encounters many different backgrounds including blue skies, overcast skies, rock, sand, dirt, and vegetation, including putting surfaces, fairways, sand traps, and rough. Eyewear that enhances the chroma of the blue portion can produce an unnatural or disturbing appearance to all or some of these surroundings, and impair the golfer's concentration or perception. Such unnatural appearances can offset any performance advantage associated with increased golf ball visibility.

More natural appearing viewing can be obtained with an embodiment of an optical filter having a spectral absorptance profile as illustrated in FIG. 40. Such an embodiment provides improved golf ball visibility while maintaining a natural appearance of scenes viewed through such a filter. As used herein, a spectral region in which an object emits or reflects a substantial spectral stimulus is referred to as a spectral window. A width of a spectral window can be defined as the full width at about 75%, 50%, 25%, 20%, 10%, or 5% of a maximum in the spectral power distribution. A golf ball can include a blue light stimulus at and around and one or more additional spectral windows in the green and red portions of the spectrum.

A filter can include a chroma-enhancing window (CEW) that is configured to enhance the chroma within a portion, substantially all, or the entire spectral window of a visual stimulus. An optical filter can provide one or more edges of an absorptance peak within the spectral windows where a stimulus is located. For example, the spectral location of a blue light CEW can be selected to correspond to a particular fluorescent agent so that eyewear can be spectrally matched to a particular fluorescent agent. Thus, eyewear and golf balls can be spectrally matched to provide enhanced golf ball visibility. Light at wavelengths below about 440 nm can be attenuated so that potentially harmful short wavelength radiation does not enter the eye. For example, some of this short wavelength radiation can be converted by the fluorescent agent to radiation at wavelengths corresponding to a blue light CEW. The average visible light transmittance of a golf lens can be about 20%-30%. Filters for outdoor use typically have average transmittances between about 8%-80%, 10%-60%, or 10%-40%. Filters for indoor use (or use at illumination levels lower than normal daylight illumination) can have average transmittances between about 20%-90%, 25%-80%, or 40%-60%.

Green grass and vegetation typically provide a reflected or emitted spectral stimulus with a light intensity maximum at a wavelength of about 550 nm. As mentioned above, wavelengths from about 500 nm to about 600 nm may define a green or background spectral window. Without a green light CEW, light at wavelengths between 500 nm and 600 nm can have lower chroma than desired, and vegetation can appear relatively muted, drab, or dark. As a result, the golfer's surroundings would appear unnatural and the golfer's perception of vegetation would be impaired. This impairment is especially serious with respect to putting because the golfer generally tries to precisely determine various parameters of the putting surface, including height and thickness of the grass covering the putting surface, orientation of the blades of grass of the putting surface, and the surface topography. Because a golfer takes about one-half of her strokes at or near putting surfaces, any visual impairments at putting surfaces are serious performance disadvantages and are generally unacceptable. Misperception of vegetation is also a significant disadvantage when playing out of a fairway or rough. A green light CEW, in combination with a blue light CEW, permits enhanced golf ball visibility while permitting accurate assessment of background surfaces such as putting surfaces or other vegetation. An optical filter can enhance the chroma of a desired object and background by exhibiting at least one edge of an absorptance peak within one or both of the green light CEW and the blue light CEW. The concurrence of at least one edge of an absorptance peak within one or both of the green or blue spectral windows further aids the human eye in distinguishing a golf ball from its surroundings by enhancing the chroma of the ball, the chroma of the vegetation, or the chroma of both the ball and vegetation.

A red light CEW may extend over a wavelength range from about 610 nm to about 720 nm, but the transmission of radiation at wavelengths beyond about 700 nm provides only a small contribution to a viewed scene because of the low sensitivity of the human eye at these wavelengths. A red light CEW can enhance the natural appearance of scenery viewed with an embodiment of an improved optical filter by enhancing the chroma of at least some red light reflected by vegetation. For example, chroma enhancement can be seen in FIG. 40, where at least one edge of the red absorptance peak (e.g., the absorptance peak between about 630 nm and about 660 nm) falls within the red light CEW. The more polychromatic light produced by enhancing the chroma of red, green, and blue components of light permits improved focus. In addition, convergence (pointing of the eyes to a common point) and focusing (accommodation) are interdependent, so that improved focusing permits improved convergence and improved depth perception. Providing CEWs in the green and red portions of the visible spectrum can result in improved depth perception as well as improved focus. A filter having such CEWs can improve perception of vegetation (especially putting surfaces) and provide more natural looking scenery while retaining the enhanced golf ball visibility associated with the blue light CEW. An optical filter that provides at least one edge of an absorption peak within a CEW can enhance the quality of the light transmitted through the optical filter by increasing its chroma value.

Optical filters having CEWs covering one or more spectral ranges can provide enhanced visibility. Optical filters having such a spectral profile can be selected for a particular application based on ease of fabrication or a desire for the optical filter to appear neutral. For cosmetic reasons, it can be desirable to avoid eyewear that appears tinted to others.

Optical filters can be similarly configured for a variety of activities in which tracking and observation of an object against a background is facilitated by wavelength-conversion. Such filters can include a wavelength-conversion window, a background window, and a spectral-width window. These CEWs are selected to enhance the chroma of wavelength-converted light, light from activity-specific backgrounds, and light at additional wavelengths to further extend the total spectral width of chroma-enhanced light to improve focus, accommodation, or provide more natural viewing. For application to a white golf ball as described above, an optical filter is provided with a blue light CEW corresponding to wavelength-conversion spectral components, a green light CEW to facilitate viewing of a background, and a red light CEW to improve accommodation and the natural appearance of scenes. Such an optical filter can have a substantially neutral color density. For other activities, particular CEWs can be chosen based on expected or measured background colors and wavelengths produced by a wavelength-conversion process. For example, tennis is often played on a green playing surface with a yellow ball. Such a ball typically has a wavelength conversion region that produces wavelength-converted light at wavelengths between about 460 nm and 540 nm. An example filter for such an application has a wavelength-conversion window at between about 460 nm to about 540 nm, and a background window centered at about 550 nm. The wavelength-conversion window and the background window can have some overlap. To provide more natural contrast and better focus, additional transmission windows can be provided in wavelength ranges of about 440 nm to about 460 nm, from about 620 nm to about 700 nm, or in other ranges.

In alternative embodiments, an optical filter having an object-specific spectral window in addition to or instead of a wavelength-conversion window is provided. For example, for viewing of a golf ball that appears red, the optical filter can include a red light CEW that enhances the chroma of red light to improve golf ball visibility. For natural, accurate viewing of backgrounds (such as putting surfaces), a green light CEW is also provided. If the golf ball also emits wavelength converted light, an additional wavelength-conversion window can be provided, if desired. The filter can also include a spectral-width window.

In some embodiments, an optical filter is configured to change the chroma values of a scene in one or more spectral regions in which an object and/or a background reflect or emit light. An optical filter can be configured to account for spectral regions where an object of interest and the background reflect or emit light. Absorptance peaks can be positioned such that chroma is increased or decreased in one or more spectral regions where the object of interest is reflecting or emitting light and where the background is reflecting or emitting light. For example, chroma enhancement within an object or a background spectral window can be obtained by configuring an optical filter such that at least one edge of an absorptance peak is positioned within the spectral window.

An optical filter can increase contrast between the object and the background by providing chroma enhancement in one or both of the object spectral window and the background spectral window. Color contrast improves when chroma is increased. For example, when a white golf ball is viewed against a background of green grass or foliage at a distance, chroma enhancement technology can cause the green visual stimulus to be more narrowband. A narrowed spectral stimulus causes the green background to appear less washed out, resulting in greater color contrast between the golf ball and the background.

With reference to FIGS. 1A and 1B, eyewear can include a frame and lenses 102a and 102b. The lenses 102a and 102b have a filter that enhances chroma in a wavelength-conversion window, a background-window, a spectral-width window, another CEW, or any combination of CEWs. For some applications, the spectral-width window may be omitted. For other applications, an object-specific spectral window is provided that can include the wavelength-conversion window. The lenses 102a and 102b can be corrective lenses or non-corrective lenses and can be made of any of a variety of optical materials including glasses or plastics such as acrylics or polycarbonates. The lenses can have various shapes, including plano-plano and meniscus shapes. In alternative eyewear, a frame is configured to retain a unitary lens that is placed in front of both eyes when the eyewear is worn. Goggles can also be provided that include a unitary lens that is placed in front of both eyes when the goggles are worn.

The spectral transmittance profile and chroma enhancement of the lenses of FIGS. 1A and 1B can be obtained in several ways. A coating can be provided to one or more surfaces of the lenses. Such coatings typically include one or more layers of coating materials configured to achieve a desired spectral transmittance and chroma enhancement. The layers can be absorptive so that radiation from spectral regions that are to be attenuated is absorbed in the coating, or the coating can be reflective so that radiation at such wavelengths is reflected. In yet another example, one or more dyes or other chromophores can be incorporated within the lens material by a dyeing process or another process. Two or more of the above methods can be combined to produce the desired spectral and chroma characteristics.

While embodiments are described above with reference to particular activities, additional examples can be provided for other activities. For example, a chroma-enhancing, enhanced-visibility filter can be provided for sports such as baseball, tennis, badminton, basketball, racquetball, handball, archery, target shooting, trap shooting, cricket, lacrosse, football, ice hockey, field hockey, hunting, soccer, squash, or volleyball. For such sports, such a filter can include an object chroma enhancement window selected to increase the chroma of natural reflected light or wavelength-converted light produced by a fluorescent agent in a baseball, tennis ball, badminton birdie, or volleyball or light that is preferentially reflected by these objects. Background windows and spectral-width windows can be provided so that backgrounds are apparent, scenes appear natural, and the wearer's focus and depth perception are improved. For sports played on various surfaces, or in different settings such as tennis or volleyball, different background windows can be provided for play on different surfaces. For example, tennis is commonly played on grass courts or clay courts, and filters can be configured for each surface, if desired. As another example, ice hockey can be played on an ice surface that is provided with a wavelength-conversion agent or colorant, and lenses can be configured for viewing a hockey puck with respect to such ice. Outdoor volleyball benefits from accurate viewing of a volleyball against a blue sky, and the background filter can be selected to permit accurate background viewing while enhancing chroma in outdoor lighting. A different configuration can be provided for indoor volleyball. Eyewear that includes such filters can be activity-specific, surface-specific, or setting-specific. In addition, tinted eyewear can be provided for activities other than sports in which it is desirable to identify, locate, or track an object against backgrounds associated with the activity. Some representative activities include dentistry, surgery, bird watching, fishing, or search and rescue operations. Such filters can also be provided in additional configurations such as filters for still and video cameras, or as viewing screens that are placed for the use of spectators or other observers. Filters can be provided as lenses, unitary lenses, or as face shields. For example, a filter for hockey can be included in a face shield.

It is contemplated that the particular features, structures, or characteristics of any embodiments discussed herein may be combined in any suitable manner in one or more separate embodiments not expressly illustrated or described. For example, it is understood that an optical filter can include any suitable combination of light attenuation features and that a combination of light-attenuating lens elements can combine to control the chroma of an image viewed through a lens. In many cases, structures that are described or illustrated as unitary or contiguous can be separated while still performing the function(s) of the unitary structure. In many instances, structures that are described or illustrated as separate can be joined or combined while still performing the function(s) of the separated structures. It is further understood that the optical filters disclosed herein may be used in at least some lens configurations and/or optical systems besides lenses.

It should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Moreover, any components, features, or steps illustrated and/or described in a particular embodiment herein can be applied to or used with any other embodiment(s). Thus, it is intended that the scope of the inventions herein disclosed should not be limited by the particular embodiments described above, but should be determined only by a fair reading of the claims that follow.

What is claimed is:

1. Eyewear comprising:
   a lens comprising an optical filter configured to increase the average chroma value of uniform intensity light stimuli having a bandwidth of 30 nm transmitted through the lens at least partially within one or more filtered portions of the visible spectrum by attenuating a portion of the light transmitted by the lens in the one or more filtered portions of the visible spectrum, the chroma value being the C* attribute of the CIE L*C*h* color space;
   wherein the lens has a CIE chromaticity x value between about 0.3 and about 0.34;
   wherein the lens has an average visible light transmittance between about 8%-80%;
   wherein a first filtered portion of the one or more filtered portions of the visible spectrum comprises a spectral range of about 440 nm to about 480 nm;
   wherein a second filtered portion of the one or more filtered portions of the visible spectrum comprises a spectral range of about 540 nm to about 600 nm;
   wherein the increase in average chroma value comprises an increase compared to a neutral filter that uniformly attenuates the same average percentage of light as the optical filter, within the bandwidth of each light stimulus, and wherein the increase in average chroma value compared to a neutral filter that uniformly attenuates the same average percentage of light as the optical filter is greater than or equal to about 5% within the spectral range of the first filtered portion, when outputs resulting from uniform intensity inputs having a bandwidth of 30 nm and a center wavelength within the spectral range of the first filtered portion are compared; and
   wherein the increase in average chroma value comprises an increase compared to a neutral filter that uniformly attenuates the same average percentage of light as the optical filter, within the bandwidth of each light stimulus, and wherein the increase in average chroma value compared to a neutral filter that uniformly attenuates the same average percentage of light as the optical filter is greater than or equal to about 2% within the spectral range of the second filtered portion, when outputs resulting from uniform intensity inputs having a bandwidth of 30 nm and a center wavelength within the spectral range of the second filtered portion are compared.

2. The eyewear of claim 1, wherein the lens has a CIE chromaticity y value between about 0.31 and about 0.36.

3. The eyewear of claim 1, wherein the increase in average chroma value compared to a neutral filter that uniformly attenuates the same average percentage of light as the optical filter is between about 5% and about 20% within the spectral range of about 440 nm to about 480 nm, when outputs resulting from uniform intensity inputs having a bandwidth of 30 nm and a center wavelength within the spectral range are compared.

4. The eyewear of claim 1, wherein the optical filter comprises one or more organic dyes.

5. The eyewear of claim 1, wherein the optical filter is configured to increase the average chroma value of uniform intensity light stimuli having a bandwidth of 30 nm transmitted through the lens at least partially within the second filtered portion of the visible spectrum by an amount between about 2% and about 20%.

6. The eyewear of claim 1, wherein the optical filter is configured to increase the average chroma value of uniform intensity light stimuli having a bandwidth of 30 nm transmitted through the lens at least partially within a third filtered portion of the visible spectrum by an amount between about 2% and about 20%, and wherein the third filtered portion comprises a spectral range of about 630 nm to about 660 nm.

7. Eyewear comprising:
   a lens comprising an optical filter configured to attenuate visible light in a plurality of spectral bands, each of the plurality of spectral bands comprising:
      an absorptance peak comprising a spectral bandwidth, wherein the absorptance peak is positioned in a middle portion of a respective spectral band, wherein the middle portion is positioned between a lower and an upper edge portion of the respective spectral band, wherein absorptance within the upper and the lower edge portions is substantially below the absorptance of the absorptance peak,
      a maximum absorptance, a center wavelength located at a midpoint of the spectral bandwidth, and
      an integrated absorptance peak area within the spectral bandwidth, the spectral bandwidth being equal to the full width of the absorptance peak at 80% of the maximum absorptance of the absorptance peak,
   wherein the optical filter comprises:
      a blue light absorptance peak, wherein the maximum absorptance of the blue light absorptance peak is between about 440 nm and about 510 nm, wherein the spectral bandwidth associated with the blue light absorptance peak is less than or equal to 50 nm; and
      a yellow light absorptance peak, wherein the maximum absorptance of the yellow light absorptance peak is between about 540 nm and about 600 nm;
      wherein the lens has an average visible light transmittance between about 8%-80%.

8. The eyewear of claim 7, wherein an attenuation factor of the blue light absorptance peak obtained by dividing the integrated absorptance peak area within the spectral bandwidth of the absorptance peak is greater than or equal to about 0.8 and less than 1.

9. The eyewear of claim 7, wherein an attenuation factor of the yellow light absorptance peak obtained by dividing the integrated absorptance peak area within the spectral bandwidth of the absorptance peak is greater than or equal to about 0.8 and less than 1.

10. The eyewear of claim 7, wherein the spectral bandwidth of the blue light absorptance peak is between about 20 nm and about 50 nm.

11. Eyewear comprising:
a lens comprising an optical filter configured to attenuate visible light in a plurality of spectral bands, each of the plurality of spectral bands comprising an absorptance peak having a maximum absorptance and a spectral bandwidth equal to the full width of the absorptance peak at 80% of the maximum absorptance of the absorptance peak, lower and upper edge portions that are substantially below the maximum absorptance, and a middle portion positioned between the lower and upper edge portions and including the maximum absorptance and a region substantially near the maximum absorptance, wherein the optical filter comprises:
a blue light absorptance peak, wherein the maximum absorptance of the blue light absorptance peak is between about 440 nm and about 510 nm, wherein the spectral bandwidth associated with the blue light absorptance peak is less than or equal to 50 nm; and
a yellow light absorptance peak, wherein the maximum absorptance of the yellow light absorptance peak is between about 540 nm and about 600 nm;
wherein the lens has an average visible light transmittance between about 8%-80%,
wherein at least the lower edge portion or the upper edge portion of the blue light absorptance peak is between about 440 nm and about 510 nm, and
wherein at least the lower edge portion or the upper edge portion of the yellow light absorptance peak is between about 540 nm and about 600 nm.

12. The eyewear of claim 11, wherein the optical filter comprises one or more organic dyes.

13. The eyewear of claim 11, wherein the maximum absorptance of the yellow light absorptance peak is within a spectral range of about 540 nm to about 570 nm.

14. The eyewear of claim 11, wherein the maximum absorptance of the yellow light absorptance peak is within a spectral range of about 580 nm to about 600 nm.

15. Eyewear comprising:
a lens comprising an optical filter configured to increase the average chroma value of uniform intensity light stimuli having a bandwidth of 30 nm transmitted through the lens at least partially within one or more filtered portions of the visible spectrum by attenuating a portion of the light transmitted by the lens in the one or more filtered portions of the visible spectrum, the chroma value being the C* attribute of the CIE L*C*h* color space;
wherein the lens has a CIE chromaticity x value between about 0.3 and about 0.34;
wherein the lens has an average visible light transmittance between about 8%-80%;
wherein a first filtered portion of the one or more filtered portions of the visible spectrum comprises a spectral range of about 440 nm to about 510 nm;
wherein a second filtered portion of the one or more filtered portions of the visible spectrum comprises a spectral range of about 540 nm to about 600 nm;
wherein the increase in average chroma value comprises an increase compared to a neutral filter that uniformly attenuates the same average percentage of light as the optical filter, within the bandwidth of each light stimulus, and wherein the increase in average chroma value compared to a neutral filter that uniformly attenuates the same average percentage of light as the optical filter is greater than or equal to about 2% within the spectral range of the first filtered portion, when outputs resulting from uniform intensity inputs having a bandwidth of 30 nm and a center wavelength within the spectral range of the first filtered portion are compared; and
wherein the increase in average chroma value comprises an increase compared to a neutral filter that uniformly attenuates the same average percentage of light as the optical filter, within the bandwidth of each light stimulus, and wherein the increase in average chroma value compared to a neutral filter that uniformly attenuates the same average percentage of light as the optical filter is greater than or equal to about 2% within the spectral range of the second filtered portion, when outputs resulting from uniform intensity inputs having a bandwidth of 30 nm and a center wavelength within the spectral range of the second filtered portion are compared.

16. The eyewear of claim 15, wherein the lens has a CIE chromaticity y value between about 0.31 and about 0.36.

17. The eyewear of claim 15, wherein the increase in average chroma value compared to a neutral filter that uniformly attenuates the same average percentage of light as the optical filter is between about 5% and about 20% within the spectral range of about 440 nm to about 510 nm, when outputs resulting from uniform intensity inputs having a bandwidth of 30 nm and a center wavelength within the spectral range are compared.

18. The eyewear of claim 15, wherein the optical filter comprises one or more organic dyes.

19. The eyewear of claim 15, wherein the optical filter is configured to increase the average chroma value of uniform intensity light stimuli having a bandwidth of 30 nm transmitted through the lens at least partially within the second filtered portion of the visible spectrum by an amount between about 2% and about 20%.

20. The eyewear of claim 15, wherein the optical filter is configured to increase the average chroma value of uniform intensity light stimuli having a bandwidth of 30 nm transmitted through the lens at least partially within a third filtered portion of the visible spectrum by an amount between about 2% and about 20%, and wherein the third filtered portion comprises a spectral range of about 630 nm to about 660 nm.

* * * * *